US008743949B2

(12) United States Patent
Srinivasan et al.

(10) Patent No.: US 8,743,949 B2
(45) Date of Patent: Jun. 3, 2014

(54) VIDEO CODING / DECODING WITH RE-ORIENTED TRANSFORMS AND SUB-BLOCK TRANSFORM SIZES

(71) Applicant: Microsoft Corporation, Redmond, WA (US)

(72) Inventors: Sridhar Srinivasan, Shanghai (CN); Thomas W. Holcomb, Bothell, WA (US); Chih-Lung Lin, Redmond, WA (US); Pohsiang Hsu, Redmond, WA (US); Ming-Chieh Lee, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/943,648

(22) Filed: Jul. 16, 2013

(65) Prior Publication Data

US 2013/0301704 A1 Nov. 14, 2013

Related U.S. Application Data

(60) Continuation of application No. 11/890,059, filed on Aug. 3, 2007, which is a division of application No. 10/322,352, filed on Dec. 17, 2002, now Pat. No. 7,266,149.

(60) Provisional application No. 60/341,674, filed on Dec. 17, 2001.

(51) Int. Cl.
*H04N 7/46* (2006.01)

(52) U.S. Cl.
USPC ............... 375/240; 375/240.2; 375/240.17; 375/240.27; 382/233; 382/238

(58) Field of Classification Search
CPC ........ H04N 7/50; H04N 7/64; H04N 7/26771
USPC ................. 375/240.17, 240.27; 382/233, 238
See application file for complete search history.

(56) References Cited

U.S. PATENT DOCUMENTS 4,691,329 A 9/1987 Juri et al.
4,796,087 A 1/1989 Guichard et al.
(Continued)

FOREIGN PATENT DOCUMENTS

EP 0 279 053 8/1988
EP 1085763 3/2001

OTHER PUBLICATIONS

U.S. Appl. No. 60/341,674, filed Dec. 17, 2001, Lee et al.
(Continued)

*Primary Examiner* — William C Vaughn, Jr.
*Assistant Examiner* — Luis M Perez
(74) *Attorney, Agent, or Firm* — Aaron Chatterjee; Andrew Sanders; Micky Minhas

(57) ABSTRACT

Techniques and tools for video coding/decoding with sub-block transform coding/decoding and re-oriented transforms are described. For example, a video encoder adaptively switches between 8×8, 8×4, and 4×8 DCTs when encoding 8×8 prediction residual blocks; a corresponding video decoder switches between 8×8, 8×4, and 4×8 inverse DCTs during decoding. The video encoder may determine the transform sizes as well as switching levels (e.g., frame, macroblock, or block) in a closed loop evaluation of the different transform sizes and switching levels. When a video encoder or decoder uses spatial extrapolation from pixel values in a causal neighborhood to predict pixel values of a block of pixels, the encoder/decoder can use a re-oriented transform to address non-stationarity of prediction residual values.

37 Claims, 55 Drawing Sheets

(56) References Cited

U.S. PATENT DOCUMENTS

| | | | |
|---|---|---|---|
| 4,831,659 A | 5/1989 | Miyaoka et al. |
| 5,068,724 A | 11/1991 | Krause et al. |
| 5,107,345 A | 4/1992 | Lee et al. |
| 5,117,287 A | 5/1992 | Koike et al. |
| 5,144,426 A | 9/1992 | Tanaka et al. |
| 5,241,395 A | 8/1993 | Chen et al. |
| 5,260,783 A | 11/1993 | Dixit |
| 5,422,676 A | 6/1995 | Herpel et al. |
| 5,442,400 A | 8/1995 | Sun et al. |
| 5,452,104 A | 9/1995 | Lee et al. |
| 5,467,086 A | 11/1995 | Jeong |
| 5,467,134 A | 11/1995 | Laney et al. |
| 5,477,272 A | 12/1995 | Zhang et al. |
| 5,537,493 A | 7/1996 | Wilkinson |
| 5,544,286 A | 8/1996 | Laney |
| 5,576,767 A | 11/1996 | Lee et al. |
| 5,598,483 A | 1/1997 | Purcell et al. |
| 5,623,313 A * | 4/1997 | Naveen .............. 375/240.17 |
| 5,748,789 A | 5/1998 | Lee et al. |
| 5,764,814 A | 6/1998 | Chen et al. |
| 5,778,098 A | 7/1998 | Lee et al. |
| 5,793,897 A | 8/1998 | Jo et al. |
| 5,799,113 A | 8/1998 | Lee |
| 5,802,213 A | 9/1998 | Gardos |
| 5,825,423 A | 10/1998 | Jung |
| 5,825,929 A | 10/1998 | Chen et al. |
| 5,828,413 A | 10/1998 | Jayant et al. |
| 5,844,613 A | 12/1998 | Chaddha |
| 5,850,294 A | 12/1998 | Apostolopoulos et al. |
| 5,905,815 A | 5/1999 | Mack et al. |
| 5,909,511 A | 6/1999 | Yoshimoto |
| 5,937,095 A | 8/1999 | Machida |
| 5,946,043 A | 8/1999 | Lee et al. |
| 5,952,943 A | 9/1999 | Walsh et al. |
| 5,959,673 A | 9/1999 | Lee et al. |
| 5,970,173 A | 10/1999 | Lee et al. |
| 6,058,212 A | 5/2000 | Yokoyama |
| 6,067,322 A | 5/2000 | Wang |
| 6,125,143 A | 9/2000 | Suzuki et al. |
| 6,141,382 A * | 10/2000 | Krishnamurthy et al. .............. 375/240.17 |
| 6,148,109 A | 11/2000 | Boon et al. |
| 6,215,425 B1 | 4/2001 | Andrews et al. |
| 6,215,910 B1 | 4/2001 | Chaddha |
| 6,233,017 B1 | 5/2001 | Chaddha |
| 6,236,764 B1 | 5/2001 | Zhou |
| 6,281,942 B1 | 8/2001 | Wang |
| 6,292,588 B1 | 9/2001 | Shen et al. |
| 6,300,888 B1 | 10/2001 | Chen et al. |
| 6,337,881 B1 | 1/2002 | Chaddha |
| 6,339,656 B1 | 1/2002 | Marui |
| 6,449,382 B1 * | 9/2002 | Ciccolo et al. .............. 382/103 |
| 6,480,544 B1 | 11/2002 | Uehara et al. |
| 6,501,798 B1 | 12/2002 | Sivan |
| 6,571,016 B1 | 5/2003 | Mehrotra et al. |
| 6,633,611 B2 | 10/2003 | Sekiguchi et al. |
| 6,646,578 B1 | 11/2003 | Au |
| 6,654,419 B1 | 11/2003 | Sriram et al. |
| 6,697,433 B1 * | 2/2004 | Isu et al. .............. 375/240.27 |
| 6,728,414 B1 | 4/2004 | Chang et al. |
| 6,765,964 B1 | 7/2004 | Conklin |
| 6,795,584 B2 | 9/2004 | Karczewicz et al. |
| 6,870,963 B2 | 3/2005 | Govindaswamy et al. |
| 6,907,142 B2 | 6/2005 | Kalevo |
| 6,983,018 B1 | 1/2006 | Lin et al. |
| 7,039,117 B2 * | 5/2006 | Chan .............. 375/240.27 |
| 7,162,091 B2 * | 1/2007 | Wang et al. .............. 382/233 |
| 7,263,232 B2 * | 8/2007 | Srinivasan .............. 382/238 |
| 7,266,149 B2 | 9/2007 | Holcomb et al. |
| 2002/0027954 A1 | 3/2002 | Singh et al. |
| 2002/0097802 A1 | 7/2002 | Lin et al. |
| 2002/0154227 A1 | 10/2002 | Lan et al. |
| 2003/0012286 A1 * | 1/2003 | Ishtiaq et al. .............. 375/240.27 |
| 2003/0099292 A1 | 5/2003 | Wang et al. |
| 2003/0108100 A1 | 6/2003 | Sekiguchi et al. |
| 2003/0156648 A1 | 8/2003 | Holcomb et al. |
| 2003/0185306 A1 | 10/2003 | MacInnis et al. |
| 2004/0005096 A1 | 1/2004 | Kim et al. |
| 2004/0062309 A1 | 4/2004 | Romanowski et al. |
| 2004/0252768 A1 | 12/2004 | Suzuki et al. |
| 2005/0025246 A1 | 2/2005 | Holcomb |
| 2005/0036759 A1 | 2/2005 | Lin et al. |
| 2005/0135484 A1 | 6/2005 | Lee et al. |
| 2005/0254583 A1 | 11/2005 | Kim et al. |
| 2006/0209962 A1 | 9/2006 | Park et al. |
| 2007/0098278 A1 | 5/2007 | Sun et al. |
| 2008/0049834 A1 | 2/2008 | Holcomb et al. |
| 2013/0301732 A1 | 11/2013 | Hsu et al. |

OTHER PUBLICATIONS

Bjontegaard, "Addition of 8×8 Transform to H.26L," ITU-T VCEG Q15-I-39, 2 pp. (Oct. 1999).

Chen et al., "Variable Block-size Image Coding by Resource Planning," *Proc. Int'l Conf. on Image Science, Systems, and Technology*, Las Vegas, 10 pp. (1997).

Hallapuro et al., "Performance Analysis of Low Bit Rate H.26L Video Encoder," *Proc. IEEE International Conference on Acoustics, Speech and Signal Processing*, vol. 2, pp. 1129-1132 (May 2001).

Horn et al, "Bit allocation methods for closed-loop coding of oversampled pyramid decompositions," *Proc. of IEEE International Conference on Image Processing*, 4 pp. (1997).

ISO/IEC 11172-2, "Coding of Moving Picture and Associated Audio for Digital Storage Media at Up to About 1.5 Mbit/s, Part 2: Video," 122 pp. (1993).

ISO/IEC 14496-2, "Coding of Audio-Visual Objects: Visual, ISO/IEC 14496-2," pp. i-v, 136-144, 229 (1998).

ISO/IEC 14496-2, "Coding of Audio-Visual Objects: Visual, ISO/IEC 14496-2," 326 pp. (1998).

ITU-T Recommendation H.261, "Line Transmission of Non-Telephone Signals," International Telecommunications Union, 29 pp. (Mar. 1993).

ITU-T Recommendation H.262, "Transmission of Non-Telephone Signals," International Telecommunications Union, 216 pp. (Jul. 1995).

ITU-T Recommendation H.263, "Series H: Audiovisual and Multimedia Systems, Infrastructure of Audiovisual Services—Coding of Moving Video," International Telecommunications Union, 167 pp. (Feb. 1998).

U.S. Appl. No. 60/488,710, filed Jul. 18, 2003, Srinivasan et al.

ITU-T Recommendation H.263, "Series H: Audiovisual and Multimedia Systems, Infrastructure of Audiovisual Services—Coding of Moving Video," International Telecommunications Union, pp. i-x, 4, 40-48, 73-80 (Feb. 1998).

Joint Video Team (JVT) of ISO/IEC MPEG and ITU-T VCEG, "Joint Committee Draft (CD), JVT-C167," 3rd Meeting: Fairfax, Virginia, USA, 142 pp. (May 2002).

Lee et al., "Variable Block Size Techniques for Motion Sequence Coding," *Proc. First Korea-Japan Joint Workshop on Multi-media Communications*, 12 pp. (1994).

Mehrotra et al., "Adaptive Coding Using Finite State Hierarchical Table Lookup Vector Quantization with Variable Block Sizes," 5 pp. (1996).

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," *BetaNews*, 17 pp. (Jul. 2002).

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Ribas-Corbera et al., "On the Optimal Block Size for Block-based Motion-Compensated Video Coders," *SPIE Proc. of Visual Communications and Image Processing*, vol. 3024, 12 pp. (1997).

Ribas-Corbera et al., "On the Optimal Motion Vector Accuracy for Block-based Motion-Compensated Video Coders," *Proc. SPIE Digital Video Compression*, San Jose, CA, 13 pp. (1996).

(56) References Cited

OTHER PUBLICATIONS

Sullivan et al., "The H.264/AVC Advanced Video Coding Standard: Overview and Introduction to the Fidelity Range Extensions," 21 pp. (Aug. 2004).

Sullivan, "Low-rate Coding of Moving Images Using Motion Compensation, Vector Quantization, and Quadtree Decomposition," University of California, Los Angeles, Ph.D. Thesis, 178 pp. (1991).

Wiegand, "Joint Model No. 1, Revision 1 (JM1-r1)," JVT-A003r1, 80 pp. (document marked "Generated: Jan. 18, 2002").

Wien et al., "16 Bit Adaptive Block size Transforms," JVT-C107r1, 54 pp.

Wien et al., "ABT Coding Elements," ITU-T VCEG-L15, 4 pp. (Jan. 2001).

Wien, "H.26L Core Experiment on Adaptive Block Transforms," International Telecommunications Union, 2 pp. [Downloaded from the World Wide Web on Nov. 11, 2002].

Wien et al., "ICT Comparison for Adaptive Block Transforms," ITU-T VCEG-L12, 6 pp. (Jan. 2001).

Wien et al., "Integer Transforms for H.26L Using Adaptive Block Transforms," ITU-T VCEG Q15-K-24, 5 pp. (Aug. 2000).

Wien, "New ABT Results Using CABAC," ITU-T VCEG-N49, 15 pp. (Sep. 2001).

Wien et al., "New Integer Transforms for H.26L," ITU-T VCEG Q15-J-41, 5 pp. (May 2000).

Wien et al., "Results of H.26L Core Experiment on Adaptive Block Transforms," ITU-T VCEG Q15-K-25, 7 pp. (Aug. 2000).

Wien et al., "Simplified Adaptive Block Transforms," ITU-T VCEG-O30, 15 pp. (Dec. 2001).

Wien, "Variable Block-Size Transforms for Hybrid Video Coding," Dissertation, 182 pp. (Feb. 2004).

Bjontegaard, "H.26L Test Model Long Term No. 5 (TML-5) draft0," q15k59d1.doc, 35 pp. (document marked Oct. 2000).

Bjontegaard, "H.26L Test Model Long Term No. 8 (TML-8) draft0," MPEG2001/M7512, 46 pp. (document marked Jul. 2001).

CCITT Recommendation T.81, "Digital Compression and Coding of Continuous-Tone Still Images," pp. 1-20, H-1-H-6 (1992).

Fernandez I Ubiergo, "Lossless Region-based Multispectral Image Compression," *6th Int'l Conf. on Image Processing and its Applications*, vol. 1, 5 pp. (1997).

Guenter et al., "Motion Compensated Compression of Computer Animation Frames," *Proc. SIGGRAPH 93*, 8 pp. (1993).

Heising et al., "Video Coding Using Spatial Extrapolation Based Motion Field Segmentation," *IEEE Int. Conf. Image Processing*, vol. 2, 4 pp. (1996).

Liang et al., "Fast Multiplierless Approximation of the DCT with the Lifting Scheme," *Proc. SPIE Apps. of Digital Image Processing XXIII*, 12 pp. (Aug. 2000).

Pennebaker et al., "JPEG: Still Image Data Compression Standard," Van Nostrand Reinhold, New York, pp. vii-xi, 92-93, 109-116, 182-185, 190-198, 257,259, 332-333, 631 (1993).

Study Group 16—Contribution 999, "Draft Text of Recommendation H.263 Version 2 ('H.263+') for Decision," International Telecommunication Union, 17 pp. (1997).

Tseng et al., "Compatible Video Coding of Stereoscopic Sequences Using MPEG-2's Scalability and Interlaced Structure," *Int'l Workshop on HDTV '94*, Torino, Italy, 10 pp. (1994).

Wang et al., "Lossless Wavelet Coder with Adaptive Orientational Prediction," TENCON '99, 3 pp. (1999).

\* cited by examiner

Figure 1, prior art
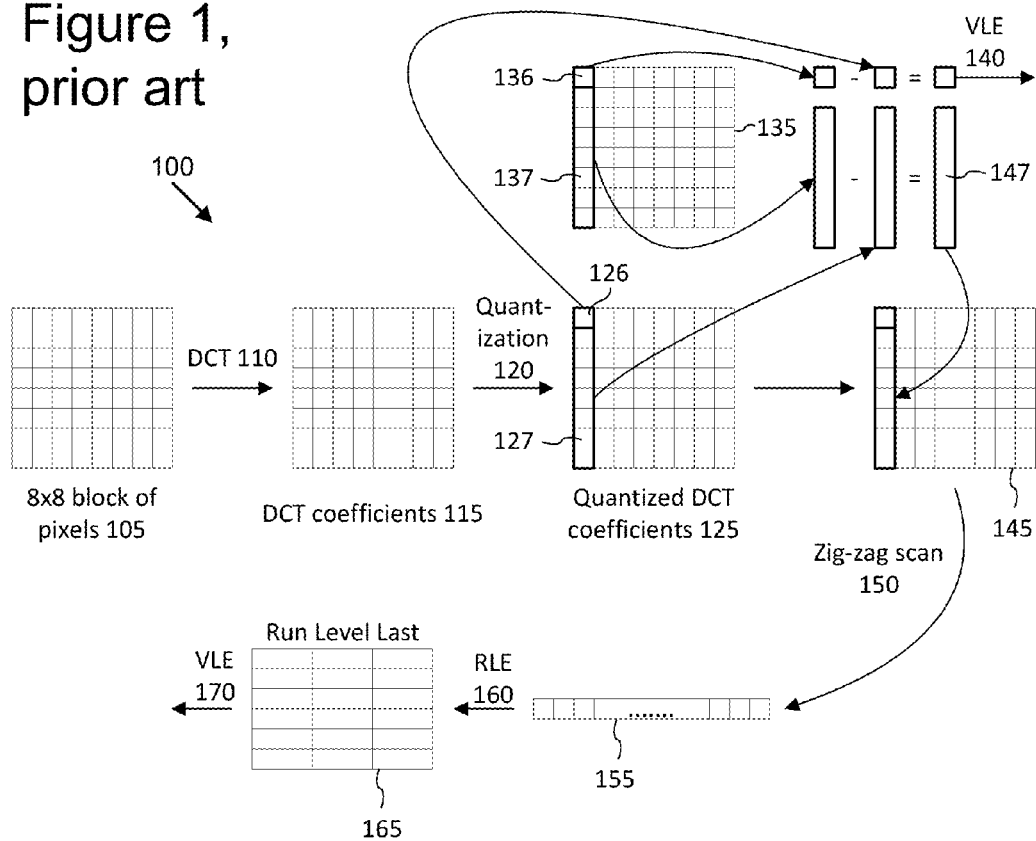
Figure 2, prior art
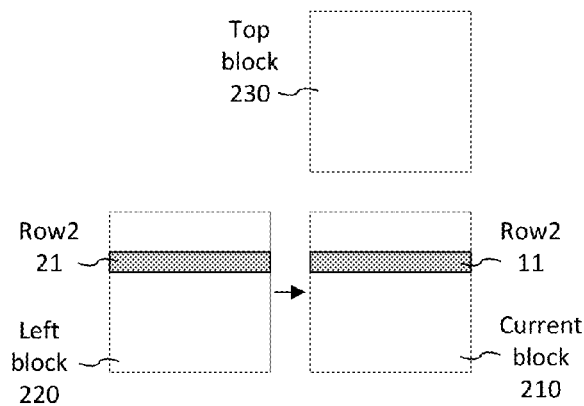

Figure 3, prior art
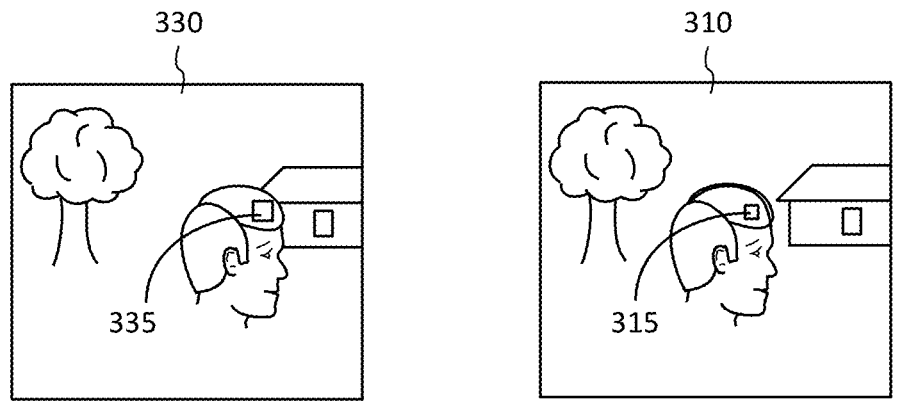
Figure 6
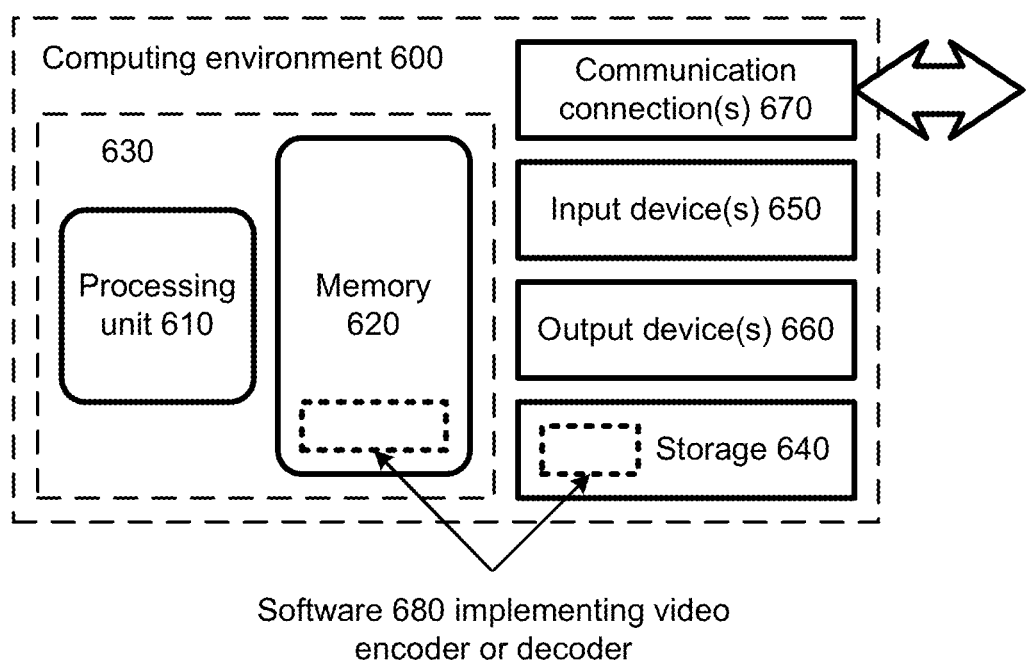

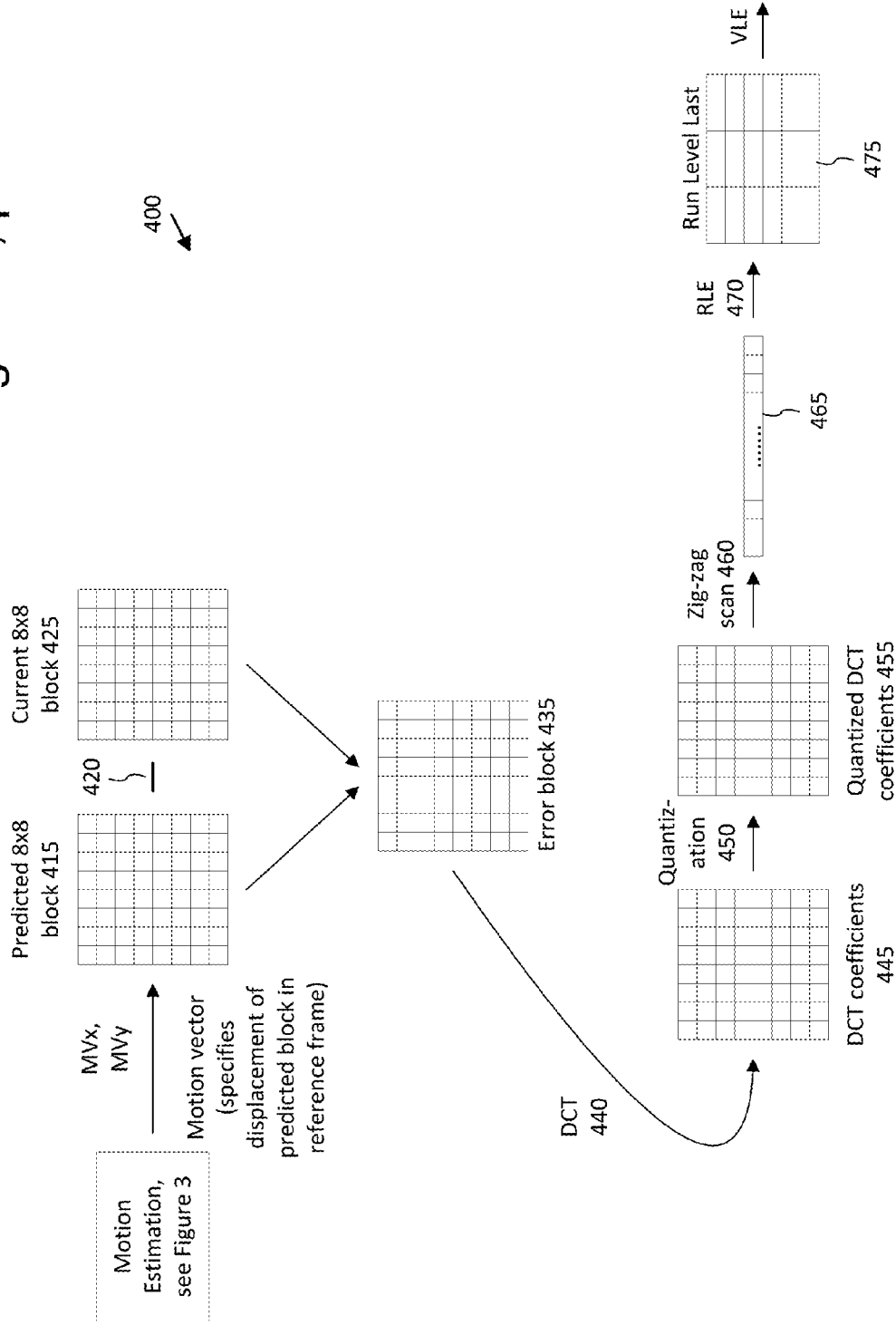
Figure 4, prior art

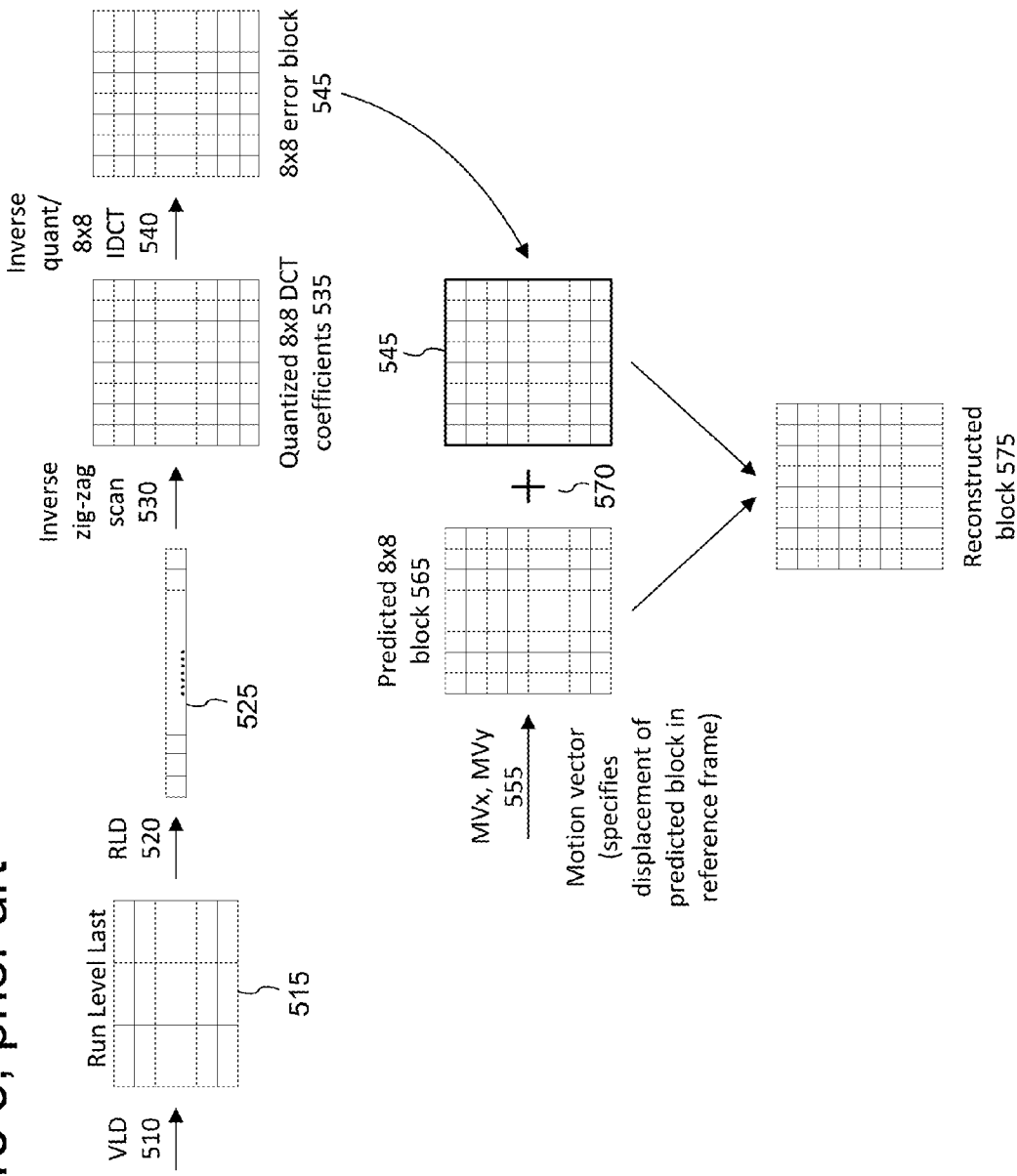
Figure 5, prior art

DC: 1
AC1 through AC7: 0

Reconstructed with regular
frequency transform

DC: 1
AC1 through AC7: 0

Reconstructed with re-oriented
inverse frequency transform

Figure 14a

*mode = 1:*
    pCurr[i][j] = pTop[(2*i + j + 2 > 15) ? 15 : 2*i + j + 2]
*mode = 2:*
    pCurr[i][j] = pTop[i + j + 1]
*mode = 3:*
    pCurr[i][j] = pTop[floor((i + 1)/2) + j]
*mode = 4:*
    pCurr[i][j] = floor((pTop[j] + pTop[j + 16] + 1)/2)
*mode = 5:*
    if (j >= floor((i - 1)/2))
        pCurr[i][j] = pTop[j − floor((i + 1)/2)]
    else
        pCurr[i][j] = pLeft[i − 1 − 2*j]
*mode = 6:*
    if (j > i)
        pCurr[i][j] = pTop[j − i - 1]
    else
        pCurr[i][j] = pLeft[i − j]
*mode = 7:*
    if (j > 2*i + 1)
        pCurr[i][j] = floor((pTop[j−2*i-2] + pTop[j−2*i−1] + 1)/2)
    else
        pCurr[i][j] = pLeft[floor(j/2) − i]
*mode = 8:*
    pCurr[i][j] = floor((pLeft[i + 1] + pLeft[i + 9] + 1)/2)
*mode = 9:*
    if (i + j < 6)
        pCurr[i][j] = pLeft[i + j + 2]
    else
        pCurr[i][j] = pLeft[8]

*mode = 10: blended horizontal continuity*
    pCurr[i][j] = floor((pLeft[i + 1]*(8 − j) + pTop[j]*j + 4)/8)
*mode = 11: blended vertical continuity*
    pCurr[i][j] = floor((pLeft[i + 1]*i + pTop[j]*(8 − i) + 4)/8)

Figure 14c

```
for (int i = 0; i < 8; i++) {
    int ll = (i < 4) ? 8 : 4 + i;
    sl[0] = sl[1] = st[0] = st[1] = 0;

for (int k = 0; k < ll; k++) {
        int diff = abs(k - i);
        int wt = 4 - (diff >> 1);
        st[diff & 1] += ((int) pTop[k]) << wt;
        if (k < 8)
            sl[diff & 1] += ((int) pLeft[k + 1]) << wt;

k++;
        diff = abs(k - i);
        wt = 4 - (diff >> 1);
        st[diff & 1] += ((int) pTop[k]) << wt;
        if (k < 8)
            sl[diff & 1] += ((int) pLeft[k + 1]) << wt;
    } pTopSum[i]  = st[0] + ((st[1] * 181 + 128) >> 8);
    pLeftSum[i] = sl[0] + ((sl[1] * 181 + 128) >> 8);
}
```

```
pWtsT =
    640  669  708  748  792  760  808  772
    480  537  598  661  719  707  768  745
    354  416  488  564  634  642  716  706
    257  316  388  469  543  571  655  660
    198  250  317  395  469  507  597  616
    161  206  266  340  411  455  548  576
    122  159  211  276  341  389  483  520
    110  144  193  254  317  366  458  499 pWtsL =
    640  480  354  257  198  143  101   72
    669  537  416  316  250  185  134   97
    708  598  488  388  317  241  179  132
    748  661  564  469  395  311  238  180
    792  719  634  543  469  380  299  231
    855  788  710  623  548  455  366  288
    972  914  842  758  682  584  483  390
   1172 1107 1028  932  846  731  611  499
```

1440

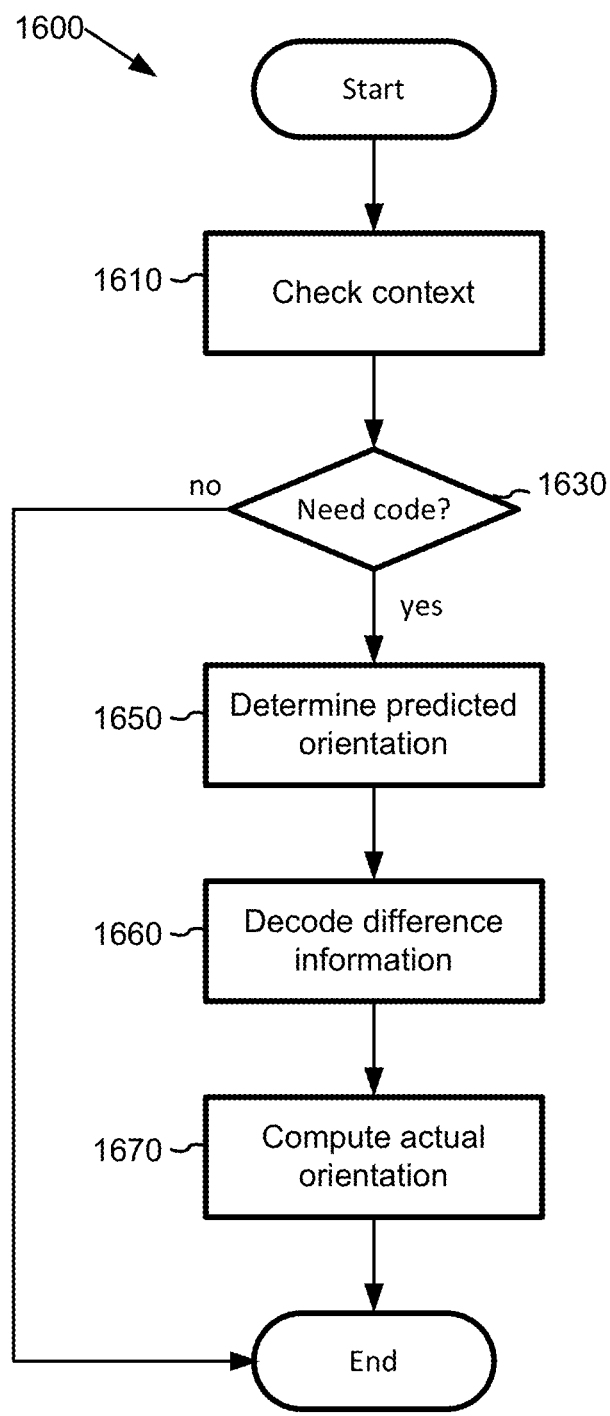

Figure 20a

/* The following data types are defined in the IDCT code:
I16 = 16 bit signed integer
I32 = 32 bit signed integer */

/* The following integer constants are used in the IDCT code */
W1 = 2841
W2 = 2676
W3 = 2408
W5 = 1609
W6 = 1108
W7 = 565

```
RowIDCT_8Point (I16* input, I16* output)
{
        I32 x0, x1, x2, x3, x4, x5, x6, x7, x8;

x0 = ((I32) input [0] << 11) + 128;
        x1 = (I32) input [4] << 11;
        x2 = input [6];
        x3 = input [2];
        x4 = input [1];
        x5 = input [7];
        x6 = input [5];
        x7 = input [3];

/* first stage */
        x8 = W7 * (x4 + x5);
        x4 = x8 + (W1 – W7) * x4;
        x5 = x8 - (W1 + W7) * x5;
        x8 = W3 * (x6 + x7);
        x6 = x8 – (W3 – W5) * x6;
        x7 = x8 – (W3 + W5) * x7;

/* second stage */
        x8 = x0 + x1;
        x0 = x0 – x1;
        x1 = W6 * (x3 + x2);
        x2 = x1 – (W2 + W6) * x2;
        x3 = x1 + (W2 - W6) * x3;
        x1 = x4 + x6;
        x4 = x4 – x6;
        x6 = x5 + x7;
        x5 = x5 – x7;
```

Figure 20b (a) ↓

/* third stage */
x7 = x8 + x3;
x8 = x8 − x3;
x3 = x0 + x2;
x0 = x0 − x2;
x2 = (I32) (181 * (x4 + x5) + 128) >> 8;
x4 = (I32) (181 * (x4 − x5) + 128) >> 8;

/* fourth stage */
output [0] = (I16) ((x7 + x1) >> 8);
output [1] = (I16) ((x3 + x2) >> 8);
output [2] = (I16) ((x0 + x4) >> 8);
output [3] = (I16) ((x8 + x6) >> 8);
output [4] = (I16) ((x8 − x6) >> 8);
output [5] = (I16) ((x0 − x4) >> 8);
output [6] = (I16) ((x3 − x2) >> 8);
output [7] = (I16) ((x7 − x1) >> 8);
}

ColumnIDCT_8Point (I16* input, I16* output)
{
    I32 x0, x1, x2, x3, x4, x5, x6, x7, x8;

x0 = ((I32) input [0] << 8) + 8192;
    x1 = (I32) input [4] << 8;
    x2 = input [6];
    x3 = input [2];
    x4 = input [1];
    x5 = input [7];
    x6 = input [5];
    x7 = input [3];

/* first stage */
    x8 = W7 * (x4 + x5) + 4;
    x4 = (x8 + (W1 − W7) * x4) >> 3;
    x5 = (x8 − (W1 + W7) * x5) >> 3;
    x8 = W3 * (x6 + x7) + 4;
    x6 = (x8 − (W3 − W5) * x6) >> 3;
    x7 = (x8 − (W3 + W5) * x7) >> 3;

$$pBwt = \begin{pmatrix} 0 & 3811 & 487 & 506 & 135 & 173 & 61 & 42 \\ 3811 & -1084 & -135 & -135 & -42 & -61 & 0 & 0 \\ 487 & -135 & 0 & 0 & 0 & 0 & 0 & 0 \\ 506 & -135 & 0 & 0 & 0 & 0 & 0 & 0 \\ 135 & -42 & 0 & 0 & -42 & 0 & 0 & 0 \\ 173 & -61 & 0 & 0 & 0 & 0 & 0 & 0 \\ 61 & 0 & 0 & 0 & 0 & 0 & 0 & 0 \\ 42 & 0 & 0 & 0 & 0 & 0 & 0 & 0 \end{pmatrix}$$

```
int gaReconstructionLevels[] = {
    256, 256, 256, 256, 256, 256, 259, 262, 265, 269, 272, 275, 278, 282, 285, 288,
    292, 295, 299, 303, 306, 310, 314, 317, 321, 325, 329, 333, 337, 341, 345, 349,
    353, 358, 362, 366, 371, 375, 379, 384, 389, 393, 398, 403, 408, 413, 417, 422,
    428, 433, 438, 443, 448, 454, 459, 465, 470, 476, 482, 488, 493, 499, 505, 511};
```

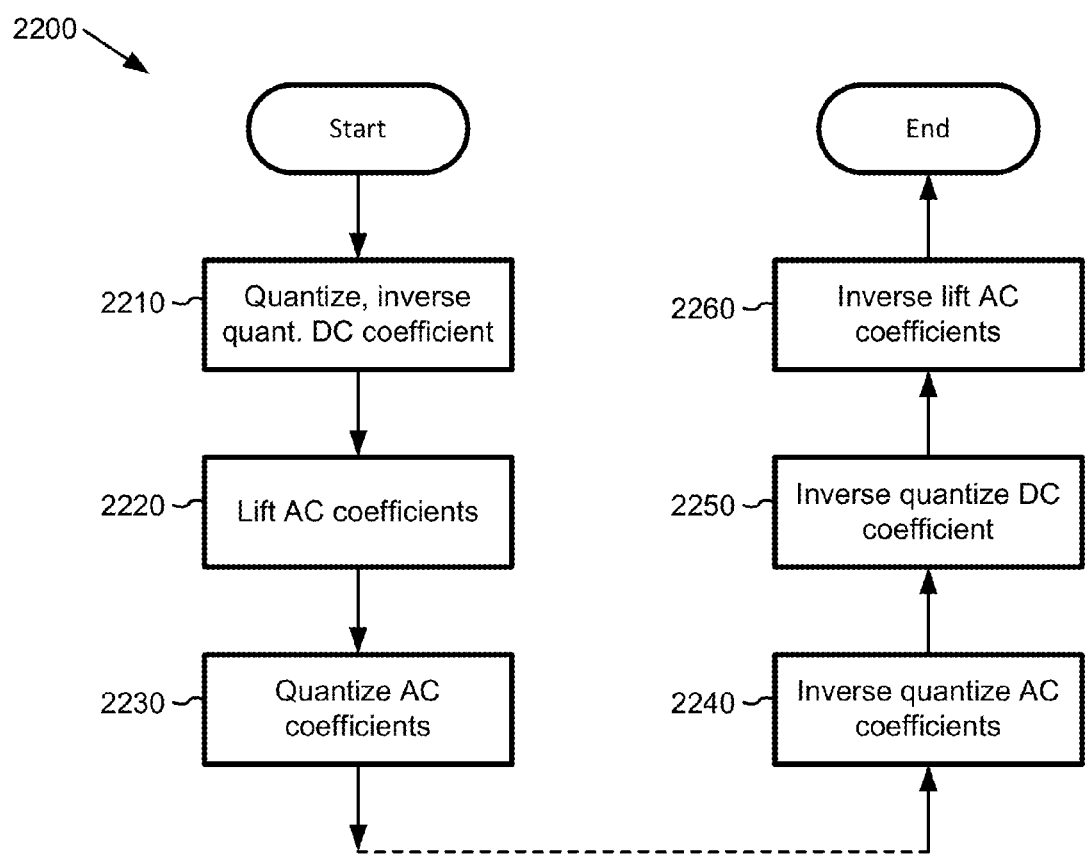

Figure 25a

| 0 | 2 | 3 | 9 | 10 | 21 | 22 | 36 |
|---|---|---|---|---|---|---|---|
| 1 | 4 | 8 | 11 | 20 | 23 | 35 | 37 |
| 5 | 7 | 12 | 19 | 24 | 34 | 38 | 49 |
| 6 | 13 | 18 | 25 | 33 | 39 | 48 | 50 |
| 14 | 16 | 26 | 32 | 40 | 47 | 51 | 58 |
| 15 | 27 | 31 | 41 | 46 | 52 | 57 | 59 |
| 17 | 29 | 42 | 44 | 53 | 55 | 60 | 62 |
| 28 | 30 | 43 | 45 | 54 | 56 | 61 | 63 |

| 0 | 1 | 3 | 4 | 10 | 11 | 22 | 23 |
|---|---|---|---|---|---|---|---|
| 2 | 5 | 9 | 12 | 21 | 24 | 36 | 37 |
| 6 | 8 | 13 | 20 | 25 | 35 | 38 | 48 |
| 7 | 14 | 19 | 26 | 34 | 39 | 47 | 49 |
| 15 | 18 | 27 | 33 | 40 | 46 | 50 | 57 |
| 16 | 28 | 32 | 41 | 45 | 51 | 56 | 58 |
| 17 | 30 | 42 | 44 | 52 | 55 | 59 | 62 |
| 29 | 31 | 43 | 53 | 54 | 60 | 61 | 63 |

| 0 | 3 | 8 | 9 | 20 | 21 | 34 | 35 |
|---|---|---|---|---|---|---|---|
| 1 | 7 | 10 | 19 | 22 | 33 | 36 | 49 |
| 2 | 11 | 18 | 23 | 32 | 37 | 48 | 50 |
| 4 | 12 | 17 | 24 | 31 | 38 | 47 | 51 |
| 5 | 16 | 25 | 30 | 39 | 46 | 52 | 57 |
| 6 | 15 | 29 | 40 | 45 | 53 | 56 | 58 |
| 13 | 26 | 28 | 41 | 44 | 55 | 59 | 62 |
| 14 | 27 | 42 | 43 | 54 | 60 | 61 | 63 |

2503

- a, b, c, ..., p denote integer-pixel locations.
- $H_0$, $H_1$, $H_2$ denote half-pixel locations.

- Each circle denotes a pixel location in quarter-pixel units.
- I denotes an integer-pixel location.
- $H_0, ..., H_7$ denote searched half-pixel locations.
- $Q_0, ..., Q_7$ denote searched quarter-pixel locations

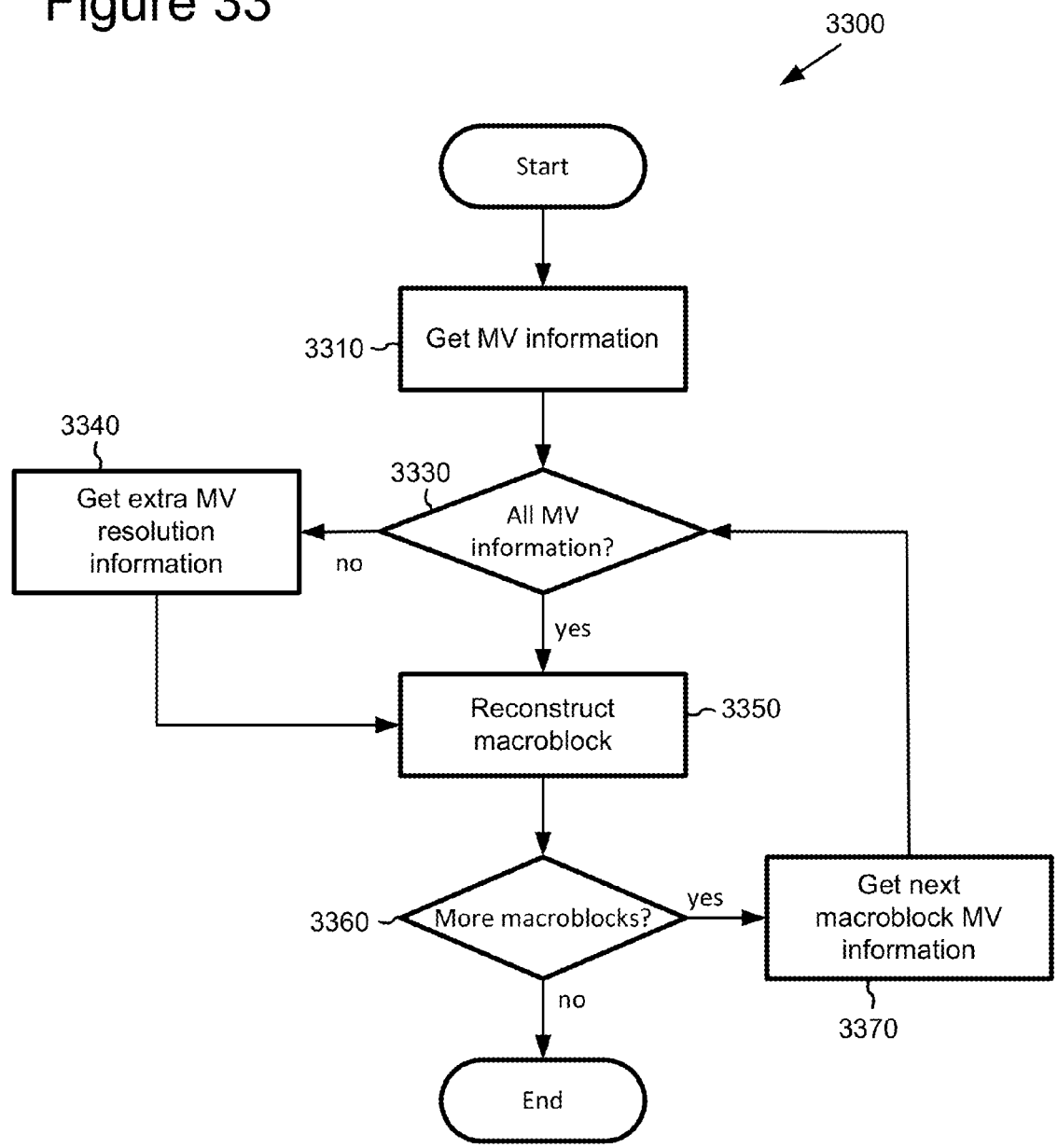

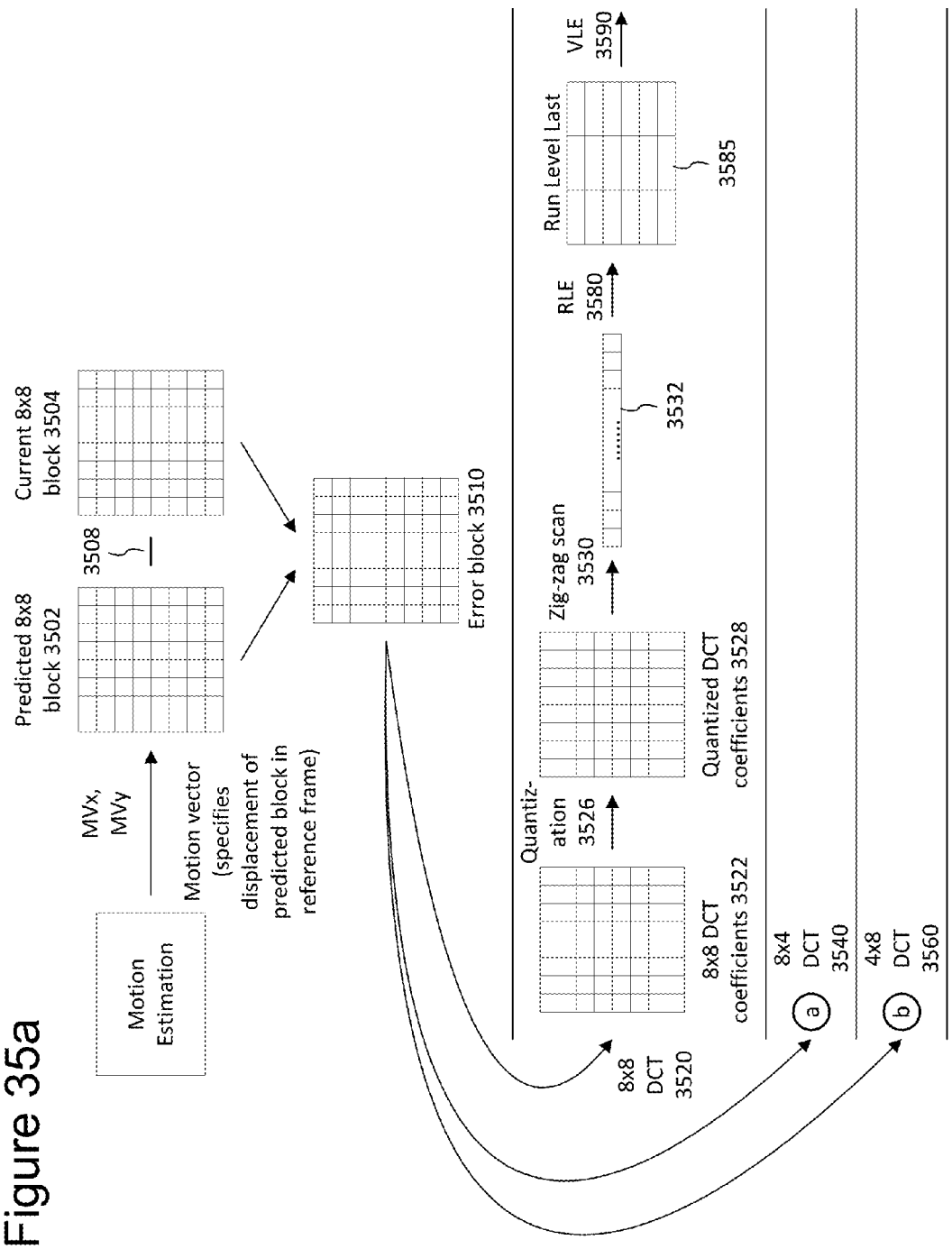

```
/* The following data types are defined in the IDCT code:
I16 = 16 bit signed integer
I32 = 32 bit signed integer */
/* The following integer constants are used in the IDCT code */
W1 = 2841
W2 = 2676
W3 = 2408
W5 = 1609
W6 = 1108
W7 = 565
W1a = 1892
W2a = 1448
W3a = 784

RowIDCT_8Point (I16* input, I16* output)
{
        I32 x0, x1, x2, x3, x4, x5, x6, x7, x8;

x0 = ((I32) input [0] << 11) + 128;
        x1 = (I32) input [4] << 11;
        x2 = input [6];
        x3 = input [2];
        x4 = input [1];
        x5 = input [7];
        x6 = input [5];
        x7 = input [3];

/* first stage */
        x8 = W7 * (x4 + x5);
        x4 = x8 + (W1 – W7) * x4;
        x5 = x8 - (W1 + W7) * x5;
        x8 = W3 * (x6 + x7);
        x6 = x8 – (W3 – W5) * x6;
        x7 = x8 – (W3 + W5) * x7;

/* second stage */
        x8 = x0 + x1;
        x0 = x0 – x1;
        x1 = W6 * (x3 + x2);
        x2 = x1 – (W2 + W6) * x2;
        x3 = x1 + (W2 - W6) * x3;
        x1 = x4 + x6;
        x4 = x4 – x6;
        x6 = x5 + x7;
        x5 = x5 – x7;
```

Figure 36b

```
                                            /* third stage */
                                            x7 = x8 + x3;
                                            x8 = x8 - x3;
                                            x3 = x0 + x2;
                                            x0 = x0 - x2;
                                            x2 = (I32) (181 * (x4 + x5) + 128) >> 8;
                                            x4 = (I32) (181 * (x4 - x5) + 128) >> 8;

/* fourth stage */
                                            output [0] = (I16) ((x7 + x1) >> 8);
                                            output [1] = (I16) ((x3 + x2) >> 8);
                                            output [2] = (I16) ((x0 + x4) >> 8);
                                            output [3] = (I16) ((x8 + x6) >> 8);
                                            output [4] = (I16) ((x8 - x6) >> 8);
                                            output [5] = (I16) ((x0 - x4) >> 8);
                                            output [6] = (I16) ((x3 - x2) >> 8);
                                            output [7] = (I16) ((x7 - x1) >> 8);
                                          }
          ColumnIDCT_8Point (I16* input, I16* output)
          {
                                            I32 x0, x1, x2, x3, x4, x5, x6, x7, x8;

x0 = ((I32) input [0] << 8) + 8192;
                                            x1 = (I32) input [4] << 8;
                                            x2 = input [6];
                                            x3 = input [2];
                                            x4 = input [1];
                                            x5 = input [7];
                                            x6 = input [5];
                                            x7 = input [3];

/* first stage */
                                            x8 = W7 * (x4 + x5) + 4;
                                            x4 = (x8 + (W1 - W7) * x4) >> 3;
                                            x5 = (x8 - (W1 + W7) * x5) >> 3;
                                            x8 = W3 * (x6 + x7) + 4;
                                            x6 = (x8 - (W3 - W5) * x6) >> 3;
                                            x7 = (x8 - (W3 + W5) * x7) >> 3;
```

Figure 36c

```
/* second stage */
x8 = x0 + x1;
x0 = x0 - x1;
x1 = W6 * (x3 + x2) + 4;
x2 = (x1 - (W2 + W6) * x2) >> 3;
x3 = (x1 + (W2 - W6) * x3) >> 3;
x1 = x4 + x6;
x4 = x4 - x6;
x6 = x5 + x7;
x5 = x5 - x7;

/* third stage */
x7 = x8 + x3;
x8 = x8 - x3;
x3 = x0 + x2;
x0 = x0 - x2;
x2 = (181 * (x4 + x5) + 128) >> 8;
x4 = (181 * (x4 - x5) + 128) >> 8;

/* fourth stage */
output [0] = (I16) ((x7 + x1) >> 14);
output [1] = (I16) ((x3 + x2) >> 14);
output [2] = (I16) ((x0 + x4) >> 14);
output [3] = (I16) ((x8 + x6) >> 14);
output [4] = (I16) ((x8 - x6) >> 14);
output [5] = (I16) ((x0 - x4) >> 14);
output [6] = (I16) ((x3 - x2) >> 14);
output [7] = (I16) ((x7 - x1) >> 14);
}

RowIDCT_4Point (I16* input, I16* output)
{
        I32 x0, x1, x2, x3;

x0 = input [0];
        x1 = input [1];
        x2 = input [2];
        x3 = input [3];
```

```
        x0 = (x0 + x2) * W2a;
        x1 = (x0 - x2) * W2a;
        x2 = x1 * W1a + x3 * W3a;
        x3 = x1 * W3a - x3 * W1a;

output [0] = (I16) ((x0 + x2 + 64) >> 7);
        output [1] = (I16) ((x1 + x3 + 64) >> 7);
        output [2] = (I16) ((x1 − x3 + 64) >> 7);
        output [3] = (I16) ((x0 − x2 + 64) >> 7);
}

ColumnIDCT_4Point (I16* input, I16* output)
{
        I32 x0, x1, x2, x3;

x0 = input [0];
        x1 = input [1];
        x2 = input [2];
        x3 = input [3];

x0 = (x0 + x2) * W2a;
        x1 = (x0 - x2) * W2a;
        x2 = x1 * W1a + x3 * W3a;
        x3 = x1 * W3a − x2 * W1a;

output [0] = (I16) ((x0 + x2 + 32768) >> 16);
        output [1] = (I16) ((x1 + x3 + 32768) >> 16);
        output [2] = (I16) ((x1 − x3 + 32768) >> 16);
        output [3] = (I16) ((x0 − x2 + 32768) >> 16);
}
```

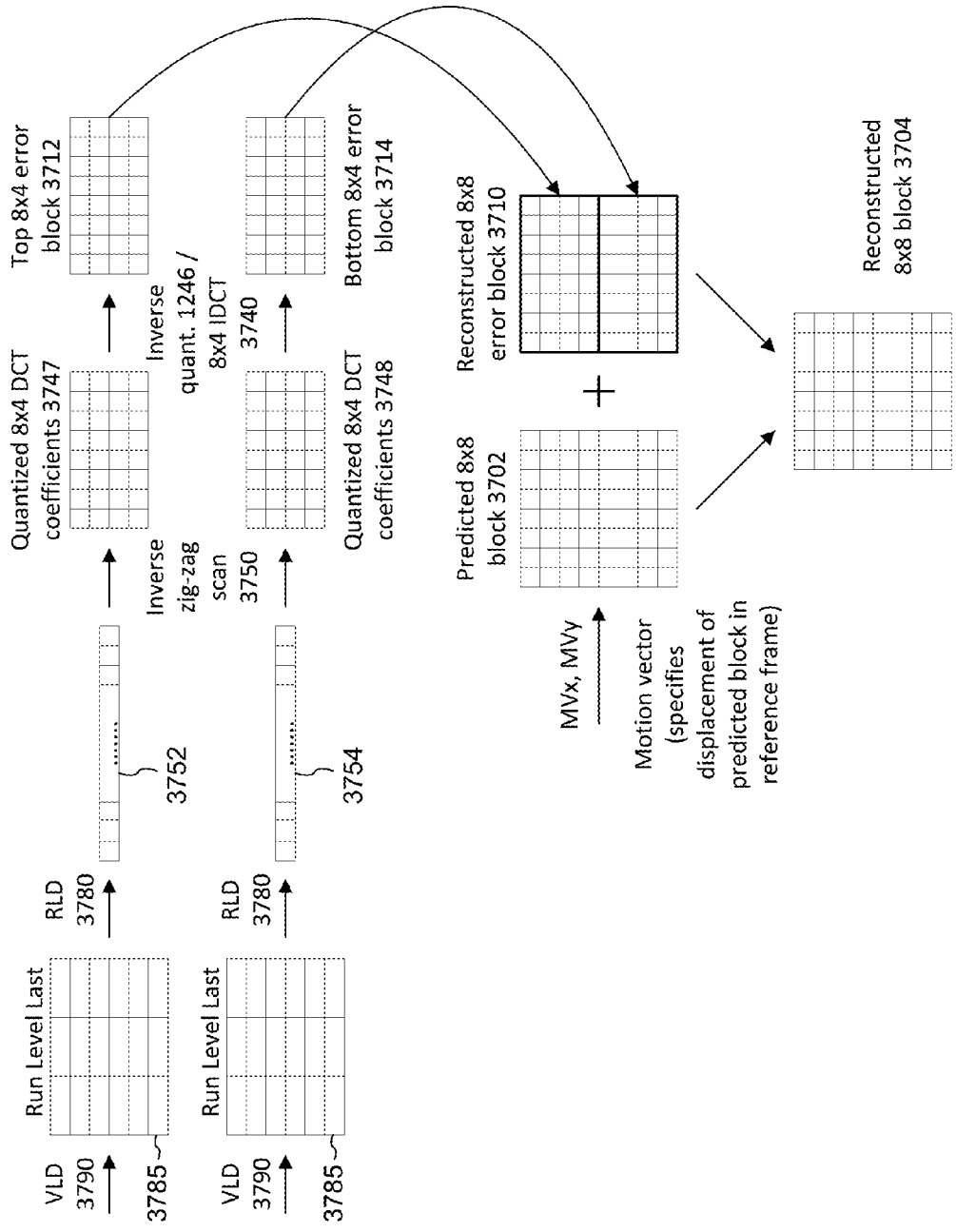

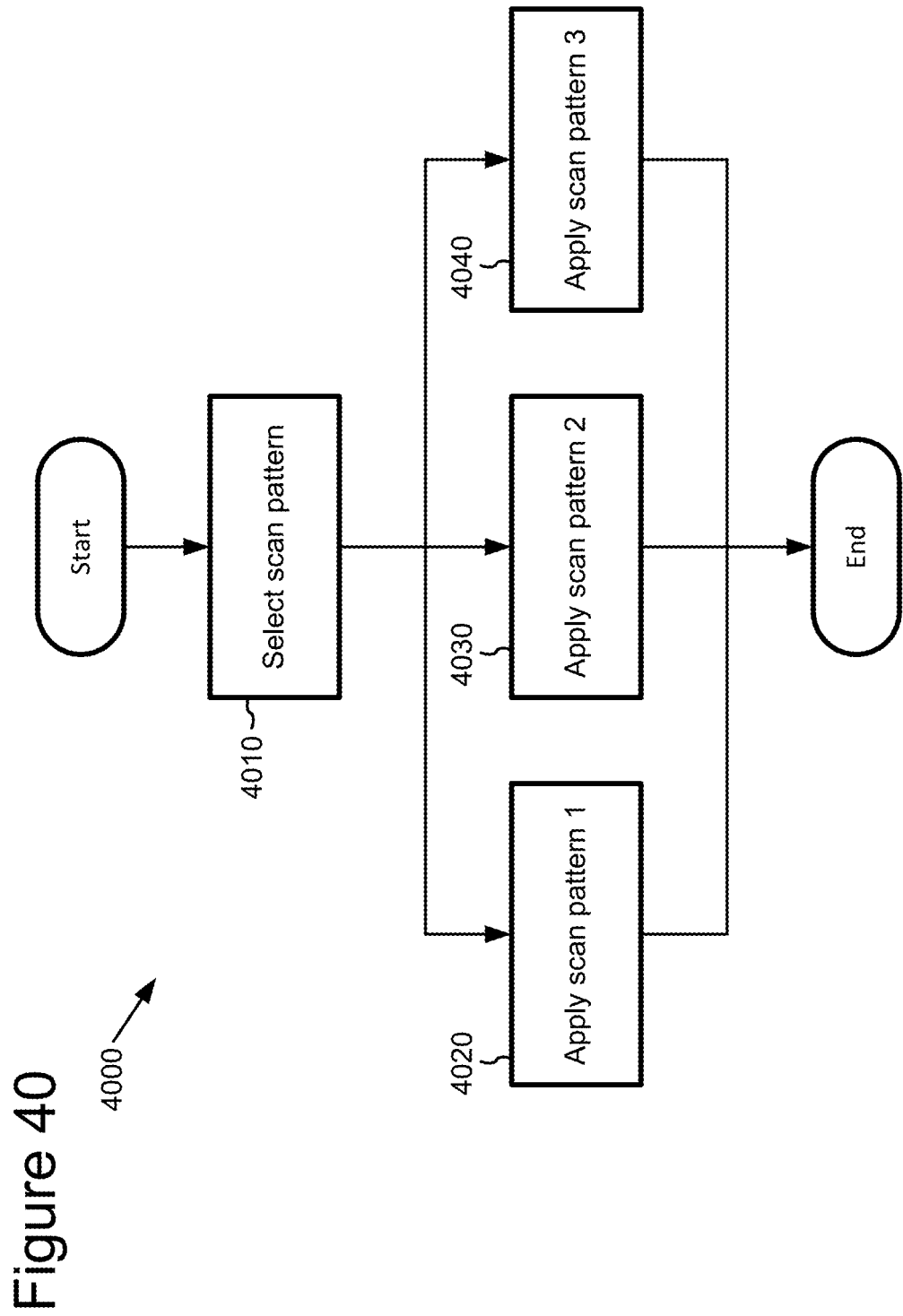

Figure 41a

| 0  | 2  | 3  | 9  | 10 | 23 | 24 | 38 |
|----|----|----|----|----|----|----|----|
| 1  | 4  | 8  | 11 | 22 | 25 | 37 | 39 |
| 5  | 7  | 12 | 21 | 26 | 36 | 40 | 51 |
| 6  | 13 | 20 | 27 | 35 | 41 | 50 | 52 |
| 14 | 19 | 28 | 34 | 42 | 49 | 53 | 60 |
| 15 | 18 | 33 | 43 | 48 | 54 | 59 | 61 |
| 16 | 29 | 32 | 44 | 47 | 55 | 58 | 62 |
| 17 | 30 | 31 | 45 | 46 | 56 | 57 | 63 |

| 0  | 1  | 2  | 4  | 8  | 14 | 21 | 27 |
|----|----|----|----|----|----|----|----|
| 3  | 5  | 6  | 9  | 13 | 17 | 24 | 29 |
| 7  | 10 | 12 | 15 | 18 | 22 | 25 | 30 |
| 11 | 16 | 19 | 20 | 23 | 26 | 28 | 31 |

| 0  | 2  | 7  | 19 |
|----|----|----|----|
| 1  | 4  | 9  | 22 |
| 3  | 6  | 12 | 24 |
| 5  | 10 | 15 | 26 |
| 8  | 14 | 18 | 28 |
| 11 | 17 | 23 | 29 |
| 13 | 20 | 25 | 30 |
| 16 | 21 | 27 | 31 |

4103

8th, 16th, 24th, etc. vertical line

8th, 16th, 24th, etc. horizontal line

Figure 50

```
a0 = (2*(P3 - P6) - 5*(P4 – P5) + 4) >> 3
if (|a0| < PQUANT) {
    a1 = (2*(P1 - P4) - 5*(P2 - P3) + 4) >> 3
    a2 = (2*(P5 - P8) - 5*(P6 - P7) + 4) >> 3
    a3 = min(|a1|, |a2|)
    if (a3 < |a0|)
    {
        clip = (P4 – P5)/2
        if (clip > 0)
        {
            if (a0 < 0){
                d = 5*(|a0| -a3) >> 3
                if (d > clip)
                    d = clip
                P4 = P4 - d
                P5 = P5 + d
            }
        }
        else if (clip < 0)
        {
            if (a0 >= 0){
                d = (5*(a3 - |a0|) + 7) >>3
                if (d < clip)
                    d = clip
                P4 = P4 - d
                P5 = P5 + d
            }
        }
    }
}
```

5000

VIDEO CODING / DECODING WITH RE-ORIENTED TRANSFORMS AND SUB-BLOCK TRANSFORM SIZES

RELATED APPLICATION INFORMATION

The present application is a continuation of Ser. No. 11/890,059, filed Aug. 3, 2007, which is a divisional of U.S. patent application Ser. No. 10/322,352, filed Dec. 17, 2002, which claims the benefit of U.S. Provisional Patent Application Ser. No. 60/341,674, entitled "Techniques and Tools for Video Encoding and Decoding," filed Dec. 17, 2001, the disclosure of which is incorporated by reference. The following concurrently filed U.S. patent applications relate to the present application: 1) U.S. patent application Ser. No. 10/322,171, entitled, "Spatial Extrapolation of Pixel Values in Intraframe Video Coding and Decoding," filed Dec. 17, 2002; 2) U.S. patent application Ser. No. 10/322,351, entitled, "Multi-Resolution Motion Estimation and Compensation," filed Dec. 17, 2002; and 3) U.S. patent application Ser. No. 10/322,383, entitled, "Motion Compensation Loop with Filtering," filed Dec. 17, 2002.

TECHNICAL FIELD

The technical field of the following disclosure is techniques and tools for video encoding and decoding. In described embodiments, a video encoder incorporates techniques that improve the efficiency of intraframe or interframe coding, and a decoder incorporates techniques that improve the efficiency of intraframe or interframe decoding.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bitrate, of a typical raw digital video sequence can be 5 million bits/second or more.

Most computers and computer networks lack the resources to process raw digital video. For this reason, engineers use compression (also called coding or encoding) to reduce the bitrate of digital video. Compression can be lossless, in which quality of the video does not suffer but decreases in bitrate are limited by the complexity of the video. Or, compression can be lossy, in which quality of the video suffers but decreases in bitrate are more dramatic. Decompression reverses compression.

In general, video compression techniques include intraframe compression and interframe compression. Intraframe compression techniques compress individual frames, typically called I-frames, or key frames. Interframe compression techniques compress frames with reference to preceding and/or following frames, and are called typically called predicted frames, P-frames, or B-frames.

Microsoft Corporation's Windows Media Video, Version 7 ["WMV7"] includes a video encoder and a video decoder. The WMV7 encoder uses intraframe and interframe compression, and the WMV7 decoder uses intraframe and interframe decompression.

A. Intraframe Compression in WMV7

FIG. 1 illustrates block-based intraframe compression (100) of a block (105) of pixels in a key frame in the WMV7 encoder. A block is a set of pixels, for example, an 8×8 arrangement of pixels. The WMV7 encoder splits a key video frame into 8×8 blocks of pixels and applies an 8×8 Discrete Cosine Transform ["DCT"] (110) to individual blocks such as the block (105). A DCT is a type of frequency transform that converts the 8×8 block of pixels (spatial information) into an 8×8 block of DCT coefficients (115), which are frequency information. The DCT operation itself is lossless or nearly lossless. Compared to the original pixel values, however, the DCT coefficients are more efficient for the encoder to compress since most of the significant information is concentrated in low frequency coefficients (conventionally, the upper left of the block (115)) and many of the high frequency coefficients (conventionally, the lower right of the block (115)) have values of zero or close to zero.

The encoder then quantizes (120) the DCT coefficients, resulting in an 8×8 block of quantized DCT coefficients (125). For example, the encoder applies a uniform, scalar quantization step size to each coefficient, which is analogous to dividing each coefficient by the same value and rounding. For example, if a DCT coefficient value is 163 and the step size is 10, the quantized DCT coefficient value is 16. Quantization is lossy. The reconstructed DCT coefficient value will be 160, not 163. Since low frequency DCT coefficients tend to have higher values, quantization results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients (125) for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient (126) as a differential from the DC coefficient (136) of a neighboring 8×8 block, which is a previously encoded neighbor (e.g., top or left) of the block being encoded. (FIG. 1 shows a neighbor block (135) that is situated to the left of the block being encoded in the frame.) The encoder entropy encodes (140) the differential.

The entropy encoder can encode the left column or top row of AC coefficients as a differential from a corresponding column or row of the neighboring 8×8 block. FIG. 1 shows the left column (127) of AC coefficients encoded as a differential (147) from the left column (137) of the neighboring (to the left) block (135). The differential coding increases the chance that the differential coefficients have zero values. The remaining AC coefficients are from the block (125) of quantized DCT coefficients.

The encoder scans (150) the 8×8 block (145) of predicted, quantized AC DCT coefficients into a one-dimensional array (155) and then entropy encodes the scanned AC coefficients using a variation of run length coding (160). The encoder selects an entropy code from one or more run/level/last tables (165) and outputs the entropy code.

A key frame contributes much more to bitrate than a predicted frame. In low or mid-bitrate applications, key frames are often critical bottlenecks for performance, so efficient compression of key frames is critical.

FIG. 2 illustrates a disadvantage of intraframe compression such as shown in FIG. 1. In particular, exploitation of redundancy between blocks of the key frame is limited to prediction of a subset of frequency coefficients (e.g., the DC coefficient and the left column (or top row) of AC coefficients) from the left (220) or top (230) neighboring block of a block (210). The DC coefficient represents the average of the block, the left column of AC coefficients represents the averages of the rows of a block, and the top row represents the averages of the columns. In effect, prediction of DC and AC coefficients as in WMV7 limits extrapolation to the row-wise (or column-wise) average signals of the left (or top) neighboring block. For a particular row (221) in the left block (220), the AC coefficients in the left DCT coefficient column for the left block (220) are used to predict the entire corresponding row (211) of the block (210). The disadvantages of this prediction include:

1) Since the prediction is based on averages, the far edge of the neighboring block has the same influence on the predictor as the adjacent edge of the neighboring block, whereas intuitively the far edge should have a smaller influence.

2) Only the average pixel value across the row (or column) is extrapolated.

3) Diagonally oriented edges or lines that propagate from either predicting block (top or left) to the current block are not predicted adequately.

4) When the predicting block is to the left, there is no enforcement of continuity between the last row of the top block and the first row of the extrapolated block.

B. Interframe Compression in WMV7

Interframe compression in the WMV7 encoder uses block-based motion compensated prediction coding followed by transform coding of the residual error. FIGS. 3 and 4 illustrate the block-based interframe compression for a predicted frame in the WMV7 encoder. In particular, FIG. 3 illustrates motion estimation for a predicted frame (310) and FIG. 4 illustrates compression of a prediction residual for a motion-estimated block of a predicted frame.

The WMV7 encoder splits a predicted frame into 8×8 blocks of pixels. Groups of 4 8×8 blocks form macroblocks. For each macroblock, a motion estimation process is performed. The motion estimation approximates the motion of the macroblock of pixels relative to a reference frame, for example, a previously coded, preceding frame. In FIG. 3, the WMV7 encoder computes a motion vector for a macroblock (315) in the predicted frame (310). To compute the motion vector, the encoder searches in a search area (335) of a reference frame (330). Within the search area (335), the encoder compares the macroblock (315) from the predicted frame (310) to various candidate macroblocks in order to find a candidate macroblock that is a good match. The encoder can check candidate macroblocks every pixel or every ½ pixel in the search area (335), depending on the desired motion estimation resolution for the encoder. Other video encoders check at other increments, for example, every ¼ pixel. For a candidate macroblock, the encoder checks the difference between the macroblock (315) of the predicted frame (310) and the candidate macroblock and the cost of encoding the motion vector for that macroblock. After the encoder finds a good matching macroblock, the block matching process ends. The encoder outputs the motion vector (entropy coded) for the matching macroblock so the decoder can find the matching macroblock during decoding. When decoding the predicted frame (310), a decoder uses the motion vector to compute a prediction macroblock for the macroblock (315) using information from the reference frame (330). The prediction for the macroblock (315) is rarely perfect, so the encoder usually encodes 8×8 blocks of pixel differences (also called the error or residual blocks) between the prediction macroblock and the macroblock (315) itself.

Motion estimation and compensation are effective compression techniques, but various previous motion estimation/compensation techniques (as in WMV7 and elsewhere) have several disadvantages, including:

1) The resolution of the motion estimation (i.e., pixel, ½ pixel, ¼ pixel increments) does not adapt to the video source. For example, for different qualities of video source (clean vs. noisy), the video encoder uses the same resolution of motion estimation, which can hurt compression efficiency.

2) For ¼ pixel motion estimation, the search strategy fails to adequately exploit previously completed computations to speed up searching.

3) For ¼ pixel motion estimation, the search range is too large and inefficient. In particular, the horizontal resolution is the same as the vertical resolution in the search range, which does not match the motion characteristics of many video signals.

4) For ¼ pixel motion estimation, the representation of motion vectors is inefficient to the extent bit allocation for horizontal movement is the same as bit allocation for vertical resolution.

FIG. 4 illustrates the computation and encoding of an error block (435) for a motion-estimated block in the WMV7 encoder. The error block (435) is the difference between the predicted block (415) and the original current block (425). The encoder applies a DCT (440) to error block (435), resulting in 8×8 block (445) of coefficients. Even more than was the case with DCT coefficients for pixel values, the significant information for the error block (435) is concentrated in low frequency coefficients (conventionally, the upper left of the block (445)) and many of the high frequency coefficients have values of zero or close to zero (conventionally, the lower right of the block (445)).

The encoder then quantizes (450) the DCT coefficients, resulting in an 8×8 block of quantized DCT coefficients (455). The quantization step size is adjustable. Again, since low frequency DCT coefficients tend to have higher values, quantization results in loss of precision, but not complete loss of the information for the coefficients. On the other hand, since high frequency DCT coefficients tend to have values of zero or close to zero, quantization of the high frequency coefficients results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block (455) of quantized DCT coefficients for entropy encoding. The encoder scans (460) the 8×8 block (455) into a one dimensional array (465) with 64 elements, such that coefficients are generally ordered from lowest frequency to highest frequency, which typical creates long runs of zero values.

The encoder entropy encodes the scanned coefficients using a variation of run length coding (470). The encoder selects an entropy code from one or more run/level/last tables (475) and outputs the entropy code.

FIG. 5 shows the decoding process (500) for an inter-coded block. Due to the quantization of the DCT coefficients, the reconstructed block (575) is not identical to the corresponding original block. The compression is lossy.

In summary of FIG. 5, a decoder decodes (510, 520) entropy-coded information representing a prediction residual using variable length decoding and one or more run/level/last tables (515). The decoder inverse scans (530) a one-dimensional array (525) storing the entropy-decoded information into a two-dimensional block (535). The decoder inverse quantizes and inverse discrete cosine transforms (together, 540) the data, resulting in a reconstructed error block (545). In a separate path, the decoder computes a predicted block (565) using motion vector information (555) for displacement from a reference frame. The decoder combines (570) the predicted block (555) with the reconstructed error block (545) to form the reconstructed block (575).

The amount of change between the original and reconstructed frame is termed the distortion and the number of bits required to code the frame is termed the rate. The amount of distortion is roughly inversely proportional to the rate. In other words, coding a frame with fewer bits (greater compression) will result in greater distortion and vice versa. One of the goals of a video compression scheme is to try to improve the rate-distortion—in other words to try to achieve the same distortion using fewer bits (or the same bits and lower distortion).

Compression of prediction residuals as in WMV7 can dramatically reduce bitrate while slightly or moderately affecting quality, but the compression technique is less than optimal in some circumstances. The size of the frequency transform is the size of the prediction residual block (e.g., an 8×8 DCT for an 8×8 prediction residual). In some circumstances, this fails to exploit localization of error within the prediction residual block.

C. Post-Processing with a Deblocking Filter in WMV7

For block-based video compression and decompression, quantization and other lossy processing stages introduce distortion that commonly shows up as blocky artifacts—perceptible discontinuities between blocks.

To reduce the perceptibility of blocky artifacts, the WMV7 decoder can process reconstructed frames with a deblocking filter. The deblocking filter smoothes the boundaries between blocks.

While the deblocking filter in WMV7 improves perceived video quality, it has several disadvantages. For example, the smoothing occurs only on reconstructed output in the decoder. Therefore, prediction processes such as motion estimation cannot take advantage of the smoothing. Moreover, the smoothing by the post-processing filter can be too extreme.

D. Standards for Video Compression and Decompression

Aside from WMV7, several international standards relate to video compression and decompression. These standards include the Motion Picture Experts Group ["MPEG"] 1, 2, and 4 standards and the H.261, H.262, and H.263 standards from the International Telecommunication Union ["ITU"]. Like WMV7, these standards use a combination of intraframe and interframe compression, although the standards typically differ from WMV7 in the details of the compression techniques used. For additional detail about the standards, see the standards' specifications themselves.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for video encoding and decoding. The various techniques and tools can be used in combination or independently.

For a first group of techniques and tools described herein, the detailed description is directed to various techniques and tools for spatial extrapolation of pixel values in intraframe video encoding and decoding. Spatial extrapolation of pixel values in intraframe video encoding and decoding addresses several of the disadvantages of intraframe compression according to the prior art, improving the efficiency of the intraframe encoding and decoding. The various techniques and tools can be used in combination or independently.

According to a first set of techniques and tools in the first group, a video encoder encodes a block of pixels in a frame using spatial extrapolation from pixels in one or more neighboring blocks in the frame, which improves the efficiency of intraframe coding. The video encoder selects the orientation of the extrapolation from any of multiple available directions. For example, for a current block in a frame, the video encoder extrapolates from sets of values within blocks to the left, top-left, and/or top according to one of thirteen extrapolation patterns, which include horizontal, vertical, and diagonal orientations. A video decoder decodes the block of pixels by extrapolating from the pixels in neighboring blocks in the frame according the extrapolation mode of the extrapolation used in the encoder.

According to a second set of techniques and tools in the first group, a video encoder predicts the extrapolation mode of a current block from the known extrapolation modes of neighboring blocks to improve coding efficiency. Prediction of extrapolation orientation can speed up selection of the extrapolation mode and/or reduce the average number of bits spent encoding the extrapolation mode. For example, a video encoder predicts the extrapolation mode of a current block based upon generalizations of the extrapolation modes of the top and left blocks. Starting from the predicted orientation, the encoder checks possible extrapolation orientations in a ranked order associated with the predicted extrapolation mode. The encoder finds a satisfactory orientation faster than with a full search through all available orientations. Moreover, the encoder uses short variable length codes for early indices in the ranked order and long variable length codes for later indices in the ranked order to reduce the average bits spent encoding the indices. Or, the encoder spends no bits encoding an extrapolation mode if the current block uses a predicted extrapolation mode or an orientation that the decoder will otherwise deduce from contextual information in the neighboring blocks in decoding. A video decoder predicts the extrapolation mode of a current block from the known orientations of neighboring blocks when reconstructing the current block, which improves decoding efficiency. For example, the decoder decodes a variable length code for the index in a ranked order associated with the predicted extrapolation mode of the current block and determines the actual extrapolation mode. Or, the decoder determines extrapolation orientation for the current block based upon contextual information in the neighboring blocks, without a variable length code for the mode of the current block.

According to a third set of techniques and tools in the first group, a video encoder uses a re-oriented frequency transform to address non-stationarity in the prediction residual of a spatially extrapolated current block of pixels. In general, spatial extrapolation for a current block yields more accurate values close to neighboring block(s) from which values are extrapolated into the current block. As a result, the prediction residual is more significant (e.g., higher variance) further from the neighboring block(s). The video encoder addresses this non-stationarity with the re-oriented frequency transform. For example, for a block of DCT coefficients, the video encoder lifts one of more AC coefficients as a function of the DC coefficient to compensate for the non-stationarity, which increases energy compaction in the prediction residual. A video decoder also addresses the non-stationarity in the prediction residual. For example, the decoder applies a re-oriented inverse DCT and compensates for the non-orthogonality by inverse lifting selected AC coefficients. In various circumstances, the video encoder can disable the re-oriented frequency transform (using the ordinary frequency transform instead), and the decoder can do the same for the inverse transform, based upon contextual information.

According to a fourth set of techniques and tools in the first group, depending on the extrapolation orientation for a current block, a video encoder selects from among plural available scan patterns for converting the frequency coefficients for a prediction residual into a one-dimensional array for entropy encoding, which improves entropy encoding efficiency. For example, a video encoder selects a scan pattern for a generalization of the extrapolation orientation, and the scan pattern decreases entropy in the one-dimensional array for subsequent run-level encoding. Depending on the extrapolation orientation for a current block, a video decoder selects from among plural available scan patterns for converting a one-dimensional array of values into frequency coefficients of a prediction residual.

According to a fifth set of techniques and tools in the first group, depending on contextual information in neighboring blocks, a video encoder selects or switches an entropy encoding table from among plural available entropy encoding tables for a spatially extrapolated current block. For example, based upon the minimum number of non-zero values among neighboring blocks of a current block, the encoder selects among available entropy encoding tables for encoding a DC frequency coefficient, and the encoder switches between available entropy encoding tables during encoding of AC frequency coefficients. Depending on contextual information in neighboring blocks, a video decoder selects or switches an entropy decoding table from among plural entropy decoding tables, for example, based upon the minimum number of non-zero values among neighboring blocks of a current block.

According to a sixth set of techniques and tools in the first group, a video encoder processes reconstructed blocks within a spatial extrapolation loop to reduce block boundaries, which improves the quality of spatial extrapolation for subsequent blocks in the frame. For example, a video encoder processes one or more rows or columns of a reconstructed neighboring block to reduce discontinuities between the reconstructed current block and reconstructed neighboring blocks. A video decoder also processes reconstructed blocks within a spatial extrapolation loop to reduce block boundaries.

For a second group of techniques and tools describes herein, the detailed description is directed to various techniques and tools for motion estimation and compensation. These techniques and tools address several of the disadvantages of motion estimation and compensation according to the prior art. The various techniques and tools can be used in combination or independently.

According to a first set of techniques and tools in the second group, a video encoder adaptively switches between multiple different motion resolutions, which allows the encoder to select a suitable resolution for a particular video source or coding circumstances. For example, the encoder adaptively switches between pixel, half-pixel, and quarter-pixel resolutions. The encoder can switch based upon a closed-loop decision involving actual coding with the different options, or based upon an open-loop estimation. The encoder switches resolutions on a frame-by-frame basis or other basis.

According to a second set of techniques and tools in the second group, a video encoder uses previously computed results from a first resolution motion estimation to speed up another resolution motion estimation. For example, in some circumstances, the encoder searches for a quarter-pixel motion vector around an integer-pixel motion vector that was also used in half-pixel motion estimation. Or, the encoder uses previously computed half-pixel location values in computation of quarter-pixel location values.

According to a third set of techniques and tools in the second group, a video encoder uses a search range with different directional resolutions. This allows the encoder and decoder to place greater emphasis on directions likely to have more motion, and to eliminate the calculation of numerous sub-pixel values in the search range. For example, the encoder uses a search range with quarter-pixel increments and resolution horizontally, and half-pixel increments and resolution vertically. The search range is effectively quarter the size of a full quarter-by-quarter-pixel search range, and the encoder eliminates calculation of many of the quarter-pixel location points.

According to a fourth set of techniques and tools in the second group, a video encoder uses a motion vector representation with different bit allocation for horizontal and vertical motion. This allows the encoder to reduce bitrate by eliminating resolution that is less essential to quality. For example, the encoder represents a quarter-pixel motion vector by adding 1 bit to a half-pixel motion vector code to indicate a corresponding quarter-pixel location.

For a third group of techniques and tools described herein, the detailed description is directed to transform coding and inverse transform coding of blocks of prediction residuals with sub-block transforms. With sub-block transforms, the encoder can react to localization of error within prediction residual blocks. The various techniques and tools can be used in combination or independently.

According to a first set of techniques and tools in the third group, a video encoder adaptively sets transform sizes for coding prediction residuals, switching between multiple available block and sub-block transform sizes. For example, for a 8×8 prediction residual block, the encoder switches between an 8×8, two 8×4, or two 4×8 DCTs. A video decoder adaptively switches block transform sizes in decoding.

According to a second set of techniques and tools in the third group, a video encoder makes a switching decision for transform sizes in a closed loop (actual testing of the options). Alternatively, the encoder uses an open loop (estimation of suitability of the options), which emphasizes computational simplicity over reliability.

According to a third set of techniques and tools in the third group, a video encoder makes a switching decision for transform sizes at the frame, macroblock, block, and/or other levels. For example, the encoder evaluates the efficiency of switching at frame, macroblock, and block levels and embeds flags in the bitstream at the selected switching levels. This allows the encoder to find a solution that weighs distortion reduction/bitrate gain against signaling overhead for different levels (e.g., frame, macroblock, block) of control. A video decoder reacts to the switching at different levels during decoding.

According to a fourth set of techniques and tools in the third group, for different transform sizes, a video encoder uses different scan patterns to order the elements of a two-dimensional block of coefficient data in a one-dimensional array. By using different scan patterns, the encoder decreases the entropy of the values in the one-dimensional array, for example, by improving localization of groups of zero values. A video decoder uses the different scan patterns during decoding for different transform sizes.

According to a fifth set of techniques and tools in the third group, a video encoder uses a sub-block pattern code to indicate the presence or absence of information for the sub-blocks of a prediction residual. For example, a sub-block pattern code indicates which of two 4×8 sub-blocks has associated compressed information in a bitstream and which has no such information. A video decoder receives and reacts to sub-block pattern codes during decoding.

For a fourth group of techniques and tools described herein, the detailed description is directed to various techniques and tools for processing reference frames in a motion estimation/compensation loop of a video encoder and in a motion compensation loop of a video decoder. The various techniques and tools can be used in combination or independently.

According to a first set of techniques and tools in the fourth group, a video encoder applies a deblocking filter to reference frames in a motion estimation/compensation loop. A video decoder applies a deblocking filter to reference frames in a motion compensation loop. The deblocking filter smoothes block discontinuities, thereby improving the efficiency of motion estimation by improving prediction/reducing the bitrate of residuals.

According to a second set of techniques and tools in the fourth group, a video encoder adaptively filters block boundaries in a reference frame. For example, the video encoder filters only those block boundaries that exceed a filtering threshold, which reduces blurring of image properties coincident with block boundaries. A video decoder adaptively filters block boundaries in a reference frame.

According to a third set of techniques and tools in the fourth group, a video encoder uses a short filter to smooth block boundaries in a reference frame. Smoothing with the short filter changes fewer pixels, which helps avoid smoothing that could hurt motion estimation. A video decoder uses a short filter to smooth block boundaries in a reference frame.

According to a fourth set of techniques and tools in the fourth group, a video encoder adaptively enables or disables a deblocking filter in a motion estimation/motion compensation loop. The encoder determines whether to enable or disable the frame in a closed loop or an open loop. The encoder can enable/disable the deblocking filter on a sequence-by-sequence, frame-by-frame, or other basis. A video decoder adaptively enables or disables a deblocking filter in a motion compensation loop based upon received flags or contextual information.

Additional features and advantages will be made apparent from the following detailed description of different embodiments that proceeds with reference to the accompanying drawings.

BRIEF DESCRIPTION OF THE DRAWINGS

FIG. 1 is a diagram showing block-based intraframe compression of an 8×8 block of pixels according to prior art.

FIG. 2 is a diagram showing prediction of frequency coefficients according to the prior art.

FIG. 3 is a diagram showing motion estimation in a video encoder according to the prior art.

FIG. 4 is a diagram showing block-based interframe compression for an 8×8 block of prediction residuals in a video encoder according to the prior art.

FIG. 5 is a diagram showing block-based interframe decompression for an 8×8 block of prediction residuals according to the prior art.

FIG. 6 is a block diagram of a suitable computing environment in which several described embodiments may be implemented.

FIGS. 14a and 14b are code listings showing pseudocode for various extrapolation modes that reference the neighboring values of FIG. 11, as used in spatial extrapolation for a block of pixels.

FIGS. 14c and 14d show pseudocode and weights used for the bi-directional extrapolation mode.

FIG. 16 is a flowchart showing a technique for decoding extrapolation mode information in a video decoder.

FIGS. 20a-20c are code listings showing pseudocode for 8-point IDCT operations for rows and columns in one implementation.

FIG. 21 is a chart showing weights used in a skewed inverse DCT.

FIG. 22 is a flowchart showing techniques for encoding and decoding a block of spatial extrapolation error values using lifting and inverse lifting, respectively, in transforms.

FIG. 23 is a chart showing weights used in non-flat quantization and dequantization of frequency coefficients.

FIGS. 25a-25c are charts showing different scan patterns for scanning residual block values into a one-dimensional array in one implementation.

FIG. 33 is a flowchart showing a technique for entropy decoding motion vectors of different resolutions in a video decoder.

FIGS. 35a-35c are diagrams showing transform coding of a block of prediction residuals using one of several available transform sizes.

FIGS. 36a-36d are code listings showing example pseudocode for 4-point and 8-point IDCT operations for rows and columns.

FIG. 37 is a diagram showing decompression and inverse transform coding of a block of prediction residuals using inverse sub-block transforms.

FIG. 40 is a flowchart showing a technique for selecting one of multiple available scan patterns for a prediction residual for a motion-compensated block.

FIGS. 41a-41c are charts showing scan patterns in one implementation.

FIG. 50 is a code listing showing pseudocode for a filtering operation performed on pixels in horizontal or vertical lines.

DETAILED DESCRIPTION

Figure 7:
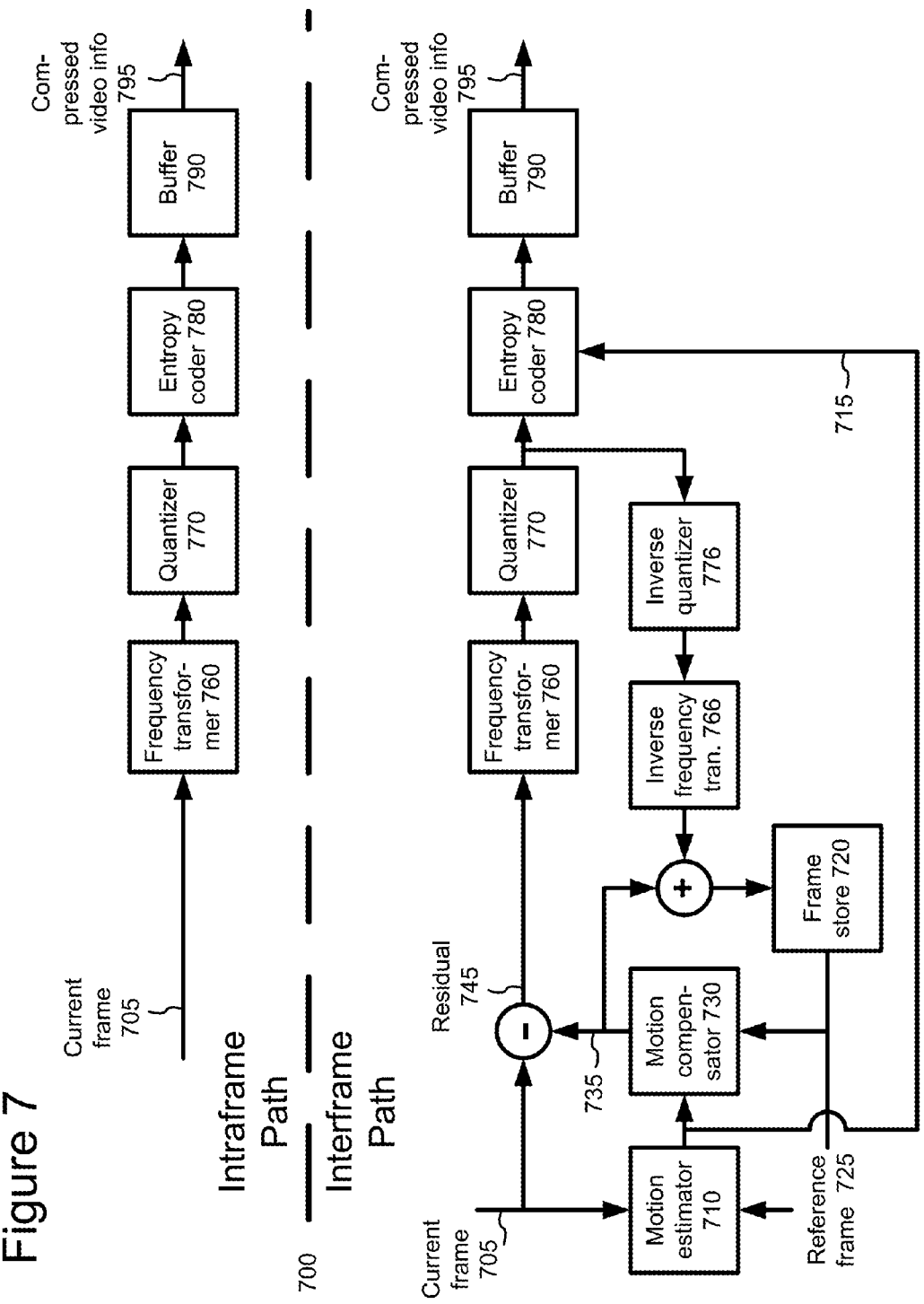
FIG. 7 is a block diagram of a generalized video encoder system used in several described embodiments.

The present application relates to techniques and tools for video encoding and decoding. In various described embodiments, a video encoder incorporates techniques that improve the efficiency of interframe coding, a video decoder incorporates techniques that improve the efficiency of interframe decoding, and a bitstream format includes flags and other codes to incorporate the techniques.

The various techniques and tools can be used in combination or independently. Different embodiments implement one or more of the described techniques and tools.

I. Computing Environment

FIG. 6 illustrates a generalized example of a suitable computing environment (600) in which several of the described embodiments may be implemented. The computing environment (600) is not intended to suggest any limitation as to scope of use or functionality, as the techniques and tools may be implemented in diverse general-purpose or special-purpose computing environments.

With reference to FIG. 6, the computing environment (600) includes at least one processing unit (610) and memory (620). In FIG. 6, this most basic configuration (630) is included within a dashed line. The processing unit (610) executes computer-executable instructions and may be a real or a virtual processor. In a multi-processing system, multiple processing units execute computer-executable instructions to increase processing power. The memory (620) may be volatile memory (e.g., registers, cache, RAM), non-volatile memory (e.g., ROM, EEPROM, flash memory, etc.), or some combination of the two. The memory (620) stores software (680) implementing a video encoder or decoder.

A computing environment may have additional features. For example, the computing environment (600) includes storage (640), one or more input devices (650), one or more output devices (660), and one or more communication connections (670). An interconnection mechanism (not shown) such as a bus, controller, or network interconnects the components of the computing environment (600). Typically, operating system software (not shown) provides an operating environment for other software executing in the computing environment (600), and coordinates activities of the components of the computing environment (600).

The storage (640) may be removable or non-removable, and includes magnetic disks, magnetic tapes or cassettes, CD-ROMs, DVDs, or any other medium which can be used to store information and which can be accessed within the computing environment (600). The storage (640) stores instructions for the software (680) implementing the video encoder or decoder.

The input device(s) (650) may be a touch input device such as a keyboard, mouse, pen, or trackball, a voice input device, a scanning device, or another device that provides input to the computing environment (600). For audio or video encoding, the input device(s) (650) may be a sound card, video card, TV tuner card, or similar device that accepts audio or video input in analog or digital form, or a CD-ROM or CD-RW that reads audio or video samples into the computing environment (600). The output device(s) (660) may be a display, printer, speaker, CD-writer, or another device that provides output from the computing environment (600).

The communication connection(s) (670) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (600), computer-readable media include memory (620), storage (640), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "select," "adjust," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 8:
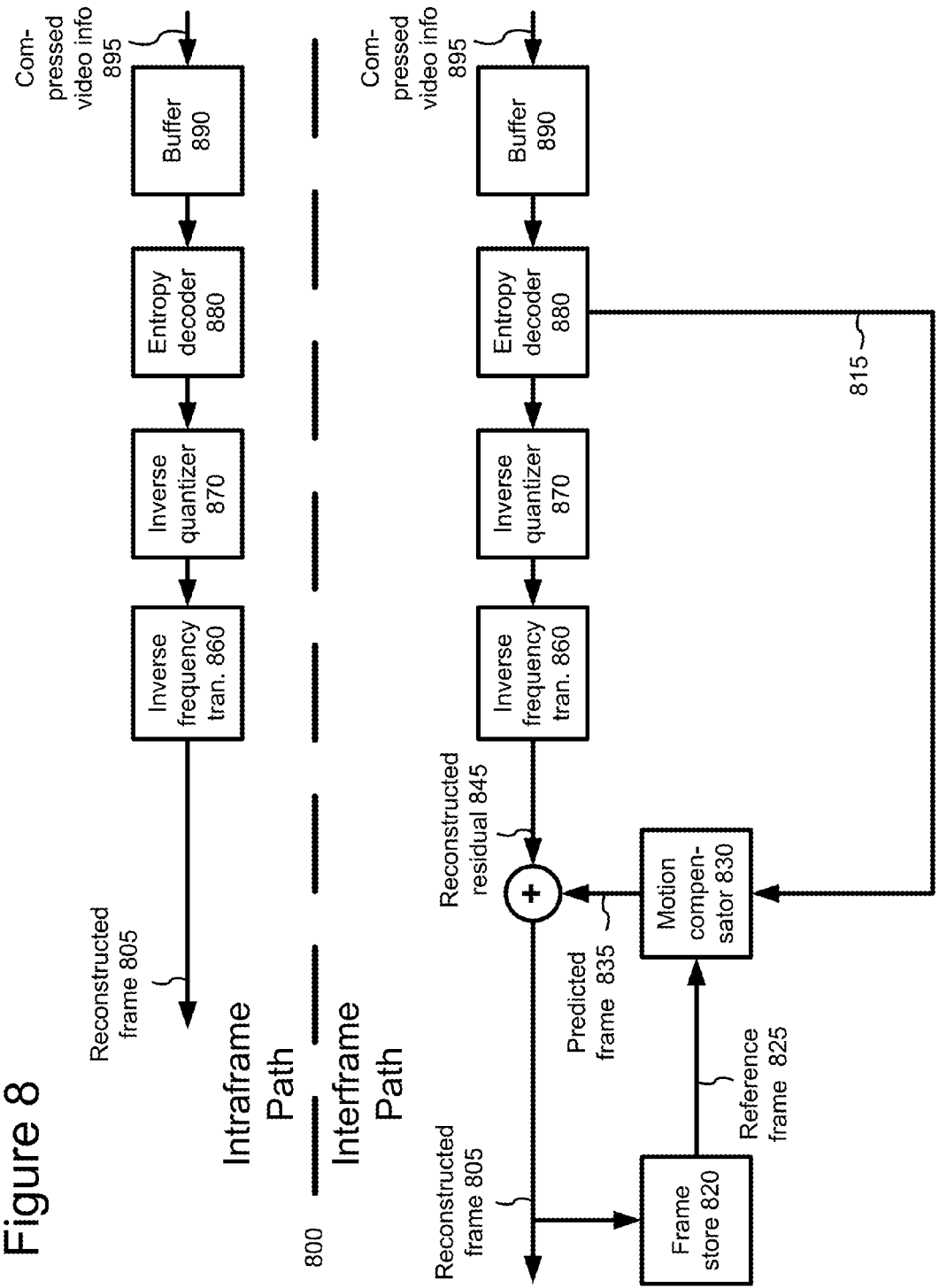
FIG. 8 is a block diagram of a generalized video decoder system used in several described embodiments.

FIG. 7 is a block diagram of a generalized video encoder (700) and FIG. 8 is a block diagram of a generalized video decoder (800).

The relationships shown between modules within the encoder and decoder indicate the main flow of information in the encoder and decoder; other relationships are not shown for the sake of simplicity. In particular, FIGS. 7 and 8 usually do not show side information indicating the encoder settings, modes, tables, etc. used for a video sequence, frame, macroblock, block, etc. Such side information is sent in the output bitstream, typically after entropy encoding of the side information. The format of the output bitstream can be Windows Media Video version 8 format or another format.

The encoder (700) and decoder (800) are block-based and use a 4:2:0 macroblock format with each macroblock including 4 luminance 8×8 luminance blocks (at times treated as one 16×16 macroblock) and two 8×8 chrominance blocks. Alternatively, the encoder (700) and decoder (800) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 7 is a block diagram of a general video encoder system (700). The encoder system (700) receives a sequence of video frames including a current frame (705), and produces compressed video information (795) as output. Particular embodiments of video encoders typically use a variation or supplemented version of the generalized encoder (700).

The encoder system (700) compresses predicted frames and key frames. For the sake of presentation, FIG. 7 shows a path for key frames through the encoder system (700) and a path for forward-predicted frames. Many of the components of the encoder system (700) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (705) is a forward-predicted frame, a motion estimator (710) estimates motion of macroblocks or other sets of pixels of the current frame (705) with respect to a reference frame, which is the reconstructed previous frame (725) buffered in the frame store (720). In alternative embodiments, the reference frame is a later frame or the current frame is bi-directionally predicted. The motion estimator (710) can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator (710) outputs as side information motion information (715) such as motion vectors. A motion compensator (730) applies the motion information (715) to the reconstructed previous frame (725) to form a motion-compensated current frame (735). The prediction is rarely perfect, however, and the difference between the motion-compensated current frame (735) and the original current frame (705) is the prediction residual (745). Alternatively, a motion estimator and motion compensator apply another type of motion estimation/compensation.

A frequency transformer (760) converts the spatial domain video information into frequency domain (i.e., spectral) data. For block-based video frames, the frequency transformer (760) applies a discrete cosine transform ["DCT"] or variant of DCT to blocks of the pixel data or prediction residual data, producing blocks of DCT coefficients. Alternatively, the frequency transformer (760) applies another conventional frequency transform such as a Fourier transform or uses wavelet or subband analysis. In embodiments in which the encoder uses spatial extrapolation (not shown in FIG. 7) to encode blocks of key frames, the frequency transformer (760) can apply a re-oriented frequency transform such as a skewed DCT to blocks of prediction residuals for the key frame. In other embodiments, the frequency transformer (760) applies an 8×8, 8×4, 4×8, or other size frequency transforms (e.g., DCT) to prediction residuals for predicted frames.

A quantizer (770) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (700) can use frame dropping, adaptive filtering, or other techniques for rate control.

When a reconstructed current frame is needed for subsequent motion estimation/compensation, an inverse quantizer (776) performs inverse quantization on the quantized spectral data coefficients. An inverse frequency transformer (766) then performs the inverse of the operations of the frequency transformer (760), producing a reconstructed prediction residual (for a predicted frame) or a reconstructed key frame. If the current frame (705) was a key frame, the reconstructed key frame is taken as the reconstructed current frame (not shown). If the current frame (705) was a predicted frame, the reconstructed prediction residual is added to the motion-compensated current frame (735) to form the reconstructed current frame. The frame store (720) buffers the reconstructed current frame for use in predicting the next frame. In some embodiments, the encoder applies a deblocking filter to the reconstructed frame to adaptively smooth discontinuities in the blocks of the frame.

The entropy coder (780) compresses the output of the quantizer (770) as well as certain side information (e.g., motion information (715), spatial extrapolation modes, quantization step size). Typical entropy coding techniques include arithmetic coding, differential coding, Huffman coding, run length coding, LZ coding, dictionary coding, and combinations of the above. The entropy coder (780) typically uses different coding techniques for different kinds of information (e.g., DC coefficients, AC coefficients, different kinds of side information), and can choose from among multiple code tables within a particular coding technique.

The entropy coder (780) puts compressed video information (795) in the buffer (790). A buffer level indicator is fed back to bitrate adaptive modules.

The compressed video information (795) is depleted from the buffer (790) at a constant or relatively constant bitrate and stored for subsequent streaming at that bitrate. Therefore, the level of the buffer (790) is primarily a function of the entropy of the filtered, quantized video information, which affects the efficiency of the entropy coding. Alternatively, the encoder system (700) streams compressed video information immediately following compression, and the level of the buffer (790) also depends on the rate at which information is depleted from the buffer (790) for transmission.

Before or after the buffer (790), the compressed video information (795) can be channel coded for transmission over the network. The channel coding can apply error detection and correction data to the compressed video information (795).

B. Video Decoder

FIG. 8 is a block diagram of a general video decoder system (800). The decoder system (800) receives information (895) for a compressed sequence of video frames and produces output including a reconstructed frame (805). Particular embodiments of video decoders typically use a variation or supplemented version of the generalized decoder (800).

The decoder system (800) decompresses predicted frames and key frames. For the sake of presentation, FIG. 8 shows a path for key frames through the decoder system (800) and a path for forward-predicted frames. Many of the components of the decoder system (800) are used for compressing both key frames and predicted frames. The exact operations performed by those components can vary depending on the type of information being compressed.

A buffer (890) receives the information (895) for the compressed video sequence and makes the received information available to the entropy decoder (880). The buffer (890) typically receives the information at a rate that is fairly constant over time, and includes a jitter buffer to smooth short-term variations in bandwidth or transmission. The buffer (890) can include a playback buffer and other buffers as well. Alternatively, the buffer (890) receives information at a varying rate. Before or after the buffer (890), the compressed video information can be channel decoded and processed for error detection and correction.

The entropy decoder (880) entropy decodes entropy-coded quantized data as well as entropy-coded side information (e.g., motion information (815), spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (880) frequently uses different decoding techniques for different kinds of information (e.g., DC coefficients, AC coefficients, different kinds of side information), and can choose from among multiple code tables within a particular decoding technique.

If the frame (805) to be reconstructed is a forward-predicted frame, a motion compensator (830) applies motion information (815) to a reference frame (825) to form a prediction (835) of the frame (805) being reconstructed. For example, the motion compensator (830) uses a macroblock motion vector to find a macroblock in the reference frame (825). A frame buffer (820) stores previous reconstructed frames for use as reference frames. The motion compensator (830) can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder (800) also reconstructs prediction residuals.

When the decoder needs a reconstructed frame for subsequent motion compensation, the frame store (820) buffers the reconstructed frame for use in predicting the next frame. In some embodiments, the encoder applies a deblocking filter to the reconstructed frame to adaptively smooth discontinuities in the blocks of the frame.

An inverse quantizer (870) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (860) converts the quantized, frequency domain data into spatial domain video information. For block-based video frames, the inverse frequency transformer (860) applies an inverse DCT ["IDCT"] or variant of IDCT to blocks of the DCT coefficients, producing pixel data or prediction residual data for key frames or predicted frames, respectively. Alternatively, the frequency transformer (860) applies another conventional inverse frequency transform such as a Fourier transform or uses wavelet or subband synthesis. In embodiments in which the decoder uses spatial extrapolation (not shown in FIG. 8) to decode blocks of key frames, the inverse frequency transformer (860) can apply a re-oriented inverse frequency transform such as a skewed IDCT to blocks of prediction residuals for the key frame. In other embodiments, the inverse frequency transformer (860) applies an 8×8, 8×4, 4×8, or other size inverse frequency transforms (e.g., IDCT) to prediction residuals for predicted frames.

III. Intraframe Encoding and Decoding

In one or more embodiments, a video encoder exploits redundancies in typical still images in order to code the information using a smaller number of bits. The video encoder uses spatial extrapolation of a current block of the image being encoded from its previously decoded neighborhood in the image. The encoder encodes information describing the direction and type of the spatial extrapolation, and then encodes the difference between the block as predicted with spatial extrapolation and the original block. Various features of the spatial extrapolation can be used in combination or independently. These features include, but are not limited to:

1a) Using spatial extrapolation in an encoder or decoder to reduce block entropy in intraframe compression.

1b) Using one of multiple extrapolation modes in an encoder or decoder. The modes can include linear directional, blended, and/or bi-directional modes.

2a) Prediction of extrapolation mode for a current block from contextual information in neighboring blocks. Differential orientations are rank ordered conditioned on a predicted extrapolation mode.

2b) Using the rank orderings to compute spatial extrapolations, which improves the performance of the encoder.

2c) Selectively transmitting differential orientations, which reduces overall bitrate.

3a) Using a skewed frequency transform in an encoder or decoder for coding/decoding a prediction residual for a spatially extrapolated block. The skewed frequency transform exploits the non-stationary nature of the prediction residual.

3b) Adaptively disabling the skewed frequency transform, thereby preventing banding artifacts.

4) Using one of multiple scan patterns depending on extrapolation mode in an encoder or decoder.

5a) Using contextual information in neighboring blocks to select entropy code tables in an encoder or decoder.

5b) Using contextual information in neighboring blocks to switch entropy code tables in an encoder or decoder.

6a) Using a deblocking filter in a spatial extrapolation loop in an encoder or decoder to smooth block discontinuities, which improves spatial extrapolation.

6b) Using an adaptive deblocking filter in such a spatial extrapolation loop.

Spatial extrapolation is performed on a block basis across the luminance channel for macroblocks in 4:2:0 or another macroblock format. In the chrominance channels, coding takes place block by block, with the spatial extrapolation information being pulled from the corresponding luminance blocks. The extrapolation mode (sometimes called the orientation mode or prediction mode) determines the specific operation used to extrapolate the block. In general, side information regarding the mode of a block is transmitted as part of the bitstream (exceptions are dealt with later).

Figure 9:
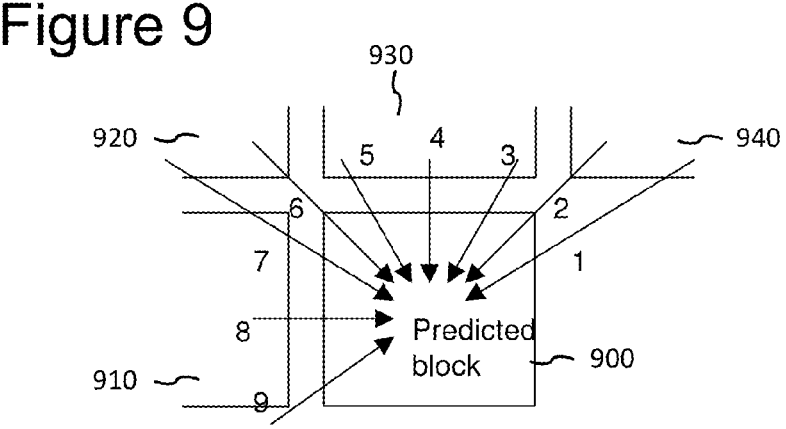
FIG. 9 is a diagram of extrapolation mode directions and indices used in spatial extrapolation for a block of pixels.

With reference to FIG. 9, in general, the encoding process takes place as follows: the current 8×8 block (900) is extrapolated entirely from its causal neighbors given a certain extrapolation mode. By definition, the causal neighborhood is generated by decoding the previously coded blocks (910, 920, 930, 940) of the image. The difference between the current block (900) and its extrapolation is computed. The 8×8 difference matrix is further coded using a linear transform (a modified version of the DCT in some embodiments). Transform coefficients are quantized, zigzag scanned and run length encoded. Decoding is the inverse process of encoding. The prediction mode and causal neighborhood are known at the decoder. Using this information, the extrapolation of the current block is generated. The dequantized difference matrix is regenerated from the bitstream, and is added to the extrapolation to generate the decoded block.

A. Extrapolation Modes

Extrapolation modes are sets of rules that determine the extrapolation of the current block from its causal neighborhood. Each mode is associated with a distinct extrapolator, and one out of these modes is picked for encoding the current block. In one implementation, the video encoder and decoder uses thirteen extrapolation modes. These include horizontal, vertical and seven diagonal extrapolations of the predicting edges (i.e. edge pixels of the causal neighbor blocks abutting the current block), smooth blends of horizontal and vertical predictions, and a bi-directional diffusion type operation called the null prediction. In addition, there is a mode used when the causal blocks have negligible variation (flat condition). FIG. 9 shows the general directions and indices for the horizontal, vertical, and diagonal extrapolation modes. In alternative embodiments, the encoder and decoder use more or fewer than thirteen modes, each configured the same or differently than a mode described below.

Figure 10:
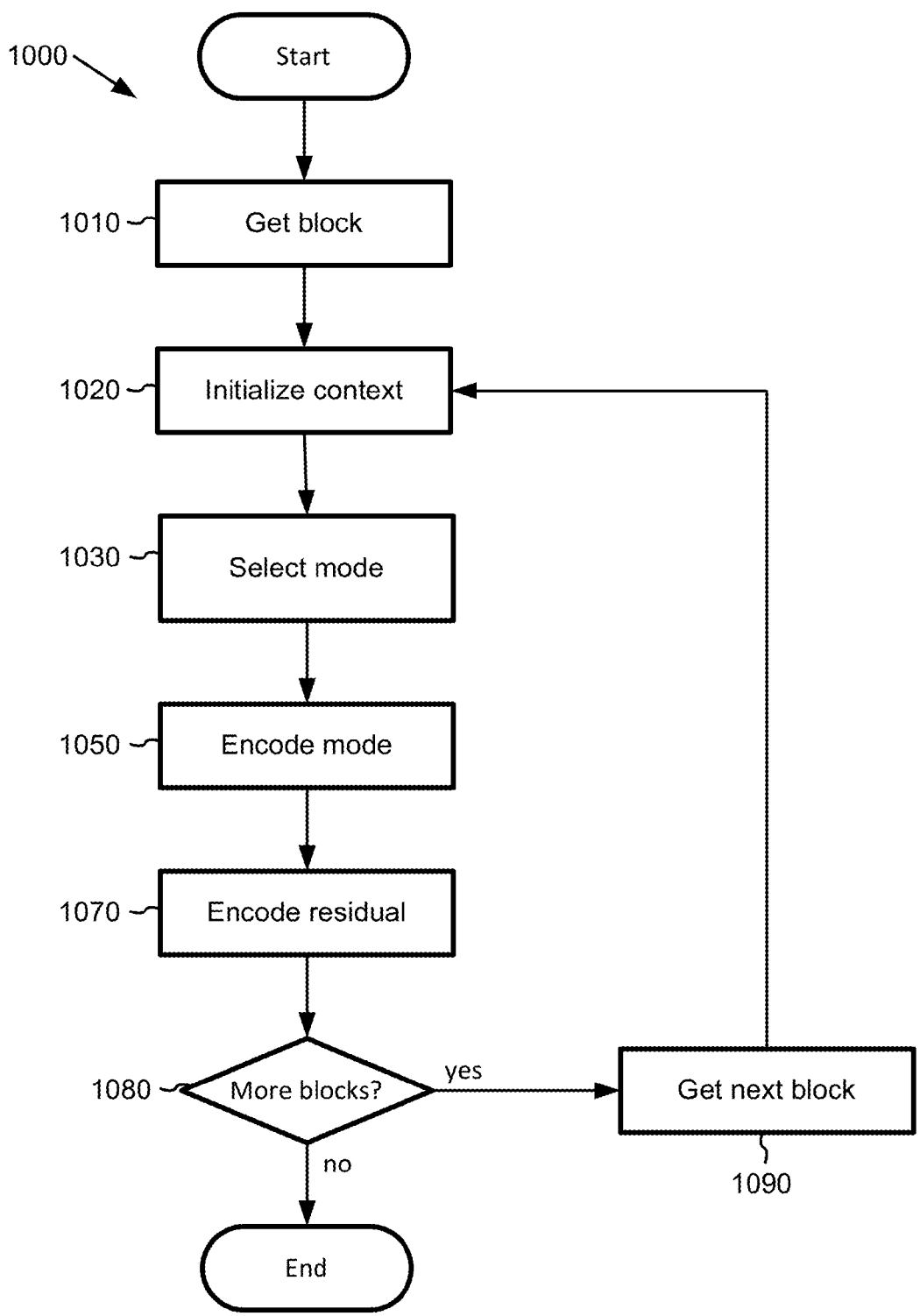
FIG. 10 is a flowchart showing a technique for spatial extrapolation of blocks of pixels.

FIG. 10 shows a general technique (1000) for spatial extrapolation of blocks of pixels. For the sake of simplicity, FIG. 10 does not show the various ways in which the technique (1000) can be used in conjunction with other techniques.

Figure 11:
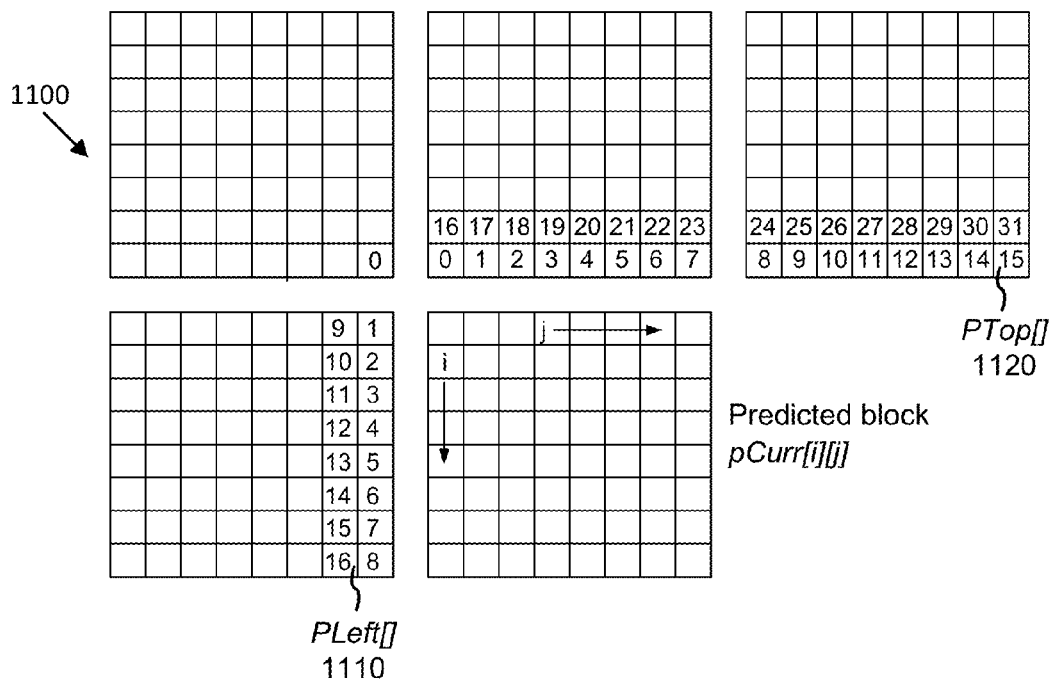
FIG. 11 is a diagram of neighboring values used in spatial extrapolation for a block of pixels.

A video encoder gets (1010) a block of pixels such as an 8×8 block of pixels in a key frame. The encoder initializes (1020) the context for the block by initializing data structures and settings used to select the extrapolation mode for the block. For example, the encoder initializes arrays as shown in FIG. 11. Alternatively, the encoder uses other data structures.

Figure 12:
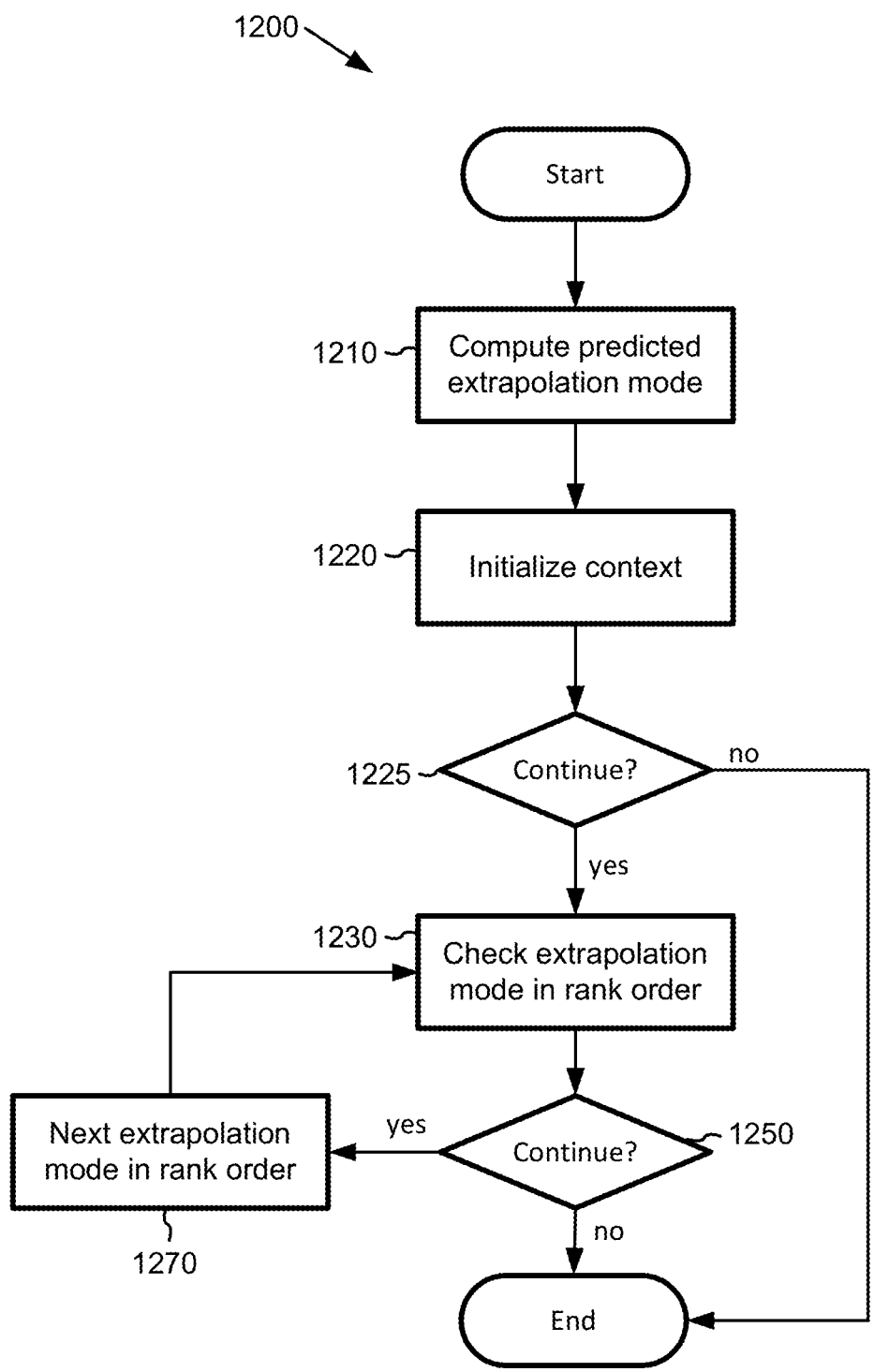
FIG. 12 is a flowchart showing a technique for selecting a spatial extrapolation mode for a block of pixels using prediction.

The video encoder selects (1030) an extrapolation mode for the block. For example, the video encoder selects a mode from among the thirteen modes described below. The video encoder can select an extrapolation mode using prediction of the extrapolation mode as shown in FIG. 12, a closed-loop (actual coding) or open-loop (estimation) search across all or a subset of extrapolation modes, or another selection technique.

The encoder encodes (1050) the extrapolation mode for transmission as side information. For example, the encoder encodes an index representing a differential ordering in a rank order for extrapolation modes selected using prediction. Alternatively, the encoder encodes the extrapolation mode using a Huffman code or other entropy code, or sends the extrapolation mode as a literal value. In some embodiments, the encoder need not encode or send the extrapolation mode for a block if the extrapolation mode can be derived using contextual information available to the encoder and the decoder. Orientation information is not transmitted for the chrominance channels in any case. Chrominance blocks use a meta-direction of the top-left block in the corresponding luminance macroblock. Alternatively, an encoder selects a spatial extrapolation mode and encodes mode information for chrominance blocks as well as luminance blocks.

The encoder encodes (1070) the residual error between the original block and the spatially extrapolated block. For example, the encoder uses a skewed DCT, which can be selected from among one or more available skewed DCTs. Alternatively, the encoder uses another frequency transform or sends the residual in an uncompressed form. In some embodiments, the encoder does not encode or send the residual, for example, due to bitrate constraints, because the spatial extrapolation alone is adequate, or because the encoder did not compute a residual. The encoder can also use entropy encoding to encode the residual, as described below.

The encoder reconstructs the block so that the block can be used for spatial extrapolation of other blocks in the frame. In some embodiments, the encoder applies a deblocking filter to the reconstructed block to smooth block discontinuities with other, previously reconstructed blocks.

The encoder determines (1080) whether there are more blocks in the key frame. If not, the technique (1000) ends. If so, the encoder gets (1090) the next block in the key frame and initializes the context (1020) for it.

1. Initializing Context for a Block

FIG. 11 shows contextual information (1100) and data structures used for spatial extrapolation of a predicted block of pixels in one implementation. The contextual information (1100) comes from blocks to the immediate left, top-left, top, and top-right of the predicted block. Selected pixels from the neighboring blocks are organized into one-dimensional arrays. The selected pixels are numbered and labeled for the sake of presentation. The contextual information (1100) and data structures are functionally related to the extrapolation modes described in detail below. Alternative implementations use a different configuration of contextual information and data structures.

In one implementation, the encoder predicts the orientation for the current block from that of it causal neighbors. The predicted extrapolation mode can be null, horizontal or vertical. If the current block is at the top left corner of the image, the predicted extrapolation mode is null. Otherwise, if the current block is in the topmost row, the predicted extrapolation mode is horizontal (8), or if the current block is in leftmost column, the predicted extrapolation mode is vertical (4). In other cases, the predicted extrapolation mode is a function of the top-left (TL), left (L) and top (T) block meta-directions.

The encoder maps a meta-direction from an actual orientation direction, for example, as shown to Table 2. Alternatively, the encoder uses a linear function or other non-linear function to map an actual orientation direction to a meta-direction.

TABLE 2

Mapping Actual Orientation Directions to Meta-directions

| Actual Orientation | Meta-direction |
|---|---|
| Horizontal (8) | H (8) |
| Vertical (4) | V (4) |
| All others | Null (0) |

Based on the meta-directions of the top-left (TL), left (L) and top (T) blocks, and a quantization parameter ["QP"], the encoder computes the predicted extrapolation mode, for example, as shown in Table 3. Alternatively, the encoder uses a linear or other non-linear function to compute a predicted extrapolation mode for a block from the meta-directions from the neighboring blocks, or uses more or fewer predicted modes than Table 3. Working with the same contextual information during decoding, the decoder can also compute a predicted extrapolation mode for the predicted block.

TABLE 3

Determining Predicted Extrapolation Mode from Meta-Directions

| L | T | Predicted Extrapolation Mode | Notes |
|---|---|---|---|
| X | X | X | If the meta-directions of blocks L and T are the same, use the meta-direction as the predicted mode. |
| H | 0 | H | Horizontal continuity from left. |
| 0 | V | V | Vertical continuity from top. |
| H | V | H | Horizontal continuity overrides vertical. |
| V | H | | Code segment:<br>if (TL==L) PEM=T;<br>else { |

TABLE 3-continued

Determining Predicted Extrapolation Mode from Meta-Directions

| L | T | Predicted Extrapolation Mode | Notes |
|---|---|---|---|
| | | if (QP>12) PEM=T;<br>else {<br>   if (TL==T) PEM=L;<br>   else   PEM=TL;<br>}<br>} | |

With reference to FIG. 11, a first one-dimensional array (1110) labeled pLeft[ ] includes 17 pixel values from the left and top-left. A second one-dimensional array (1120) labeled pTop[ ] includes 32 pixel values from the top and top-right blocks. A two-dimensional array labeled pCurr[ ] stores pixels values for the predicted block.

Before spatial extrapolation of a block, the encoder performs a set of operations on the causal predicting edges. A decoder performs the same operations on the same causal predicting edges, such that the encoder and decoder can use the same information for spatial extrapolation and context. The encoder and decoder use the pixel information when evaluating extrapolation modes, and can also use contextual information to select extrapolations modes by default under certain circumstances.

First, the encoder/decoder fills the arrays pLeft[ ] and pTop[ ]. If the predicted block is at the top left boundary of a key frame, all neighbors pLeft[ ] and pTop[ ] are set to 128. If the predicted block is on the top row (but not at the left extreme), pLeft[0] and pTop[ ] are set to pLeft[1]. If the predicted block is in the first column (but not at the top extreme), all elements of pLeft[ ] are set to pTop[0]. The neighboring elements are copied from the causal reconstructed neighbor blocks of the current color plane.

Next, the encoder/decoder computes contextual information. Specifically, the encoder/decoder computes the range of the immediate neighbors (i.e., the maximum value minus the minimum value of pLeft[0 . . . 8] and pTop[0 . . . 7]). In general, a large range indicates extrapolation could be useful for the predicted block; a small range indicates the predicted block is likely similar to the neighboring blocks, and the predicted extrapolation mode will likely suffice. For example, if the range is either less than QP or less than 3, the predicted extrapolation mode of the predicted block is reset to the null predictor. If range is less than 3, flat mode is activated, which is described below.

For luminance channels, if the range is smaller than 2QP, and the predicted block is not on the top or left periphery of the image, horizontal and vertical predicted extrapolation modes are changed to blended horizontal and blended vertical modes, which are described below. Also, if the range is smaller than 2QP, the orientation mode is not transmitted (or received). This ensures that bits are not wasted transmitting spatial orientation information if there is little information in the causal boundary to begin with.

Alternatively, the encoder/decoder compute other contextual information and/or check other contextual conditions.

2. Selecting an Extrapolation Mode

FIG. 12 shows a technique for selecting an extrapolation mode using prediction. Prediction of extrapolation mode can speed up the selection process in the encoder and reduce the average bitrate associated with sending extrapolation mode information to the decoder. For the sake of simplicity, FIG. 12 does not show the various ways in which the technique (1200) can be used in conjunction with other techniques.

The encoder computes (1210) a predicted extrapolation mode, as described above. The encoder then initializes (1220) the context for the block and determines (1225) whether the encoder needs to check other extrapolation modes, as described above. If the context indicates what the extrapolation mode should be for the block, the technique (1200) ends. For example, the range of the immediate neighboring pixels of the block might indicate that the mode should be blended horizontal, blended vertical, or flat.

Otherwise, the encoder then checks (1230) an extrapolation mode in a rank order associated with predicted extrapolation mode. For example, exemplary rank orders for null, horizontal, and vertical predicted extrapolation modes are shown in Table 4.

TABLE 4

Exemplary Rank Orders

| Predicted Mode | Rank Orders |
|---|---|
| Null | int orderArray[ ] = {0, 8, 4, 10, 11, 2, 6, 9, 1, 3, 5, 7}; |
| Horizontal | int orderArrayH[ ] = {8, 0, 4, 10, 11, 1, 7, 2, 6, 9, 3, 5}; |
| Vertical | int orderArrayV[ ] = {4, 0, 8, 11, 10, 3, 5, 2, 6, 9, 1, 7}; |

Alternatively, the encoder uses different rank orders.

The rank orders indicate by mode index the order in which the encoder should try extrapolation modes. The first element of each array is the associated predicted extrapolation mode, and the remaining modes are ordered roughly according to likelihood of suitability for the block. Later, shorter variable length codes can be assigned to indices early in a rank order, and longer variable length codes to indices later in the rank order.

The encoder checks (1230) an extrapolation mode by applying the extrapolation to the block and comparing the spatial extrapolation to the original block. The encoder can measure the magnitude of the difference in the spatial domain or in the frequency domain (e.g., DCT of the difference block) with an error measure. The error measure is a sum of absolute differences ["SAD"], mean square error ["MSE"], a perceptual distortion measure, or other error measure. The encoder can also consider the relative bit costs of variable length codes associated with extrapolation mode information when evaluating the fitness of an extrapolation mode, which favors modes with shorter corresponding variable length codes (which typically appear earlier in the rank order).

In one implementation, if the encoder determines that the orientation of a certain 8×8 block is significant, the encoder estimates the orientation. The estimation process starts by rank-ordering 12 possible orientation directions in one of three orderings corresponding to the prediction meta-direction (as shown in the rank orders above).

The encoder then computes a cost function for each orientation. The cost function considers the difference between the actual pixel values of the block being encoded and the spatial extrapolation resulting from applying the particular orientation. The cost function is a composite of: (1) the quantization error of the DCT coefficients associated with the error signal, (2) a simplification of the run-length information, and (3) a base cost corresponding to the rank order of the particular orientation.

The base cost is defined as $$C\_base = 0, \quad \text{for rank} = 0, 1, 2$$
$$= 32^*QP \quad \text{for ranks 3, 4}$$
$$= 64^*QP \quad \text{for ranks 5 ... 11 in the rank order,}$$

where QP is the quantization parameter. The quantization error is defined as:

$$abs(\text{reconstructed\_value} - \text{unquantized\_value}) \quad (1),$$

which is summed over all coefficients (i.e., SAD). Coefficients that are quantized to zero have the quantization error:

$$abs(\text{unquantized\_value}) \quad (2).$$

The simplified run-length cost is only accrued for coefficients quantized to non-zero values. This cost is given by:

$$(\text{index} + 32)^*QP \quad (3),$$

where index is the scan order index in the appropriate zigzag scan order for the current orientation. Scan orders are described below.

In other implementations, the encoder uses different cost functions and/or considers more or less information. Alternatively, the encoder evaluates the fitness of an extrapolation mode using an open-loop or heuristic approach.

The encoder determines (1250) whether it should continue checking additional extrapolation modes. The encoder stops if it has checked the last extrapolation mode in a rank order. The encoder can do a full search of all extrapolation modes. Alternatively, the encoder terminates the search if certain conditions are satisfied. For example, the encoder terminates the search if the fitness measure for the mode the encoder just checked exceeds the fitness measure of the best mode checked so far, with the assumption that matches get worse further down in the rank order. Or, the encoder can terminate on other conditions.

If the encoder determines (1250) it should not continue, the technique (1200) ends and the encoder goes on with the encoding of the extrapolation mode and residual error, reconstruction, etc. Otherwise, the encoder gets (1270) and checks (1230) the next extrapolation mode in the rank order.

3. Horizontal and Vertical Modes

Figure 13:
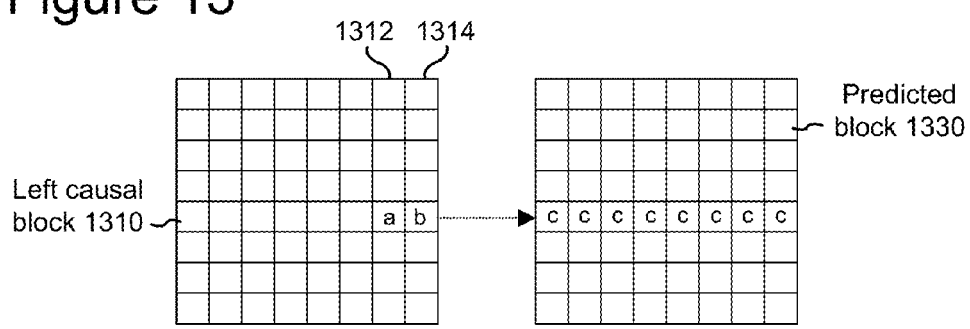
FIG. 13 is a diagram of showing a horizontal extrapolation mode used in spatial extrapolation for a block of pixels.

FIG. 13 illustrates horizontal extrapolation mode (mode index 8). On a row-by-row basis, the pixel values a and b in the two rightmost columns (1312, 1314) in the reconstructed block (1310) to the left of the predicted block (1330) are averaged. The averaged value c is copied across all columns of the corresponding row of the predicted block.

$$c = \left\lfloor \frac{a+b+1}{2} \right\rfloor, \quad (4)$$

where $\lfloor \ \rfloor$ is a downward rounding operation.

The vertical extrapolation mode (mode index 4) is the transpose of horizontal extrapolation mode. In other words, on a column-by-column basis, the pixel values a and b in the bottom two rows of the reconstructed block to the top of the predicted block are averaged. The averaged value c is copied across all rows of the corresponding column of the predicted block.

Alternatively, the encoder and decoder use other formulas for horizontal and vertical extrapolation.

4. Diagonal Modes

FIG. 14a shows pseudocode (1410) defining predictors for additional modes for spatial extrapolation, including seven diagonal extrapolation modes. The diagonal extrapolation modes (with mode indices 1-3, 5-7 and 9) roughly correspond to extrapolations in increments of approximately 22.5 degrees proceeding counter-clockwise.

Alternatively, the encoder and decoder use other formulas for diagonal extrapolation.

5. Blended Modes

FIG. 14b shows pseudocode (1420) for two additional extrapolation modes (indices 10 and 11), a blended horizontal mode and a blended vertical mode. The blended horizontal mode and blended vertical mode blend features from both the top and left blocks while predicting the current block. The blend is a linear combination of corresponding horizontal and vertical prediction edge pixels.

The blended modes are the default modes under certain circumstances, depending on context. For example, for some blocks, if the range of immediate neighboring values is less than 2QP, a blended horizontal or vertical extrapolation mode is used for a horizontal or vertical predicted mode, respectively, and extrapolation mode information is not transmitted.

Alternatively, the encoder and decoder use other formulas for blended extrapolation.

6. Null Mode

The null mode is the most common mode for low bitrate applications. FIG. 14c shows pseudocode (1430) used in a fast implementation of a null extrapolation mode (mode index 0, also called a bi-directional extrapolation mode). The null extrapolation mode extrapolates the current block from its causal neighbors independent of direction. The idea is to predict pixel pCurr[i][j] as a linear combination of pTop and pLeft elements (e.g., 12 pTop elements and 8 pLeft elements), with weights being proportional to a negative exponent of the distance. In practice, however, this form is slow to compute.

Therefore, in one implementation, the null extrapolation mode is based on an approximate separable reformulation of the above that is faster to compute. In this simplification, the encoder computes two arrays of cumulants corresponding to the pixel locations of the predicting edges. The current predicted pixel is then a linear sum of one element from each cumulant array.

The first stage of building the cumulant arrays is to set up an array of weights roughly corresponding to lowpass filtered left and top predicting edge pixels. These cumulant arrays are labeled pLeftSum and pTopSum respectively. FIG. 14c shows pseudocode (1430) used to build cumulant arrays in this fast implementation.

Once the arrays pLeftSum and pTopSum are set up, the predicted block is computed by summing the appropriate element from each array, using the rule. pCurr[i][j]=(pTopSum[j]*pWtsT[i][j]+pLeftSum[i]*pWtsL[i][j]+32768)>>16, where the weight arrays pWtsT[i][j] and pWtsL[i][j] are shown in FIG. 14d.

Alternatively, the encoder and decoder use other formulas for bi-directional extrapolation or different weights.

7. Flat Mode

The flat extrapolation mode (no index number) is used under circumstances in which the encoder finds little significant information in the causal boundary of the current block. Therefore, the encoder assigns to each pixel of the current block an average value from the causal boundary. For example, the encoder computes a DC value iDcValue:

$$iDcValue = \left\lfloor \frac{\sum_{0 \le i \le 9} pTop[i] + \sum_{0 \le i \le 8} pLeft[i] + 9}{19} \right\rfloor. \quad (5)$$

The flat mode is the default mode under certain circumstances, depending on context. For example, for some blocks, if the range of immediate neighboring values is less than 3, flat mode is used and extrapolation mode information is not transmitted. The residual block for a block predicted in flat mode is computed and encoded. Special treatment of predicted blocks and residual blocks under flat mode is further described below.

Alternatively, the encoder and decoder use other formulas for flat extrapolation.

B. Orientation Transmission

The encoder transmits the orientation of the predicted block (i.e., the extrapolation mode or differential rank ordering) when the decoder needs such information to determine the actual extrapolation mode of the predicted block. Under certain circumstances (e.g., the circumstances discussed above with respect to initialization of context), the encoder does not transmit (nor does the decoder expect) orientation information.

In one implementation, the encoder transmits orientation information only for luminance blocks, not chrominance blocks, of macroblocks. The chrominance blocks are spatially extrapolated using information provided or derived for the luminance blocks (e.g., information for the top-left luminance blocks, median information, mean information).

When the encoder selects extrapolation mode using prediction, the encoder can send (and the decoder can receive) extrapolation mode information as a difference between the actual extrapolation mode and a predicted extrapolation mode, for example, a rank order differential. A rank order differential is an index in a rank order. The rank order can be associated with a predicted extrapolation mode, in which case the encoder/decoder selects a rank order conditioned on the direction of the predicted extrapolation mode. For example, exemplary orderings for null, horizontal, and vertical predicted extrapolation modes are shown above in Table 4. Alternatively, the encoder uses different rank orders and/or rank orders for more or fewer predicted extrapolation modes.

If a decoder receives a differential index 7 for a block whose predicted extrapolation mode is horizontal, orderArrayH[7] gives the actual orientation to be mode 2 (diagonal from the top-right). Orderings are designed for coding efficiency—shorter variable length codes are assigned to earlier indices for more likely modes, and longer variable length codes are assigned to later indices for less likely modes. Table 5 shows Huffman code tables for differential orientation values in one implementation. Specifically, Table 5 shows two Huffman code tables for typical low bitrate conditions (e.g., indicated by QP>12). A flag signaled in the bitstream indicates which set of codes (e.g., set 0 or set 1) to use. In this implementation, different sets of Huffman code tables are used for typical high bitrate conditions (e.g., indicated by QP<=12). Other implementations use different entropy codes and/or different code tables for different predicted orientations.

TABLE 5

Huffman Codes for Differential Orientation Values, Low Bitrate

| DIFFORIENT | Code Set 0 | | Code Set 1 | |
|---|---|---|---|---|
| | Code | Length | Code | Length |
| 0 | 0 | 2 | 0 | 1 |
| 1 | 1 | 2 | 2 | 2 |
| 2 | 4 | 3 | 6 | 3 |
| 3 | 5 | 3 | 1c | 5 |
| 4 | 6 | 3 | 1d | 5 |
| 5 | 38 | 6 | 78 | 7 |
| 6 | 1d | 5 | 3d | 6 |
| 7 | 39 | 6 | 79 | 7 |
| 8 | 3c | 6 | 7c | 7 |
| 9 | 3d | 6 | 7d | 7 |
| 10 | 3e | 6 | 7e | 7 |
| 11 | 3f | 6 | 7f | 7 |

Figure 15:
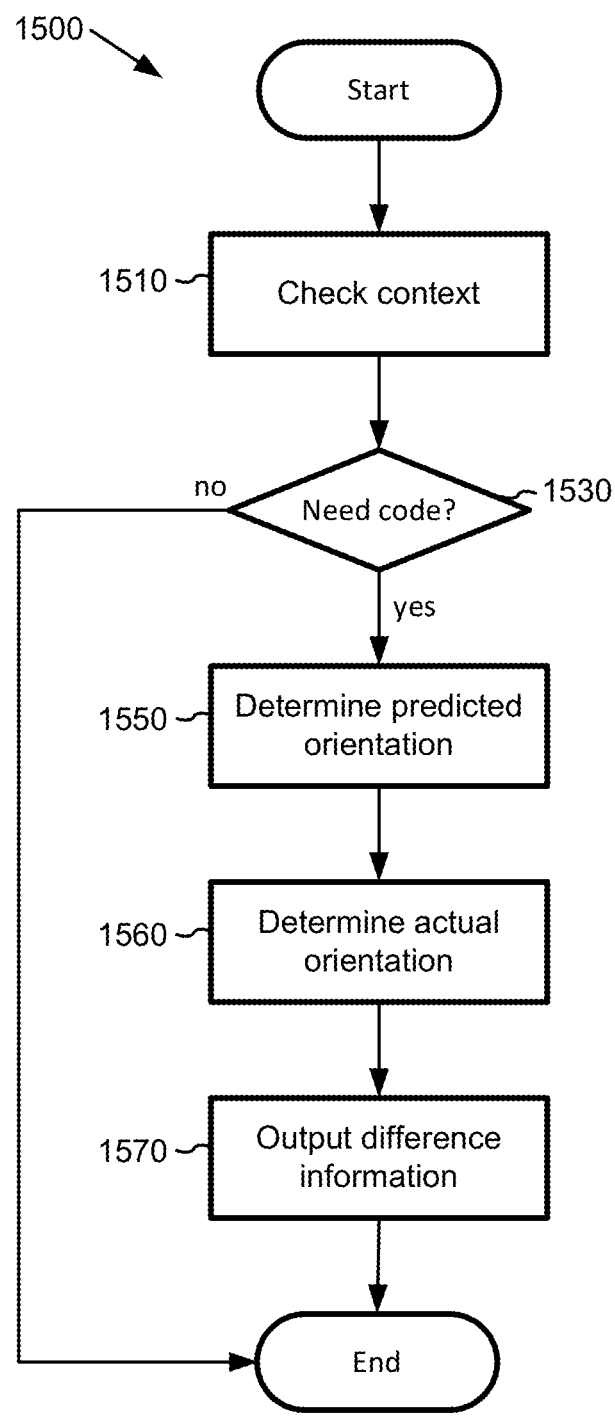
FIG. 15 is a flowchart showing a technique for encoding extrapolation mode information in a video encoder.

FIG. 15 shows a technique for encoding extrapolation mode information, and FIG. 16 shows a technique for decoding extrapolation mode information. By transmitting extrapolation mode information only when such information cannot be ascertained from context, overall bitrate is reduced and the decoder is sped up. For the sake of simplicity, FIGS. 15 and 16 do not show the various ways in which the techniques (1500, 1600) can be used in conjunction with other techniques.

With reference to FIG. 15, an encoder checks (1510) the coding context for encoding a predicted block. For example, the encoder checks the range of immediate neighboring pixels to the predicted block.

The encoder determines (1530) whether it needs to send a code or other extrapolation mode information to the decoder. For example, if the range is less than 3 or less than 2 QP, a default mode (e.g., flat, null, horizontal blended, or vertical blended) is used, and the encoder does not need to send rank order index information to the decoder. If the encoder does not need to send a code or other information, the technique ends.

Otherwise, the encoder determines (1550) the predicted orientation of the predicted block. For example, the encoder uses the predicted extrapolation mode computed during initialization. The encoder then determines (1560) the actual orientation of the predicted block. For example, the encoder uses the actual extrapolation mode as computed above by evaluating potential orientations in a rank ordering.

The encoder outputs (1570) difference information indicating the difference between the actual orientation and the predicted orientation of the predicted block. For example, the encoder outputs a Huffman code for a rank order index that indicates the difference between a predicted extrapolation mode and an actual extrapolation mode in a rank order.

With reference to FIG. 16, a decoder checks (1610) the decoding context for decoding a predicted block. For example, the decoder checks the range of immediate neighboring pixels to the predicted block.

The decoder determines (1630) whether to expect a code or other extrapolation mode information from the encoder. For example, if the range is less than 3 or less than 2 QP, a default mode (e.g., flat, null, horizontal blended, or vertical blended) is used, and the encoder does not need to send rank order index information to the decoder. If the decoder does not receive a code or other information, the technique ends.

Otherwise, the decoder determines (1650) the predicted orientation of the predicted block. For example, the decoder uses a predicted extrapolation mode computed during initialization.

The decoder then decodes (1660) difference information received from the encoder. The difference information indicates a difference between the predicted orientation and an actual orientation of the predicted block. For example, the difference information is a Huffman code for a rank order index that indicates the difference between a predicted extrapolation mode and an actual extrapolation mode in a rank order.

The decoder computes (1670) the actual orientation of the predicted block. For example, the decoder combines a predicted extrapolation mode with a rank order index to determine an actual extrapolation mode in a rank ordering.

C. Re-Oriented Frequency Transform

In the residual block for a spatially extrapolated block of pixels, variance typically increases sharply from points near to point far from the abutting causal block(s). The local spatio-frequency description of the pixels varies correspondingly. The residual error of spatial prediction is typically smaller at pixels close to the block edges abutting causal block(s) from which the prediction is made. For example, for a block predicted in null mode, the abutting causal blocks are both the left and top blocks. For a horizontal (alt. vertical) extrapolator, pixels lying on the left column (alt. top row) show smaller prediction residuals.

These observations suggest the use of a re-oriented frequency transform that shows an upward trend in values at spatial locations away from the prediction edge(s). The re-oriented frequency transform addresses non-stationarity of prediction residuals, resulting in more efficient compression of the prediction residuals.

Figure 17A:
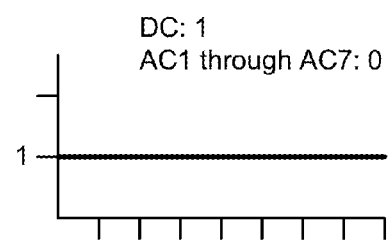
FIGS. 17a and 17b are graphs illustrating a difference between regular and re-oriented inverse frequency transforms.
Figure 17B:
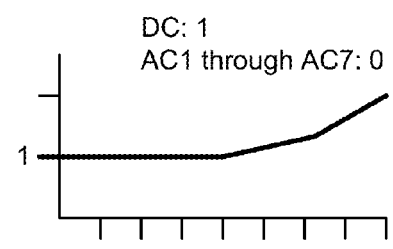

FIGS. 17a and 17b are graphs illustrating a difference between regular and re-oriented inverse frequency transforms for a row of 8 residual pixels represented with a DC coefficient of 1 and AC coefficients of 0. FIG. 17a shows the values if reconstructed using a regular inverse frequency transform. Each value has the average value represented by the DC coefficient. FIG. 17b shows the values if reconstructed using a re-oriented inverse frequency transform. The values start at the average value for the early residual pixels, but increase for the later residual pixels. In FIG. 17b, the re-oriented frequency transform has an influence only on the DC coefficient, while sparing the AC coefficients of the block from modifications. In alternative embodiments, the re-oriented frequency transform has an influence on one or more of the AC coefficients as well.

One embodiment of a re-oriented frequency transform uses basis functions that show an upward trend in values at spatial locations away from the prediction edge(s). Such basis functions are not easily implemented in practice. Therefore, some embodiments of a re-oriented frequency transform use an approximation of such an ideal frequency transform to exploit non-stationarity across pixels in a residual block in the encoding of the residual block. The approximation uses lifting in the encoder and inverse lifting in the decoder. In contrast to prior art methods that use lifting in the spatial domain, the encoder and decoder use lifting and inverse lifting in the frequency domain.

Figure 18:
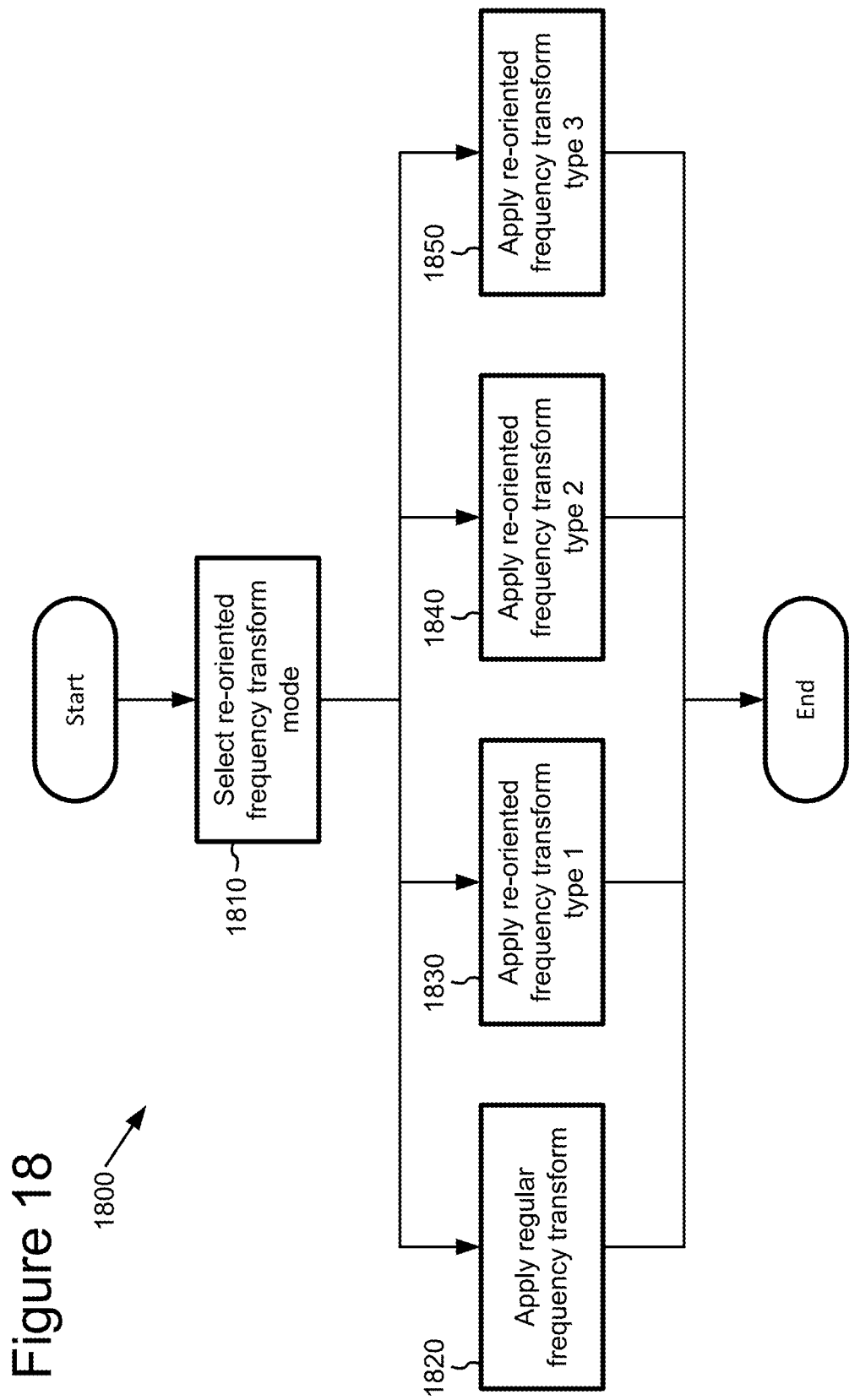
FIG. 18 is a flowchart showing a technique for encoding a block of spatial extrapolation error values using one of multiple available re-oriented frequency transforms.

A video encoder can switch between multiple available re-oriented frequency transform modes, as shown in FIG. 18. The encoder selects (1810) a re-oriented frequency transform mode. For example, depending on the general orientation of the spatial extrapolation used for a predicted block, the encoder selects from among re-oriented transforms that skew the residual block vertically, horizontally, bi-directionally, or not at all. The horizontal re-oriented transform is used for predictors that are largely horizontal (e.g., extrapolation orientation of $\pm\pi/8$ to the horizontal axis). Likewise, the vertical re-oriented transform is used for vertical and near-vertical extrapolators. The bi-directional transform is used for the null and largely diagonal extrapolation directions. All other predictions use a regular transform. The video encoder can switch transform modes for luminance blocks and chrominance blocks with the same decision or different decisions. The encoder then applies the selected type of transform (1820, 1830, 1840, 1850) to the residual block. While FIG. 18 shows four available transform modes (including regular mode), alternative embodiments use more or fewer transform modes, transform modes in different directions, and/or other criteria for selecting transform mode. For the sake of simplicity, FIG. 18 does not show the various ways in which the technique (1800) can be used in conjunction with other techniques.

In one implementation, the re-oriented transforms are re-oriented variations of DCT termed skewed DCT. Using a skewed DCT results in improved coding efficiency. The skew of the DCT is horizontal, vertical, or bi-directional and relates to the extrapolation mode of the predicted block. The horizontal and vertical SDCTs are skewed in one dimension only, whereas the null SDCT is skewed in both dimensions. Also, the horizontal and vertical skews are transposes.

The skewed inverse DCT is defined:

$$SIDCT(T) = T(0,0)B_*(0,0) + \sum_{\substack{i,j=0\ldots 7 \\ i+j>0}} T(i,j)B(i,j), \quad (6)$$

where T( ) is an array of frequency coefficients, B( ) is a set of basis functions, and $B_*(0,0)$ is the DC basis function for a frequency transform mode indicated by the subscript *, for example, H, V, or O for horizontal, vertical, or null (bi-directional) transform modes.

The forward SDCT is not orthonormal, and can be defined in terms of the pseudoinverse of the inverse SDCT. This potentially affects all coefficients of the forward transform. An approximation to the pseudoinverse is obtained using lifting and inverse lifting.

Figure 19A:
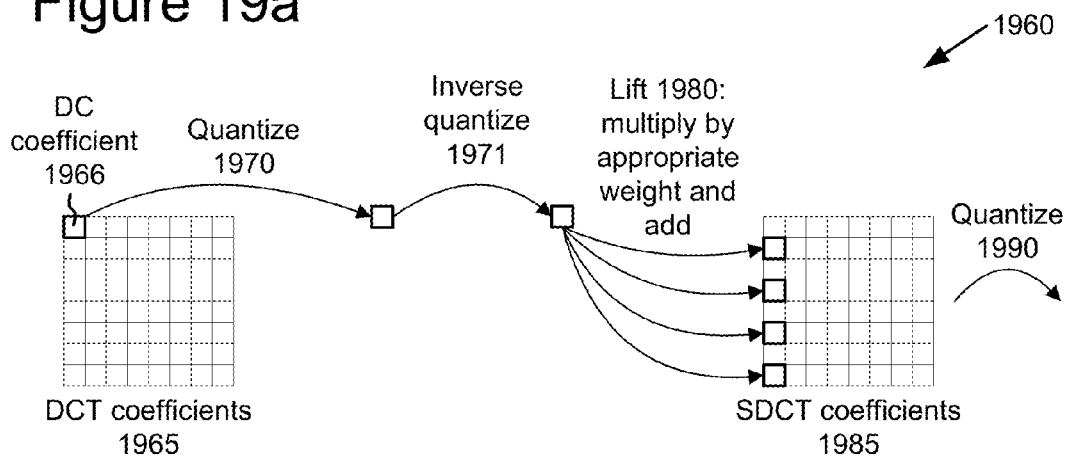
FIG. 19a is a diagram showing encoding of a block of spatial extrapolation error values using a skewed DCT.

FIG. 19*a* illustrates the use of lifting (1960) in an encoder during compression of an 8×8 residual block to implement a skewed DCT in one implementation. The lifting is a reversible operation. After the encoder applies a DCT to the 8×8 residual block, resulting in an 8×8 block of DCT coefficients (1965), the encoder quantizes (1970) the DC DCT coefficient (1966). For example, the encoder applies the quantization described in the next section for DC coefficients. The encoder then inverse quantizes (1971) the DC DCT coefficient (1966). This operation ensures that the encoder and decoder use the same value for the DC DCT coefficient (1966) in lifting and inverse lifting operations.

The encoder then lifts (1980) one or more of the DCT coefficients, where the lifting is a function of the reconstructed DC DCT coefficient value (1966). The DCT transform lifting occurs by subtracting the DC DCT coefficient (1966) from certain coefficients of the DCT coefficients. Namely, the encoder adjusts selected AC coefficients of the left column (as shown in FIG. 19*a*) or selected AC coefficients of the top row (not shown in FIG. 19*a*), as described below.

The lifting (1980) produces a block of skewed DCT coefficients (1985), which the encoder then quantizes (1990), for example, using a technique described in the next section. In alternative embodiments, the encoder performs lifting as a function of coefficients other than or in addition to the DC coefficient, adjusts coefficients other than the AC coefficients shown in FIG. 19*a*, and/or uses a frequency transform other than DCT.

Figure 19B:
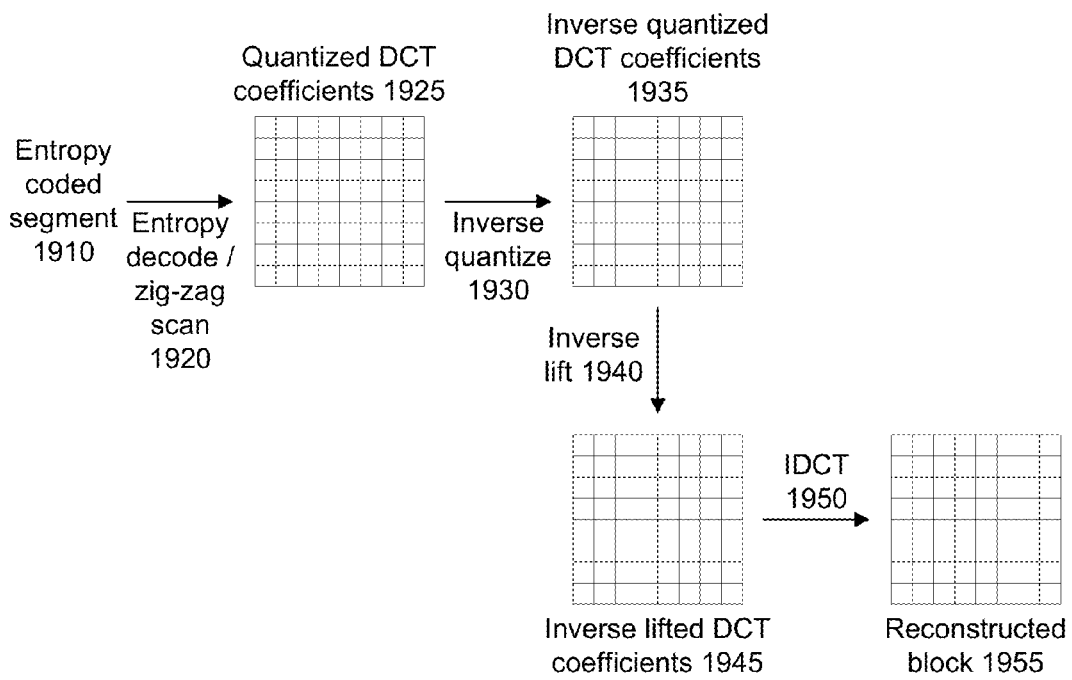
FIG. 19b is a diagram showing decoding of a block of spatial extrapolation error values using a skewed inverse DCT.
Figure 20C:
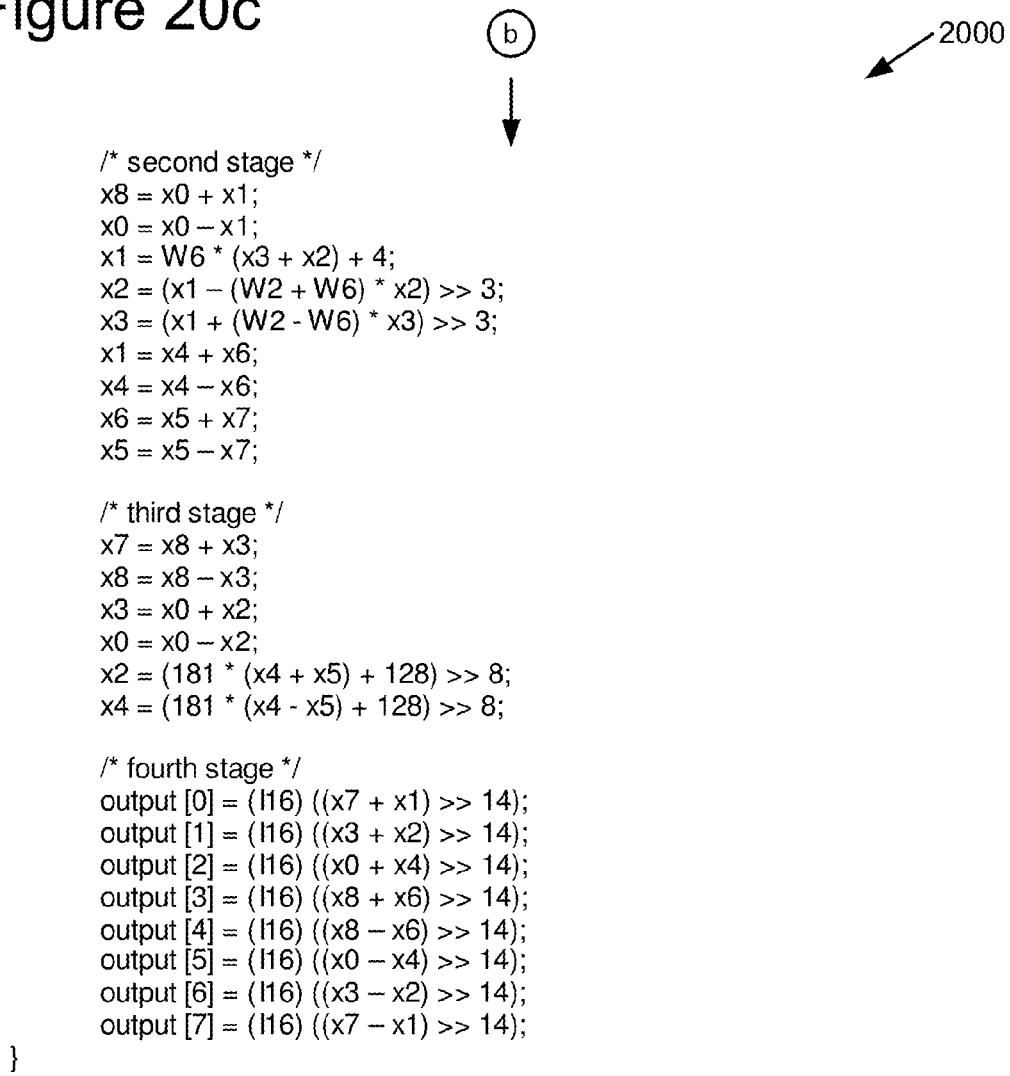

FIG. 19*b* illustrates the use of inverse lifting in a decoder during reconstruction of an 8×8 residual block to implement a skewed inverse DCT. A decoder receives an entropy coded segment (1910) and entropy decodes and scans (1920) the segment into a two-dimensional block (1925) of quantized DCT coefficients. The decoder inverse quantizes (1930) the DCT coefficients. The decoder then inverse lifts (1940) one or more of the coefficients in the block (1935) of inverse quantized DCT coefficients. The inverse lifting process is described in detail below. Finally, the decoder applies (1950) an inverse DCT to the block (1945) of inverse lifted coefficients. FIGS. 20*a*-20*c* show pseudocode (2000) for 8-point IDCT operations for rows and columns in one implementation. For an 8×8 block, an 8-point one dimensional IDCT operation RowIDCT_8Point( ) is performed on each of the 8 rows of the block, then an 8-point one dimensional IDCT operation ColumnIDCT_8Point( ) is performed on each of the 8 resultant columns.

Inverse lifting modifies the inverse quantized transform coefficients to weight the DC response at pixels distant from the predicting edge(s). In one implementation, the decoder can use any one of four lifting modes which correspond to four skewed IDCT modes. The first lifting mode leaves the DCT coefficients untouched. The second and third lifting modes operate on the first row and column of the coefficients, respectively, resulting in horizontal and vertical weighting. The fourth lifting mode operates across the entire block. The second, third and fourth lifting modes are termed horizontal, vertical and bi-directional lifting modes, respectively. The four lifting modes correspond to, in order, regular IDCT, and horizontal, vertical and bi-directional re-oriented IDCTs.

The horizontal and vertical lifting modes are transposes of each other. Let the input inverse quantized transform coefficient matrix for the current block be denoted by pBlock[i][j], where i and j vary from 0 through 7. The horizontal lifting mode modifies four coefficients of the block according to:

$$pBlock[0][1] = pBlock[0][1] - \left\lfloor \frac{6269 \cdot pBlock[0][0] + 32768}{65536} \right\rfloor, \quad (7)$$

$$pBlock[0][3] = pBlock[0][3] - \left\lfloor \frac{708 \cdot pBlock[0][0] + 32768}{65536} \right\rfloor, \quad (8)$$

$$pBlock[0][5] = pBlock[0][5] - \left\lfloor \frac{172 \cdot pBlock[0][0] + 32768}{65536} \right\rfloor, \quad (9)$$

$$pBlock[0][7] = pBlock[0][7] - \left\lfloor \frac{73 \cdot pBlock[0][0] + 32768}{65536} \right\rfloor. \quad (10)$$

The bi-directional lifting mode uses the following rule $$pBlock[i][j] = pBlock[i][j] - \\ \text{sgn}(pBwt[i][j]) \cdot \left\lfloor \frac{|pBwt[i][j]| \cdot pBlock[0][0] + 32768}{65536} \right\rfloor. \quad (11)$$

where pBwt is the 8×8 array of weights shown in FIG. 21. Alternatively, different lifting formulas and/or weights are used.

The flat condition is a particular situation where the skewed transform presents a liability rather than an advantage. In such situations, the encoder and decoder use the ordinary DCT/IDCT on the residual for a current block. The flat condition is indicated by a coincidence of (i) range less than 3 among luminance pixels in the causal boundary of the current block (which would activate flat extrapolation mode), (ii) quantized DC coefficient being −1, 0 or 1, and (iii) no non-zero AC coefficients. Without any adjustment for the flat condition for such blocks, banding artifacts are observed resulting from "hunting" and quantization of skewed values. Lack of detail in the block makes these artifacts stand out and visually annoying.

Adjustment for the flat condition proceeds by setting all pixels in the block to a common DC value. This DC value is determined as shown in the code below, where iDC is the quantized DC coefficient, and the predicting edge DC value iDcValue is determined during setup. After adjusting for iDC, the DC value is stored back in iDcValue.

iDC+=QuantizeDC(iDcValue<<3);

iDcValue=clamp((DequantizeDC(iDC)+4)>>3);

where clamp( ) returns its integer argument clamped between 0 and 255. Quantization and dequantization of DC coefficients (QuantizeDC and DeuantizeDC) are defined in the next section. The flat condition triggers the flat prediction mode in which all pixels in the predicted block are set to iDcValue. Alternatively, the flat condition is implemented with other formulas.

FIG. 22 shows techniques (2200) for lifting and inverse lifting in embodiments in which the lifting and inverse lifting are functions of the DC coefficient. With reference to FIGS. 19a and 19b, in one implementation, a video encoder uses a skewed DCT and a video decoder uses a skewed inverse DCT. For the sake of simplicity, FIG. 22 does not show the various ways in which the technique (2200) can be used in conjunction with other techniques.

Following a frequency transform (e.g., DCT) of a residual block, the encoder (2210) quantizes the DC coefficient. The encoder reconstructs the DC coefficient by inverse quantization for use in later computations. The encoder then lifts (2220) one or more of the AC coefficients by adjusting the one or more AC coefficients as a function of the quantized DC coefficient. The encoder then quantizes (2230) the AC coefficients. Following steps in the encoder such as scanning and entropy coding of the quantized coefficients are not shown in FIG. 22.

In the decoder, following entropy decoding and scanning (not shown), the decoder inverse quantizes (2240) the AC coefficients and inverse quantizes (2250) the DC coefficient. The decoder then (2260) inverse lifts the one or more of the AC coefficients that were lifted by the encoder. The decoder then applies an inverse frequency transform (not shown) such as an inverse DCT to the inverse lifted coefficients.

In FIG. 22, the lifting and inverse lifting are a function of the DC coefficient. In alternative embodiments, the lifting and inverse lifting are a function of one or more AC coefficients as well.

D. Quantization and Dequantization

The video encoder quantizes the frequency coefficients of the residual blocks. In decoding, the video decoder inverse quantizes the frequency coefficients of the residual blocks.

In one embodiment, the DC transform coefficient of a block is quantized by a flat quantizer. The reconstruction rule to generate $\hat{y}$ given the quantized coefficient x is $\hat{y}=x \cdot QP$, where QP is the quantization parameter. Quantization of AC transform coefficients is performed by a nearly-flat quantizer which has equally sized bins, except for the wider bin centered at zero. When the quantized input AC transform coefficient is x, the dequantized reconstruction $\hat{y}$ is given by:

$$\hat{y} = \left\lfloor \frac{(x \cdot 2 \cdot QP + \text{sgn}(x) \cdot QP)R}{256} \right\rfloor, \qquad (12)$$

where QP is the quantization parameter and R is a reconstruction value that is either a constant for all transform coefficients or a position-dependent value. The former case is the default mode of operation, while the latter case is termed non-flat (de)quantization. In the default mode, R is 256. In this mode, the division and round-down step may be eliminated. For non-flat (de)quantization, the value of R is determined from the array gaReconstructionLevels[ ] shown in FIG. 23. The element of the array to be used is the index of the transform coefficient in the zigzag scan, counting the DC coefficient as well.

The variable QP denotes the quantization step size. In practice, QP refers to two distinct step sizes, which are stepSize and stepSizeC. The latter quantity is used only for the chrominance DCT DC coefficient, and is related to stepSize as:

$$stepSizeC = \left\lfloor \frac{9 \cdot stepSize + 3}{8} \right\rfloor. \qquad (13)$$

In embodiments that use the flat condition, quantization is defined at the decoder as well as the encoder. Quantization of DC coefficients proceeds by first computing an integer inverse QP:

$$iQP = \left\lfloor \frac{65536 + \lfloor QP/2 \rfloor}{QP} \right\rfloor. \qquad (14)$$

The quantized value x corresponding to raw integer DC coefficient y is:

$$\left\lfloor \frac{y \cdot iQP + 32768}{65536} \right\rfloor. \qquad (15)$$

The dequantized value $\hat{y}$ of quantized DC coefficient x is xQP.

Alternatively, the encoder/decoder use different techniques for quantization/dequantization.

E. Scan Order

Following quantization in the video encoder, the encoder scans a two-dimensional block of quantized frequency coefficients into a one-dimensional array for entropy encoding. The video decoder scans the one-dimensional array into a two-dimensional block before inverse quantization. A scan pattern indicates how elements of the two-dimensional block are ordered in the one-dimensional array. Both the encoder and the decoder use one or more scan patterns.

Figure 24:
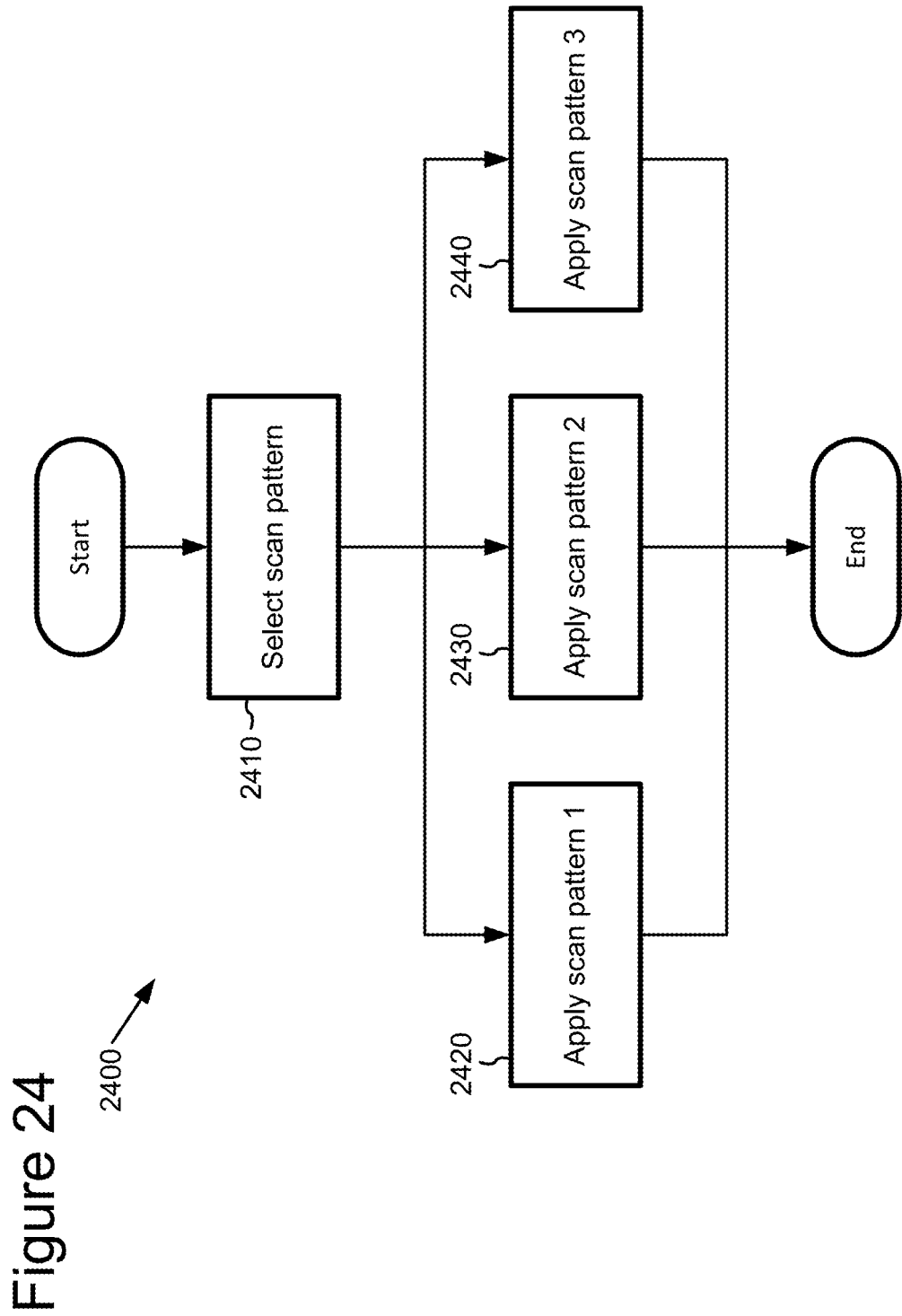
FIG. 24 is a flowchart showing a technique for scanning residual block values into a one-dimensional array using one of multiple available scan patterns.

In some embodiments, the encoder and decoder select between multiple, available scan patterns for a residual block. FIG. 24 shows a technique (2400) for selecting a scan pattern for a block of spatial extrapolation error values. FIG. 24 shows three available scan patterns. For example, these are horizontal, vertical, and null scan patterns. FIGS. 25a-25c show a null (i.e., normal) scan pattern (2501), a horizontal scan pattern (2502), and a vertical scan pattern (2503), respectively, in one implementation. Other implementations use different scan patterns and/or more or fewer scan patterns.

The encoder/decoder selects (2410) a scan pattern for scanning the residual block. For example, an encoder/decoder selects a scan pattern based upon contextual information for the block such as a meta-direction for the block. The meta-direction can be computed from the actual extrapolation mode of the block as shown in Table 2. For blocks which have only a predicted or default extrapolation mode, the meta-direction can be computed from that information. The encoder/decoder then applies (2420, 2430, or 2440) the selected scan pattern by reordering elements of a two-dimensional block into a one-dimensional array, or vice versa. For the sake of simplicity, FIG. 24 does not show the various ways in which the technique (2400) can be used in conjunction with other techniques.

Alternatively, the encoder/decoder selects between more or fewer scan patterns and/or selects a scan pattern based upon other criteria.

F. Significant Coefficient Estimation

Figure 26:
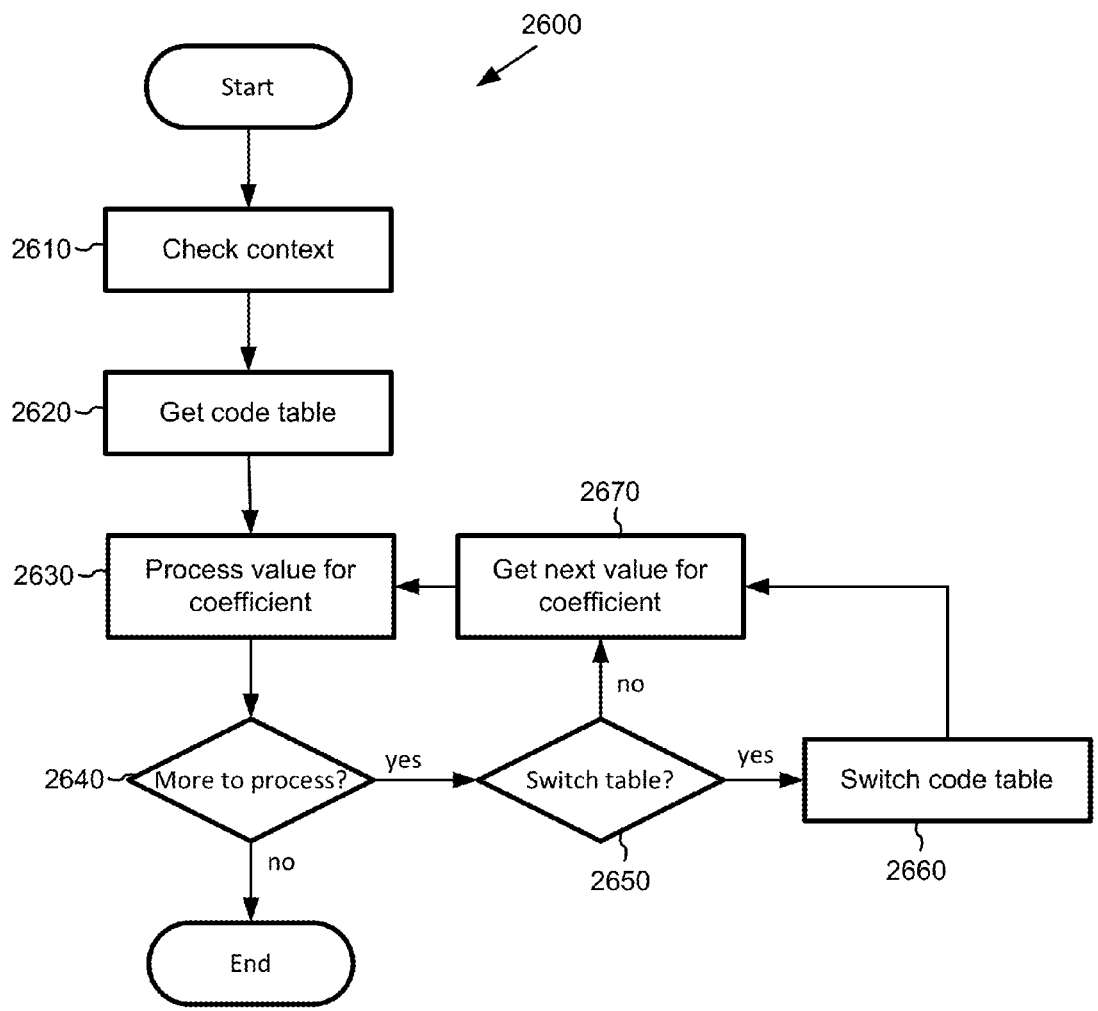
FIG. 26 is a flowchart showing a technique for selecting and switching between entropy code tables for encoding or decoding frequency coefficients for spatial extrapolation error values.

In the video encoder, quantized frequency coefficients that have been scanned into a one-dimensional array are entropy encoded using an entropy code table to map values to entropy codes. Conversely, in the video decoder, entropy-coded information is decoded into quantized frequency coefficients using an entropy code table to map entropy codes to values. FIG. 26 shows a technique for selecting and switching entropy code tables in an encoder/decoder when encoding/decoding frequency coefficients for an error block of a spatially predicted block. In one embodiment, the encoder/decoder encodes/decodes the first n AC coefficients using a first AC coefficient code table, and encodes/decodes the remaining AC coefficients using another AC coefficient code table. The quantized DC transform coefficient is coded using one of two DC coefficient code tables depending on whether n is zero. Alternatively, the encoder/decoder includes more than one code table switch (e.g. three or more batches of coefficients), uses different switching conditions (other than n), or applies table switching to more or fewer groupings of frequency coefficients (e.g., multiple different groups within the AC coefficients).

With reference to FIG. 26, the encoder/decoder checks (2610) context around the predicted block. The context is available at the encoder and the decoder, and forms a valid context for encoding and decoding. The context can be used for DC coefficients and/or AC coefficients. For example, the encoder/decoder computes a number n that predicts the number of significant coefficients in the error block. The encoder/decoder computes n based upon information in the causal neighbors of the predicted block. In one implementation, n is the minimum number of non-zero AC coefficients in the blocks to the left, top-left, and top of the predicted block. For blocks on the top row, n is the number of non-zero AC coefficients in the block to the left. Similarly, for blocks on the leftmost column, it is the number of non-zero AC coefficients in the block at the top. For the top left block, n is 16.

The encoder/decoder then selects (2620) an entropy code table. For example, the encoder/decoder selects the entropy code table used for the first batch of n frequency coefficients (up until the switch). Alternatively, the encoder/decoder use one of multiple available entropy code tables for the first batch of n frequency coefficients. The encoder can select the code table depending on contextual information, according to encoder settings, after closed loop testing of results with different tables, or after an open loop estimation of performance with different tables. The encoder can select the table for the first batch of coefficients on a sequence-by-sequence, frame-by-frame, block-by-block, switch-by-switch, or other basis. The encoder can use the same or different tables for luminance and chrominance information. When the table selection is not based upon context, the encoder outputs a flag or other information identifying the selected entropy code table. The decoder can select the code table based upon contextual information or based upon a table selection flag received from the encoder.

The encoder/decoder processes (2630) the value for a coefficient, for example, encoding a coefficient with an entropy code in the encoder, or decoding an entropy code to a coefficient value in the decoder. If the encoder/decoder determines (2640) that there are no more coefficients or entropy codes to process, the technique ends.

Otherwise, the encoder/decoder determines (2650) whether to switch entropy code tables. For example, the encoder/decoder checks whether it has encoded/decoded n coefficients yet.

If the encoder/decoder does not switch tables, the encoder/decoder gets (2670) the next value for a coefficient and processes (2630) it. For example, if n coefficients have not yet been processed, the encoder/decoder gets (2670) the next value for a coefficient and processes (2630) it.

Otherwise, the encoder/decoder switches (2660) tables. For example, the encoder/decoder selects the entropy code table used for the second batch of frequency coefficients (after n coefficients). Alternatively, the encoder/decoder use one of multiple available entropy code tables for the second batch of frequency coefficients, as previously described. The encoder/decoder then gets (2670) the next value for a coefficient and processes (2630) it.

For the sake of simplicity, FIG. 26 does not show the various ways in which the technique (2600) can be used in conjunction with other techniques.

In one implementation, an encoder and decoder use table switching based upon context as well as table selection information that is signaled. In a given I frame, all symbols of a certain type (or category) are encoded using one Huffman code table chosen out of a candidate set of tables for the type. The type is inferred from causal information available at the decoder. The index of the chosen table within the candidate set for the type is indicated by a fixed length code that precedes the first symbol of the particular type for the frame.

In this implementation, the type of a symbol includes a dependence on QP, which indicates typical low bitrate (e.g., QP>12) or high bitrate (e.g., QP<=12) conditions.

In this implementation, the DC coefficient (absolute value level) is coded jointly with a binary symbol last that signals whether there are any subsequent coefficients (last=false) or not (last=true). The joint symbol level-last is translated into a bin index and a fine address within the bin. The size of each bin (i.e., the number of joint level-last symbols in the bin, which can vary depending on the index) is known at the decoder and is $2^k$. The fine address for a bin is k bits long, uniquely and efficiently specifying the symbol within the bin. The index values are Huffman coded. Six types are defined for DC coefficients, three types each for low bitrate and high bitrate scenarios. The three types are shown in Table 6. Huffman code tables for each type are drawn from a candidate set of tables.

TABLE 6

Types for DC coefficients

| Type | Context |
|---|---|
| LH_INTRAZ | Luminance block; count n of non-zero AC coefficients in causal blocks is zero. |
| LH_INTRANZ | Luminance block; count n of non-zero AC coefficients in causal blocks is non-zero. |
| LH_INTRAC0 | Chrominance block. |

In this implementation, the first coded symbol (for the DC coefficient) in the transform block indicates whether there are subsequent AC value symbols. If there are, the AC value symbols are run-length encoded as a combination of run, level, and last values. The run value corresponds to the number of zero-values transform coefficients separating the current coefficient from the previously coded coefficient. Level is the magnitude of the current (nonzero) coefficient, and last is a boolean variable denoting whether the current coefficient is the last in the current block.

In this implementation, the run-level-last space is mapped into an index-fine space, where index is an address that partitions the run-level-last space into several bins (each bin containing $2^k$ symbols) and fine is k bits uniquely identifying symbols within bins. Some bins may contain only a single triple (k=0) whereas other bins contain multiple triples (k>0). For uncommon run-level-last values, index values may be used as escape symbols. The index values are Huffman coded. Eight types are defined for AC coefficients, four types each for low bitrate and high bitrate scenarios. The four types are shown in Table 7. Huffman code tables for each type are drawn from a candidate set of tables.

TABLE 7

Types for AC coefficients

| Type | Context |
|---|---|
| LH_INTER0 | Luminance block; DIFFORIENT value >4. |
| LH_INTRAY | Luminance block; DIFFORIENT <=4; current symbol count is less than count n of non-zero AC coefficients in causal blocks. |
| LH_INTRAY0 | Luminance block; DIFFORIENT <=4; current symbol count is greater than or equal to count n of non-zero AC coefficients in causal blocks. |
| LH_INTER | Chrominance block. |

Alternative embodiments use different entropy coding and decoding techniques.

G. In-loop Deblocking

Quantization and other lossy processing of the residual blocks for predicted blocks can introduce blocky artifacts into a frame. In some embodiments, an encoder/decoder applies a deblocking filter within a spatial extrapolation loop. The deblocking filter can be the same or different filter than a filter used in post-processing. The deblocking filter removes boundary discontinuities between a reconstructed predicted block and neighboring reconstructed blocks, which improves the quality of spatial extrapolation for subsequent predicted blocks. The encoder/decoder performs deblocking after decoding a block in order for spatial prediction to work as expected. This contrasts with the typical deblocking processes, which operate on the whole image after decoding.

Figure 28:
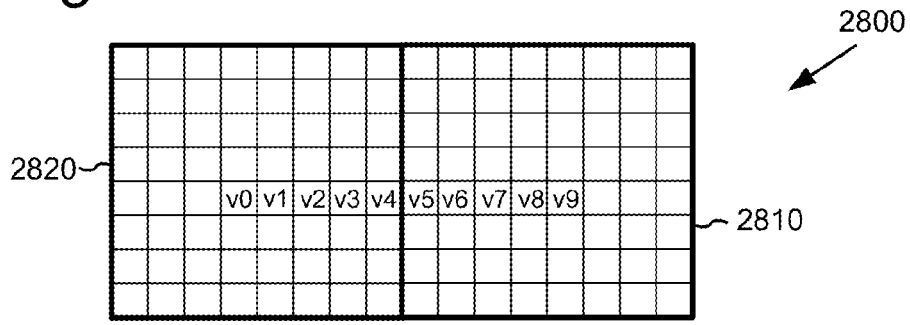
FIG. 28 is a diagram showing a horizontal deblocking filter used in spatial extrapolation of blocks of pixels.
Figure 27:
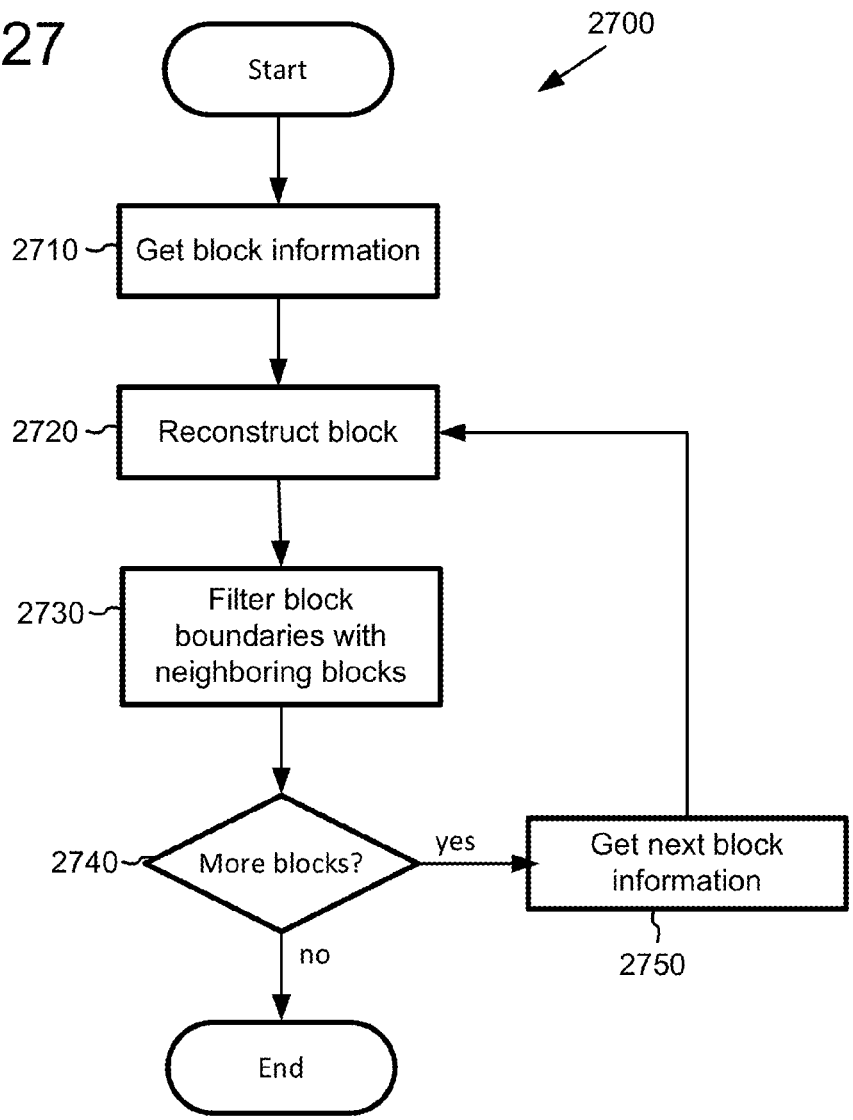
FIG. 27 is a flowchart showing a technique for applying a deblocking filter to blocks of a frame in a spatial extrapolation loop.

FIG. 27 shows a technique (2700) for reducing blockiness in a decoded frame using a deblocking filter in a video encoder or decoder. For the sake of simplicity, FIG. 27 does not show spatial extrapolation itself or other ways in which the technique (2700) can be used in conjunction with other techniques. FIG. 28 shows an example of pixel locations that are considered in one implementation for filtering the boundary between a predicted block (2810) and the block (2820) to its left. Block boundaries are marked by bold lines.

With reference to FIG. 27, a video encoder/decoder gets (2710) block information for a predicted block and reconstructs (2720) the predicted block. For example, the encoder/decoder gets extrapolation mode information and residual information, decompresses it if necessary, performs spatial extrapolation if necessary, and combines the residual and extrapolation to reconstruct the block.

The video encoder/decoder filters (2730) the boundaries of the predicted block with neighboring reconstructed blocks. For example, after decoding an 8×8 block in either luminance or chrominance planes, the left and top edges of the block are subjected to a deblocking filter process.

In one implementation, the deblocking procedure is similar to MPEG-4 deblocking with a key difference. The criterion for deciding the existence of a discontinuity is dependent on the quantization parameter QP, which allows the deblocking filter to disregard false discontinuities that may be caused by the skewed IDCT. A horizontal deblocking filter operates on a left-right pair of blocks, and a vertical deblocking filter operates on a top-bottom pair. Horizontal and vertical deblocking filters are transposes. The horizontal deblocking filter is explained here with reference to FIG. 28.

As in MPEG-4, two deblocking modes are used—one mode applies a short filter to one pixel on either side of the block edge whereas the other mode applies a longer filter to two pixels on either side. For each of the eight horizontal edge pixel-pairs labeled as v4-v5 in FIG. 28, an edge strength E is computed:

$$E = \phi(v0 - v1) + \phi(v1 - v2) + \phi(v2 - v3) + \phi(v3 - v4) + \phi(v4 - v5) + \phi(v5 - v6) + \phi(v6 - v7) + \phi(v7 - v8) + \phi(v8 - v9), \quad (16)$$

$$\phi(x) = \begin{cases} 1 & \text{if } |x| \leq T \\ 0 & \text{otherwise,} \end{cases} \quad (17)$$

$$T = \left\lfloor \frac{QP + 10}{8} \right\rfloor. \quad (18)$$

If E is less than 6, the encoder/decoder chooses the short filter, which is defined as in MPEG-4. If E is greater than or equal to 6, the range of the values v0 through v9 is computed. Range is defined as the maximum minus the minimum value of these ten variables. If the range is greater than or equal to 2QP, the encoder/decoder uses the short filter. Otherwise, the long filter is applied, and v3 through v6 are modified as follows $$v3' = \left\lfloor \frac{4v2 + 3v3 + v7 + 4}{8} \right\rfloor, \quad (19)$$

$$v4' = \left\lfloor \frac{3v2 + 3v4 + 2v7 + 4}{8} \right\rfloor, \quad (20)$$

$$v5' = \left\lfloor \frac{3v7 + 3v5 + 2v2 + 4}{8} \right\rfloor, \quad (21)$$

$$v6' = \left\lfloor \frac{4v7 + 3v6 + v2 + 4}{8} \right\rfloor. \quad (22)$$

The encoder/decoder performs no vertical deblocking for the top row of blocks and no horizontal deblocking for the left column. Horizontal deblocking is followed by vertical deblocking for the block. Other binary conditions relating to existence of residuals (which are non-zero transform coefficients for the current block) and absolute spatial orientation also apply:

```
deblock(int blockX, int blockY, bool bResidual, int iOrient)
{
    if ((blockY > 0) && (bResidual || (iOrient != 0 && iOrient != 4)))
        horizontalDeblockFilter( );
    if ((blockX > 0) && (bResidual || (iOrient != 0 && iOrient != 8)))
        verticalDeblockFilter( );
}
``` where blockX and blockY are horizontal and vertical block indices, bResidual is true when the flat condition is activated or when there is at least one non-zero coefficient in the residual, and iOrient is the absolute orientation direction.

In other implementations, the filter definitions, number of different filters, and/or adaptive filtering conditions are different than above. In alternative embodiments, only those pixels that contribute to spatial extrapolation of subsequent blocks are filtered by the in-loop deblocking filter.

Following the filtering, the encoder/decoder determines (2740) whether there are any more blocks in the frame. If not, the technique ends. If so, the encoder/decoder gets (2750) block information for the next predicted block and reconstructs (2720) the next predicted block.

In some embodiments, the video encoder enables or disables in-loop deblocking of predicted blocks based upon encoder settings, context information, or other criteria. The encoder can embed a switch at a frame, sequence, or other level to enable/disable deblocking.

IV. Interframe Encoding and Decoding

Interframe coding exploits temporal redundancy between frames to achieve compression. Temporal redundancy reduction uses previously coded frames as predictors when coding the current frame.

A. Motion Estimation

In one or more embodiments, a video encoder exploits temporal redundancies in typical video sequences in order to code the information using a smaller number of bits. The video encoder uses motion estimation/compensation of a macroblock or other set of pixels of a current frame with respect to a reference frame. A video decoder uses corresponding motion compensation. Various features of the motion estimation/compensation can be used in combination or independently. These features include, but are not limited to:

1a) Adaptive switching of the resolution of motion estimation/compensation. For example, the resolution switches between quarter-pixel and half-pixel resolutions.

1b) Adaptive switching of the resolution of motion estimation/compensation depending on a video source with a closed loop or open loop decision.

1c) Adaptive switching of the resolution of motion estimation/compensation on a frame-by-frame basis or other basis.

2a) Using previously computed results of a first motion resolution evaluation to speed up a second motion resolution evaluation.

2b) Selectively using integer-pixel motion information from a first motion resolution evaluation to speed up a second motion resolution evaluation.

2c) Using previously computed sub-pixel values from a first motion resolution evaluation to speed up a second motion resolution evaluation.

3) Using a search range with different directional resolution for motion estimation. For example, the horizontal resolution of the search range is quarter pixel and the vertical resolution is half pixel. This speeds up motion estimation by skipping certain quarter-pixel locations.

4) Using a motion information representation with different bit allocation for horizontal and vertical motion. For example, a video encoder uses an additional bit for motion information in the horizontal direction, compared to the vertical direction.

5a) Using a resolution bit with a motion information representation for additional resolution of motion estimation/compensation. For example, a video encoder adds a bit to half-pixel motion information to differentiate between a half-pixel increment and a quarter-pixel increment. A video decoder receives the resolution bit.

5b) Selectively using a resolution bit with a motion information representation for additional resolution of motion estimation/compensation. For example, a video encoder adds a bit to half-pixel motion information to differentiate between a half-pixel increment and a quarter-pixel increment only for half-pixel motion information, not integer-pixel motion information. A video decoder selectively receives the resolution bit.

For motion estimation, the video encoder establishes a search range within the reference frame. The video encoder can center the search range around a predicted location that is set based upon the motion information for neighboring sets of pixels. In some embodiments, the encoder uses a reduced coverage range for the higher resolution motion estimation (e.g., quarter-pixel motion estimation) to balance between the bits used to signal the higher resolution motion information and distortion reduction due to the higher resolution motion estimation. Most motions observed in TV and movie content tends to be dominated by finer horizontal motion than vertical motion. This is probably due to the fact that most camera movements tend to be more horizontal, since rapid vertical motion seems to make viewers dizzy. Taking advantage of this characteristic, the encoder uses higher resolution motion estimation/compensation that covers more horizontal locations than vertical locations. This strikes a balance between rate and distortion, and lowers the computational complexity of the motion information search process as well. In alternative embodiments, the search range has the same resolution horizontally and vertically.

Within the search range, the encoder finds a motion vector that parameterizes the motion of a macroblock or other set of pixels in the predicted frame. In some embodiments, with an efficient and low complexity method, the encoder computes and switches between higher sub-pixel accuracy and lower sub-pixel accuracy. In alternative embodiments, the encoder does not switch between resolutions for motion estimation/compensation. Instead of motion vectors (translations), the encoder can compute other types motion information to parameterize motion of a set of pixels between frames.

In one implementation, the encoder switches between quarter-pixel accuracy using a combination of four taps/two taps filter, and half-pixel accuracy using a two-tap filter. The encoder switches resolution of motion estimation/compensation on a per frame basis, per sequence basis, or other basis. The rationale behind this is that quarter-pixel motion compensation works well for very clean video sources (i.e., no noise), while half-pixel motion compensation handles noisy video sources (e.g., video from a cable feed) much better. This is due to the fact that the two-tap filter of the half-pixel motion compensation acts as a lowpass filter and tends to attenuate the noise. In contrast, the four-tap filter of the quarter-pixel motion compensation has some highpass effects so it can preserve the edges, but, unfortunately, it also tends to accentuate the noise. Other implementations use different filters.

After the encoder finds a motion vector or other motion information, the encoder outputs the information. For example, the encoder outputs entropy-coded data for the motion vector, motion vector differentials, or other motion information. In some embodiments, the encoder uses a motion vector with different bit allocation for horizontal and vertical motion. An extra bit adds quarter-pixel resolution horizontally to a half-pixel motion vector. The encoder saves bits by coding vertical motion vector at half-pixel accuracy. The encoder can add the bit only for half-pixel motion vectors, not for integer-pixel motion vectors, which further reduces the overall bitrate. In alternative embodiments, the encoder uses the same bit allocation for horizontal and vertical motions.

1. Resolution Switching

Figure 29:
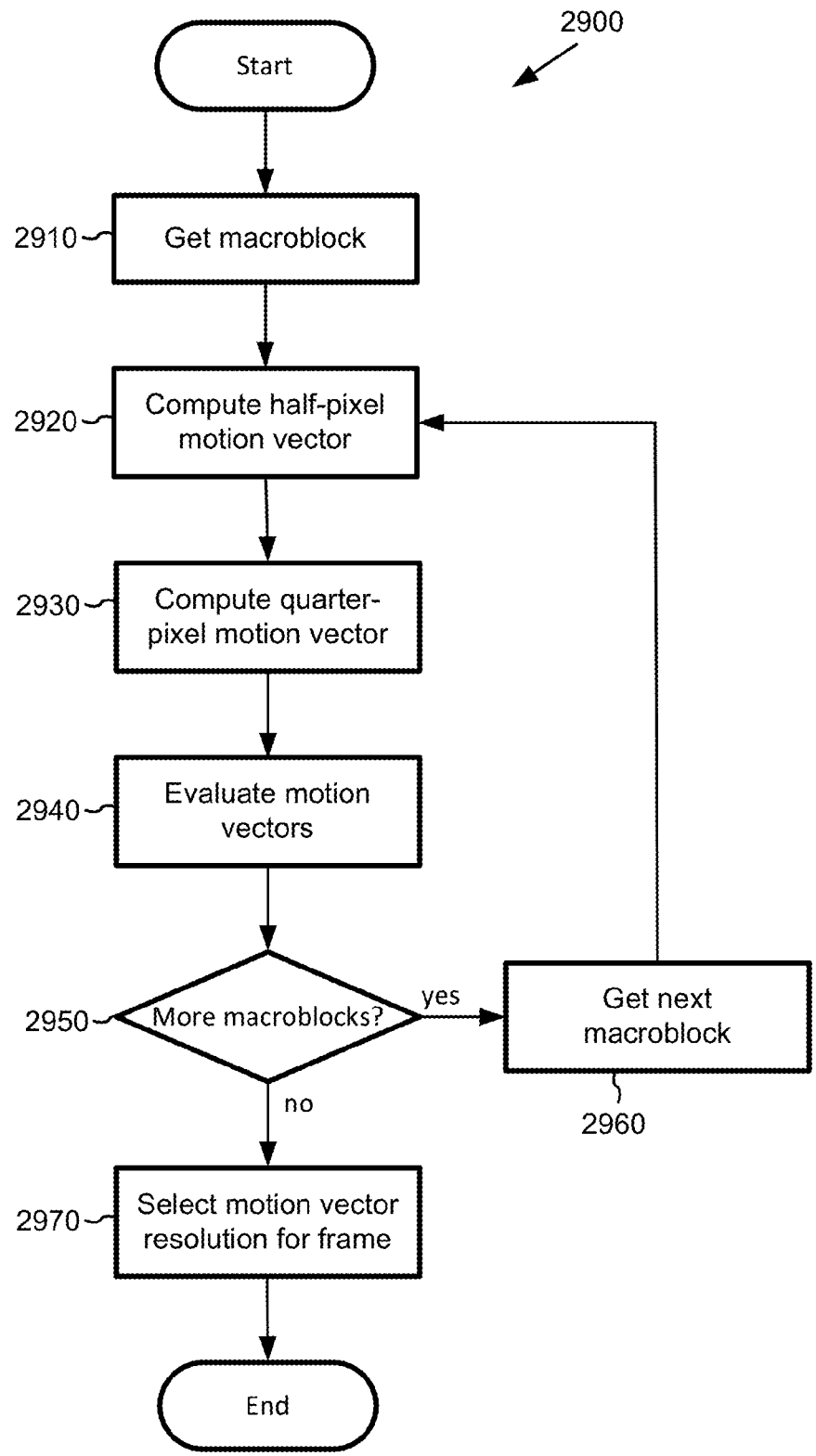
FIG. 29 is a flowchart showing a technique for selecting a motion estimation resolution for a predicted frame in a video encoder.

In some embodiments, a video encoder switches resolution of motion estimation/compensation. FIG. 29 shows a technique for selecting a motion estimation resolution for a predicted video frame. The encoder selects between half-pixel resolution and quarter-pixel resolution for motion vectors on a per frame basis. For the sake of simplicity, FIG. 29 does not show the various ways in which the technique (2900) can be used in conjunction with other techniques. In alternative embodiments, the encoder switches between resolutions other than quarter and half pixel, and/or switches at a frequency other than per frame.

The encoder gets (2910) a macroblock for a predicted frame and computes (2920) a half-pixel motion vector for the macroblock. The encoder also computes (2930) a quarter-pixel motion vector for the macroblock. The encoder evaluates (2940) the motion vectors. For example, for each of the motion vectors, the encoder computes an error measure such as sum of absolute differences ["SAD"], mean square error ["MSE"], a perceptual distortion measure, or another measure for the prediction residual.

Figure 30A:
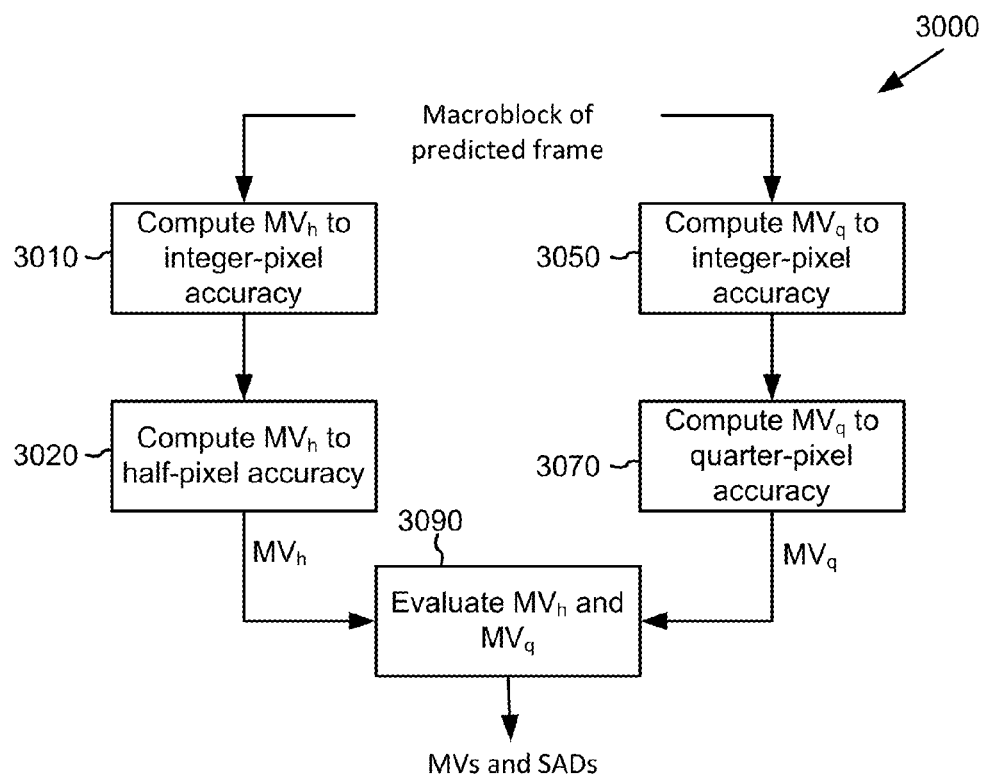
FIGS. 30a and 30b are flowcharts showing techniques for computing and evaluating motion vectors of a predicted frame in a video encoder.

In one implementation, the encoder computes and evaluates motion vectors as shown in FIG. 30a. For a macroblock, the encoder computes (3010) a half-pixel motion vector $MV_h$ in integer-pixel accuracy. For example, the encoder finds a motion vector by searching at integer increments within the search range. The encoder then computes (3020) $MV_h$ to half-pixel accuracy in a region around the first computed $MV_h$. In a separate path, the encoder computes (3050) a quarter-pixel motion vector $MV_q$ in integer-pixel accuracy and then computes (3070) $MV_q$ to quarter-pixel accuracy in a region around the first computed $MV_q$. The encoder then evaluates (3090) the final $MV_h$ and $MV_q$. Alternatively, the encoder evaluates the motion vectors later.

Figure 30B:
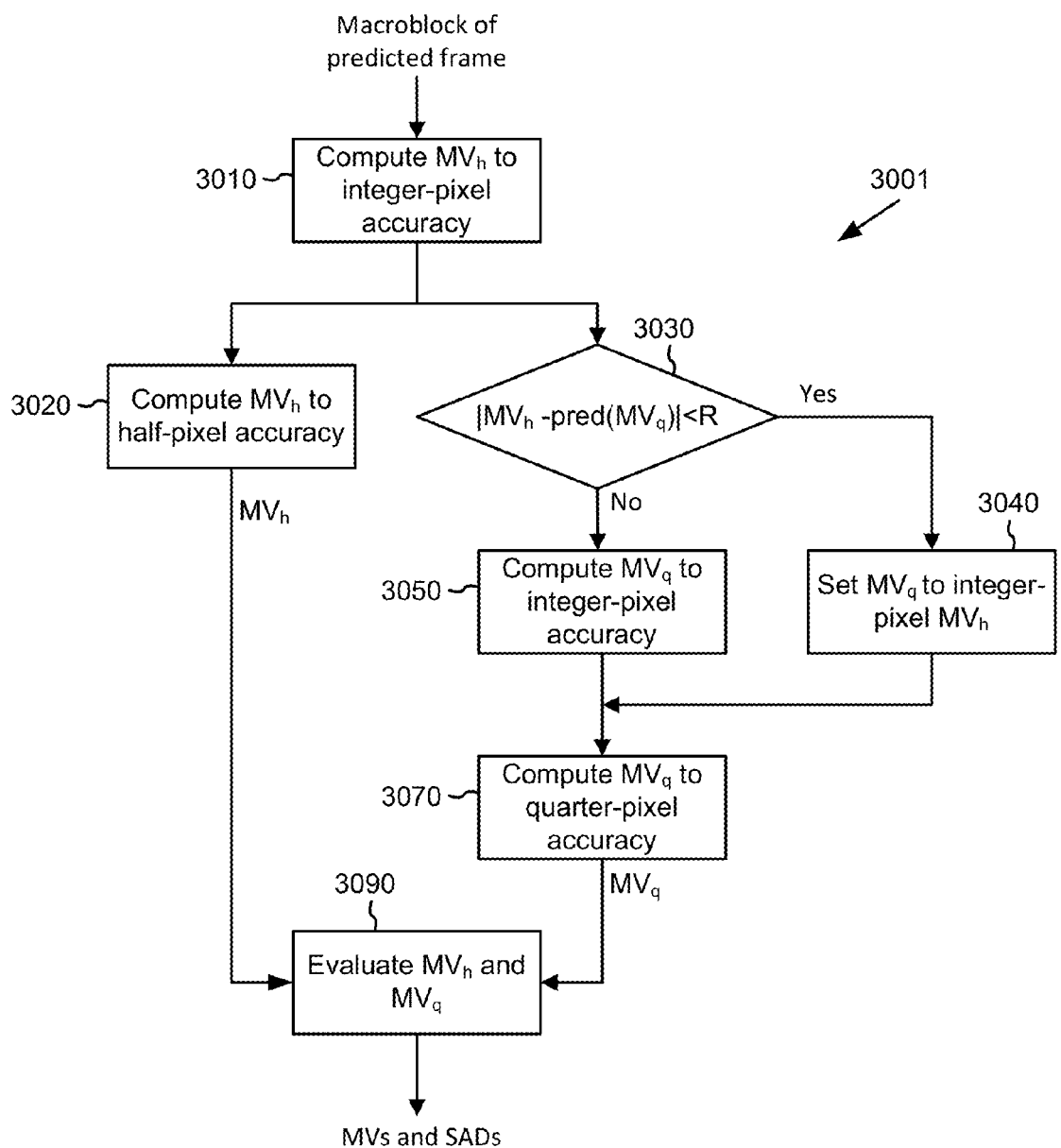

In another implementation, the encoder eliminates a computation of a motion vector at integer-pixel accuracy in many cases by computing motion vectors as shown in FIG. 30b. The encoder computes (3010) $MV_h$ to integer-pixel accuracy.

Most of the time the integer-pixel portion of the $MV_q$ is the same as the integer-pixel portion of $MV_h$. Thus, instead of computing the $MV_q$ to integer-pixel accuracy every time as in FIG. 30a, the encoder checks (3030) whether the integer-pixel accurate $MV_h$ can be used for $MV_q$. Specifically, the encoder checks whether integer-pixel accurate $MV_h$ lies within the motion vector search range for the set of quarter-pixel motion vectors. The motion vector search range for a given macroblock is set to be ±16 (R in FIG. 30) of a motion vector predictor for the quarter-pixel motion vector. The motion vector predictor for a macroblock is the component-wise median of the macroblock's left, top, and top-right neighboring macroblocks' motion vectors, and can be different for $MV_h$ and $MV_q$. Alternatively, the range, motion vector predictor, or conditional bypass is computed differently.

If the integer-pixel $MV_h$ lies within the range then the encoder skips the computation of the integer-pixel $MV_q$, and simply sets (3040) $MV_q$ to $MV_h$. Otherwise, the encoder computes (3050) $MV_q$ to integer-pixel accuracy. The encoder computes (3020) $MV_h$ to half-pixel accuracy, computes (3070) $MV_q$ to quarter-pixel accuracy, and evaluates (3070) the motion vectors. Alternatively, the encoder computes the quarter-pixel motion vector at integer-pixel accuracy first, and selectively bypasses the computation of the half-pixel motion vector at integer-pixel accuracy.

Returning to FIG. 29, the encoder determines (2950) whether there are any more macroblocks in the frame. If so, the encoder gets (2960) the next macroblock and computes motion vectors for it.

Otherwise, the encoder selects (2970) the motion vector resolution for the predicted frame. In one implementation, the encoder uses a rate-distortion criterion to select the set of $MV_h$'s or the set of $MV_q$'s. The encoder compares the cost of choosing half-pixel resolution versus quarter-pixel resolution and picks the minimum of the two. The cost functions are defined as follows:

$$J_q = SAD_q + QP*iMvBitOverhead$$

$$J_h = SAD_h$$

where $J_h$ and $J_q$ are the cost of choosing half-pixel resolution and quarter-pixel resolution, respectively. $SAD_h$ and $SAD_q$ are the sums of the residual error from prediction using the half-pixel and quarter-pixel motion vectors, respectively. QP is a quantization parameter. The effect of QP is to bias the selection in favor of half-pixel resolution in cases where QP is high and distortion in residuals would offset gains in quality from the higher resolution motion estimation. iMvBitOverhead is the extra bits for coding quarter-pixel motion vectors compared to the half-pixel motion vectors. In an implementation in which half-pixel motion vectors (but not integer-pixel motion vectors) have an extra resolution bit, iMvBitOverhead is the number of non-integer-pixel motion vectors in the set of $MV_q$s. Alternatively, the encoder uses other costs functions, for example, cost functions that directly compare the bits spent for different resolutions of motion vectors.

2. Different Horizontal and Vertical Resolutions

In some embodiments, a video encoder uses a search range with different horizontal and vertical resolutions. For example, the horizontal resolution of the search range is quarter pixel and the vertical resolution of the search range is half pixel.

The encoder finds an integer-pixel accurate motion vector in a search range, for example, by searching at integer increments within the search range. In a region around the integer-pixel accurate motion vector, the encoder computes a sub-pixel accurate motion vector by evaluating motion vectors at sub-pixel locations in the region.

Figure 31:
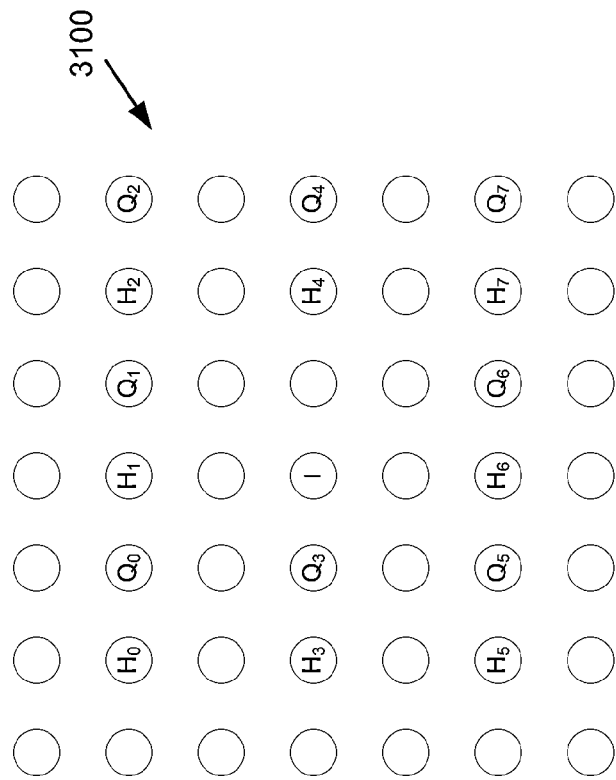
FIG. 31 is a chart showing search locations for sub-pixel motion estimation.

FIG. 31 shows a location I that is pointed to by an integer-pixel accurate motion vector. The encoder computes a half-pixel motion vector by searching for the best match among all eight half-pixel locations $H_0$ to $H_7$ surrounding the integer position I. On the other hand, the encoder computes the quarter-pixel motion vector by searching for the best match among the eight half-pixel locations $H_0$ to $H_7$ and eight quarter-pixel locations $Q_0$ to $Q_7$. The searched quarter-pixel locations are placed horizontally between adjacent half-pixel locations. The searched quarter-pixel locations are not placed vertically between adjacent half-pixel locations. Thus, the search density increases on horizontal quarter-pixel locations, but not vertical quarter-pixel locations. This feature improves performance by speeding up the motion estimation process compared to a search in each direction by quarter-pixel increments, which would also require the computation of values for additional quarter-pixel locations.

In an implementation in which quarter-pixel resolution is indicated by adding an extra bit to half-pixel motion vectors, the quarter-pixel location to the right of the integer-pixel location is not searched as a valid location for a quarter-pixel motion vector, although a sub-pixel value is computed there for matching purposes. In other implementations, that quarter-pixel location is also searched and a different scheme is used to represent quarter-pixel motion vectors. In alternative embodiments, the encoder uses a different search pattern for quarter-pixel motion vectors.

Figure 32:
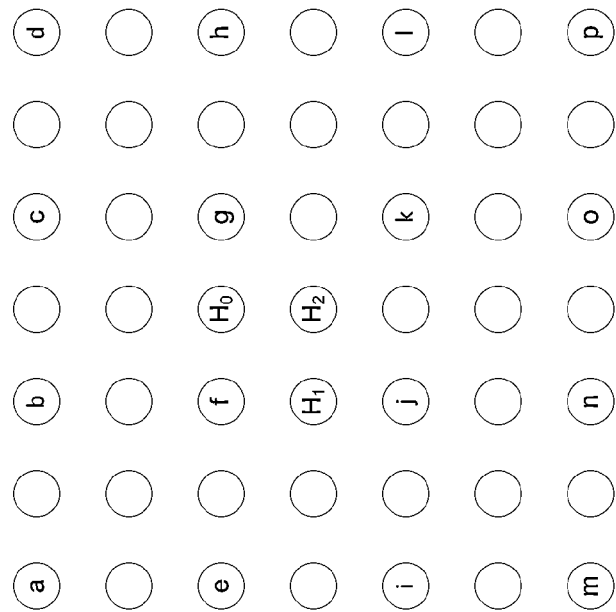
FIG. 32 is a chart showing sub-pixel locations with values computed by interpolation in sub-pixel motion estimation.

The encoder generates values for sub-pixel locations by interpolation. In one implementation, for each searched location, the interpolation filter differs depending on the resolution chosen. For half-pixel resolution, the encoder uses a two-tap bilinear filter to generate the match, while for quarter-pixel resolution, the encoder uses a combination of four-tap and two-tap filters to generate the match. FIG. 32 shows sub-pixel locations $H_0$, $H_1$, $H_2$ with values computed by interpolation of integer-pixel values a, b, c, . . . , p.

For half-pixel resolution, the interpolation used in the three distinct half-pixel locations $H_0$, $H_1$, $H_2$ is:

$$H_0 = (f+g+1-iRndCtrl) >> 1.$$

$$H_1 = (f+j+1-iRndCtrl) >> 1.$$

$$H_2 = (f+g+j+k+2-iRndCtrl) >> 2.$$

where iRndCtrl indicates rounding control and varies between 0 and 1 from frame to frame.

For quarter-pixel resolution, the interpolation used for the three distinct half-pixel locations $H_0$, $H_1$, $H_2$ is:

$$H_0 = (-e+9f+9g-h+8) >> 4.$$

$$H_1 = (-b+9f+9j-n+8) >> 4.$$

$$H_2 = (-t_0+9t_1+9t_2-t_3+8) >> 4.$$

where t0, t1, t2, t3 are computed as follows:

$$t_0 = (-a+9b+9c-d+8) >> 4.$$

$$t_1 = (-e+9f+9g-h+8) >> 4.$$

$$t_2 = (-i+9j+9k-l+8) >> 4.$$

$$t_3 = (-m+9n+9o-p+8) >> 4.$$

For the quarter-pixel resolution, the encoder also searches some of the quarter-pixel locations, as indicated by $Q_0$ to $Q_7$ in FIG. 31. These quarter-pixel locations are situated horizontally in between either two half-pixel locations or an integer-pixel location and a half-pixel location. For these quarter-pixel locations, the encoder uses bilinear interpolation (i.e., $(x+y+1)>>1$) using the two horizontally neighboring half-pixel/integer-pixel locations without rounding control. Using bicubic interpolation followed by bilinear interpolation balances computational complexity and information preservation, giving good results for reasonable computational complexity.

Alternatively, the encoder uses filters with different numbers or magnitudes of taps. In general, bilinear interpolation smoothes the values, attenuating high frequency information, whereas bicubic interpolation preserves more high frequency information but can accentuate noise. Using two bilinear steps (one for half-pixel locations, the second for quarter-pixel locations) is simple, but can smooth the pixels too much for efficient motion estimation.

3. Encoding and Decoding Motion Vector Information

In some embodiments, a video encoder uses different bit allocation for horizontal and vertical motion vectors. For example, the video encoder uses one or more extra bits to represent motion in one direction with finer resolution that motion in another direction. This allows the encoder to reduce bitrate for vertical resolution information that is less useful for compression, compared to systems that code motion information at quarter-pixel resolution both horizontally and vertically.

In one implementation, a video encoder uses an extra bit for quarter-pixel resolution of horizontal component motion vectors for macroblocks. For vertical component motion vectors, the video encoder uses half-pixel vertical component motion vectors. The video encoder can also use integer-pixel motion vectors. For example, the encoder outputs one or more entropy codes or another representation for a horizontal component motion vector and a vertical component motion vector. The encoder also outputs an additional bit that indicates a quarter-pixel horizontal increment. A value of 0 indicates no quarter-pixel increment and a value of 1 indicates a quarter-pixel increment, or vice versa. In this implementation, the use of the extra bit avoids the use of separate entropy code tables for quarter-pixel MVs/DMVs and half-pixel MVs/DMVs, and also adds little to bitrate.

In another implementation, a video encoder selectively uses the extra bit for quarter-pixel resolution of horizontal component motion vectors for macroblocks. The encoder adds the extra bit only if 1) quarter-pixel resolution is used for the frame and 2) at least one of the horizontal or vertical component motion vectors for a macroblock has half-pixel resolution. Thus, the extra bit is not used when quarter-pixel resolution is not used for a frame or when the motion vector for the macroblock is integer-pixel resolution, which reduces overall bitrate. Alternatively, the encoder adds the extra bit based upon other criteria.

FIG. 33 shows a technique for decoding information for motion vectors at selective resolution. For the sake of simplicity, FIG. 33 does not show the various ways in which the technique (3300) can be used in conjunction with other techniques.

A decoder gets (3310) motion vector information for a macroblock, for example, receiving one or more entropy codes or other information for a motion vector, component motion vectors, differential motion vectors ("DMVs"), or differential component motion vectors.

The decoder determines (3330) whether it has received all of the motion vector information for the macroblock. For example, the decoder determines whether additional resolution is enabled for the macroblock (e.g., at a frame level). Or, the decoder determines from decoding of the already received motion vector information whether to expect additional information. Or, the encoder considers both whether the additional resolution is enabled and whether to expect it based upon previously decoded information.

If the decoder expects additional motion vector resolution information, the decoder gets (3340) the additional information. For example, the decoder gets one or more additional resolution bits for the motion vector information for the macroblock.

The decoder then reconstructs (3350) the macroblock using the motion vector information and determines (3360) whether there are other macroblocks in the frame. If not, the technique ends. Otherwise, the decoder gets (3370) the motion vector information for the next macroblock and continues.

B. Coding of Prediction Residuals

Motion estimation is rarely perfect, and the video encoder uses prediction residuals to represent the differences between the original video information and the video information predicted using motion estimation.

In one or more embodiments, a video encoder exploits redundancies in prediction residuals in order to code the information using a smaller number of bits. The video encoder compresses prediction residuals for blocks or other sets of pixel domain information of a frame using sub-block transforms. A video decoder uses corresponding decompression using sub-block inverse transforms. By using sub-block transforms, the encoder reacts to localization of error patterns in the data, which improves the efficiency of compression. Various features of the compression and decompression using sub-block transforms can be used in combination or independently. These features include, but are not limited to:

1) Adaptively setting transform sizes for spatial domain data by switching between multiple available transform sizes. For example, when coding a prediction residual, a video encoder adaptively switches between multiple available transform sizes for a transform such as DCT. For an 8×8 prediction residual block, the encoder can switch between an 8×8 DCT, two 4×8 DCTs, or two 8×4 DCTs. A video decoder adaptively switches transform sizes during decoding.

2a) Setting transform sizes for spatial domain data by making a switching decision in a closed loop. The video encoder actually tests the different transform sizes and then selects one.

2b) Setting transform sizes for spatial domain data by making a switching decision in a open loop. The video encoder estimates the suitability of the different transform sizes and then selects one.

3a) Switching transform sizes for spatial domain data for a frame at the frame level in a video encoder or decoder.

3b) Switching transform sizes for spatial domain data for a frame at the macroblock level in a video encoder or decoder.

3c) Switching transform sizes for spatial domain data for a frame at the block level in a video encoder or decoder.

3d) Switching transform sizes for spatial domain data for a frame at the macroblock level or block level within the frame in a video encoder or decoder.

4) Switching scan patterns for spatial domain data for a frame for different transform sizes in a video encoder or decoder. Switching scan patterns decreases the entropy of the one-dimensional data, which improves the efficiency of subsequent entropy coding.

5) Using a sub-block pattern code to indicate the presence or absence of information for sub-blocks of a block of spatial domain data. For example, for an 8×8 prediction residual block, the sub-block pattern code indicates the presence or absence of information for the sub-blocks associated with the sub-block transform for the block. Using the sub-block pattern codes reduces bitrate for zero-value sub-block information. A video encoder outputs sub-block pattern codes; a video decoder receives them.

To code prediction residuals, a video encoder uses a frequency transform with a transform size selected from multiple available transform sizes (alternatively called transform types). In some embodiments, a video encoder applies a frequency transform to a prediction residual block following motion compensation. The frequency transform is a DCT or other frequency transform. For an 8×8 block, the encoder selects between an 8×8 transform, two 4×8 transforms, or two 8×4 transforms. If two 8×4 DCTs are used, the 8×8 residual block is divided horizontally into two 8×4 sub-blocks, which are transformed into two 8×4 DCT arrays. Likewise, if two 4×8 DCTs are used, the 8×8 residual block is divided vertically into two 4×8 sub-blocks, which are transformed into two 4×8 DCT arrays. A video decoder uses an inverse frequency transform with a transform size selected from multiple available transform sizes. In alternative embodiments, the encoder and decoder work with sets of values other than 8×8 blocks, work with information other than prediction residuals following motion compensation (e.g., for intraframe coding), and/or use a different transform.

To determine which transform size to use, a video encoder evaluates the different transform sizes. In some embodiments, the encoder evaluates the different transform sizes in a closed loop. The encoder tests a frequency transform at each of the transform sizes, and evaluates the results with a rate, distortion, or rate-distortion criterion. The encoder can test the transform at varying switching levels (e.g., frame, macroblock, block) as well. In alternative embodiments, the encoder evaluates the different transform sizes in an open loop, estimating the suitability of the different transform sizes without actually applying the different transform sizes.

A video encoder and decoder switch between transform sizes. In some embodiments, a video encoder sets switching flags at varying levels (e.g., frame, macroblock, and/or block) from frame to frame. A decoder makes corresponding switches during decoding. In alternative embodiments, the encoder always switches on a per-frame basis, a per-macroblock basis, a per-block basis, a mixed macroblock or block basis, or some other basis.

Following the frequency transform, a video encoder converts a two-dimensional array of frequency coefficients into a one-dimensional array for entropy encoding. Conversely, a decoder converts a one-dimensional array of frequency coefficients into a two-dimensional array following entropy decoding. In some embodiments, an encoder/decoder selects a scan pattern from among multiple available scan patterns based upon a transform size.

Following the frequency transform, a video encoder entropy encodes the frequency-transformed data. In some embodiments, a video encoder determines whether data for a particular sub-block is absent or insignificant. In a sub-block pattern code, the encoder indicates the presence or absence of information for sub-blocks of a frequency-transformed block of data. A video decoder receives the sub-block pattern code and determines whether information is present or absent for particular sub-blocks of a block. In alternative embodiments, the encoder and decoder do not use sub-block pattern codes.

1. Sub-block Transforms

A video encoder and decoder use sub-block transforms to efficiently code prediction residuals following block-based motion compensation. The encoder/decoder switches between different transform sizes to apply to the prediction residual blocks.

Figure 34:
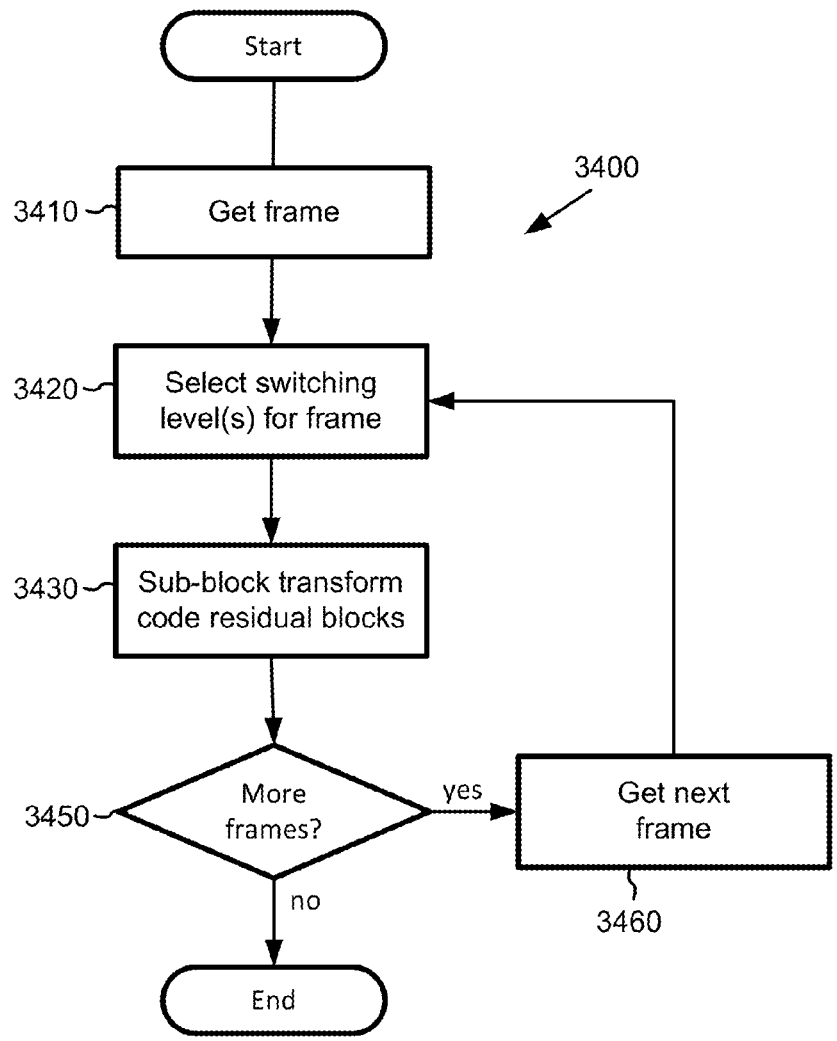
FIG. 34 is a flowchart of a technique for encoding residual blocks with sub-block transforms selected at switching levels in a video encoder.

FIG. 34 shows a technique for switching transform sizes during encoding of prediction residual blocks in a video encoder. A video encoder gets (3410) a frame, for example, a predicted video frame. For the sake of simplicity, FIG. 34 does not show the various ways in which the technique (3400) can be used in conjunction with other techniques.

The encoder selects (3420) switching levels for the frame. For example, the encoder evaluates the performance of the sub-block transform sizes at different switching levels within a closed loop by testing the rate-distortion performance with different levels of switching (e.g., at the frame level only, at macroblock level only, at macroblock and block levels). The closed loop is described in detail below. Or, the encoder evaluates the performance of different switching levels within an open loop. For example, the encoder computes the variance, energy, or some other measure for the prediction residual blocks as partitioned with the different sub-block sizes. The encoder can compute the measure in the spatial domain or frequency domain, on quantized or original data.

The encoder transform codes (3430) the prediction residual blocks for the frame using the sub-block transform sizes and switching levels selected above. In one implementation, the encoder uses either an 8×8 DCT, two 4×8 DCTs, or two 8×4 DCTs on an 8×8 prediction residual block, as described in more detail below. Alternatively, the encoder uses another frequency transform and/or has more or fewer transform sizes (e.g., 4×4 sub-block transform).

The encoder determines (3450) whether there are any more frames. If not, the technique ends. If so, the encoder gets (3460) the next frame and selects (3420) switching levels for it.

In one implementation, a video encoder/decoder switches between different sizes of DCT/IDCT when processing 8×8 blocks of prediction residuals. The encoder/decoder use of one of an 8×8 DCT/IDCT, two 4×8 DCT/IDCTs, or two 8×4 DCT/IDCTs for a prediction residual block. For example, if a prediction residual includes many non-zero values in the top half and mostly zero values in the bottom half, the encoder and decoder use the 8×4 transform size to isolate the energy of the block in one sub-block. The 4×8 transform size is similarly indicated when the distribution of values is different on left and right sides of the block. When values are evenly distributed throughout a block, the encoder and decoder use the 8×8 transform. The encoder and decoder can use other transform sizes as well (e.g., 4×4, 2×8, 8×2, 4×2, 2×4, etc.). In general, the potential reduction in rate-distortion for additional transform sizes is weighed against the increase in processing overhead for additional transform sizes, and against potential increases in relative cost of bitrate for signaling overhead for smaller transform sizes.

Figure 35B:
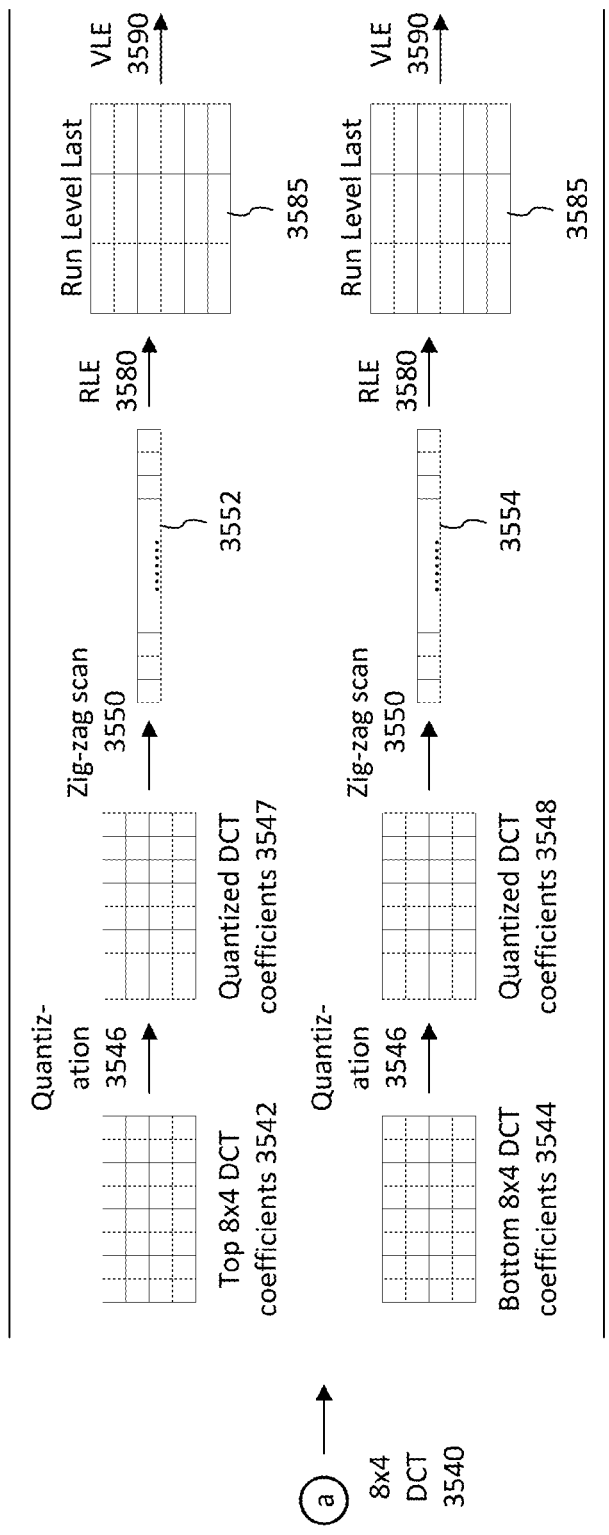
Figure 35C:
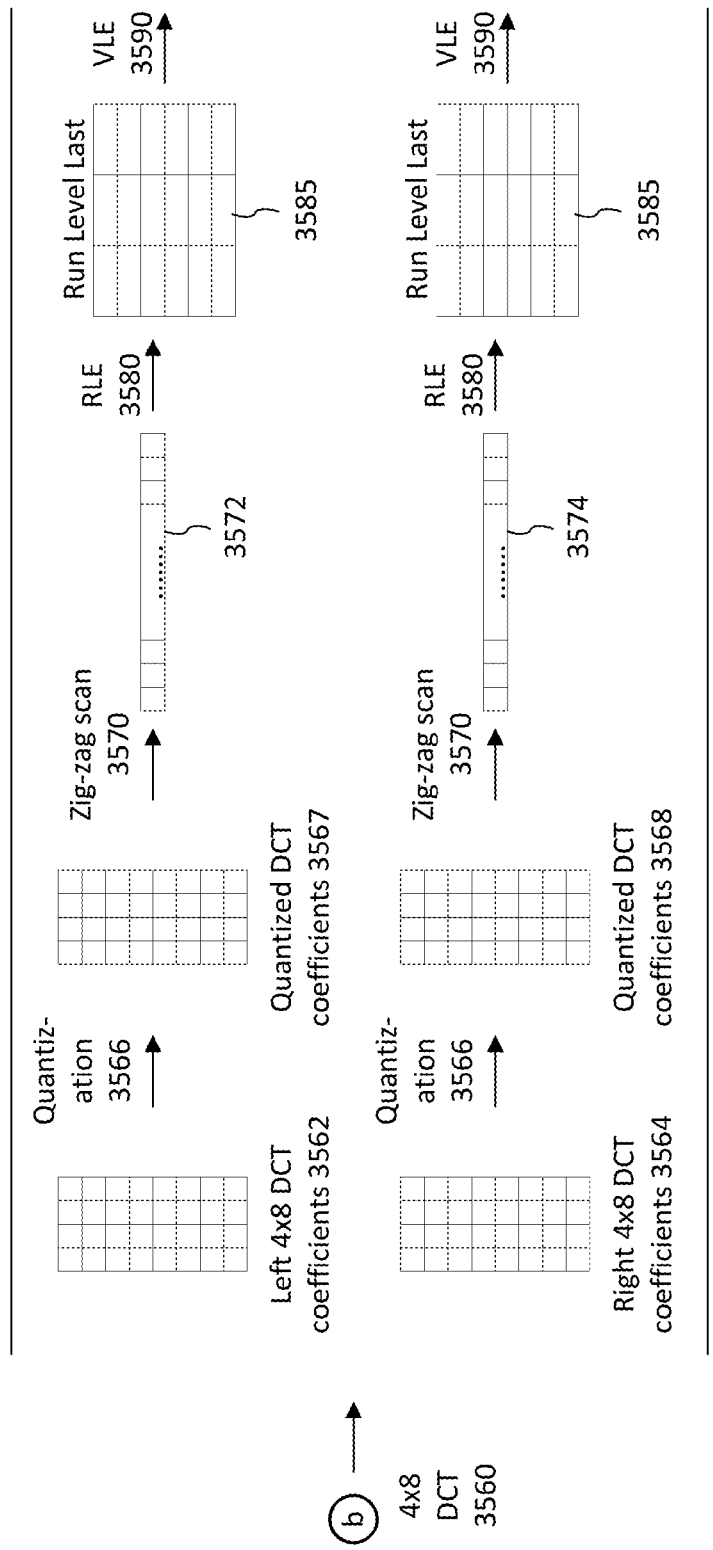
Figure 36D:

FIGS. 35a-35c show transform coding and compression of an 8×8 prediction error block (3510) using an 8×8 DCT (3520), two 8×4 DCTs (3540), or two 4×8 DCTs (3560) in this implementation. A video encoder computes (3508) an error block (3510) as the difference between a predicted block (3502) and the current 8×8 block (3504). The video encoder applies either an 8×8 DCT (3520), two 8×4 DCTs (3540), or two 4×8 DCTs (3560) to the error block.

FIGS. 36a-36d show example pseudocode (3600) for 4-point and 8-point IDCT operations for rows and columns. For an 8×8 block, an 8-point one-dimensional IDCT operation RowIDCT_8Point( ) is performed on each of the 8 rows of the block, then an 8-point one-dimensional IDCT operation ColumnIDCT_8Point( ) is performed on each of the 8 resultant columns. For an 8×4 block, an 8-point one-dimensional IDCT operation RowIDCT_8Point( ) is performed on each of the 4 rows of the block, then a 4-point one-dimensional IDCT operation ColumnIDCT_4Point( ) is performed on each of the 8 resultant columns. For a 4×8 block, a 4-point one-dimensional IDCT operation RowIDCT_4Point( ) is performed on each of the 8 rows of the block, then an 8-point one-dimensional IDCT operation ColumnIDCT_8Point( ) is performed on each of the 4 resultant columns.

For the 8×8 DCT (3520), the error block (3510) becomes an 8×8 block of DCT coefficients (3522). The encoder quantizes (3526) the data. The encoder then scans (3530) the block of quantized DCT coefficients (3528) into a one-dimensional array (3532) with 64 elements, such that coefficients are generally ordered from lowest frequency to highest frequency. In the scanning, the encoder uses a scan pattern for the 8×8 DCT. The encoder then entropy codes the one-dimensional array (3532) using a combination of run length coding (3580) and variable length encoding (3590) with one or more run/level/last tables (3585).

In the implementation of FIGS. 35a-35c, with each of the DCT modes, the encoder uses the same run length coding, variable length encoding, and set of one or more run/level/last tables. In other implementations, the encoder uses different sets of run/level/last tables or different entropy encoding techniques for the different DCT modes (e.g., one set of tables for the 8×8 mode, another set for the 8×4 mode, a third set for the 4×8 mode). For example, the encoder selects and signals different entropy code tables for different transform sizes.

For the 8×4 DCT (3540), the error block (3510) becomes two 8×4 blocks of DCT coefficients (3542, 3544), one for the top half of the error block (3510) and one for the bottom half. This can localize significant values in one or the other half. The encoder quantizes (3546) the data. The encoder then scans (3550) the blocks of quantized DCT coefficients (3547, 3548) into one-dimensional arrays (3552, 3554) with 32 elements each, such that coefficients are generally ordered from lowest frequency to highest frequency in each array. In the scanning, the encoder uses a scan pattern for the 8×4 DCT. The encoder then entropy codes the one-dimensional arrays (3552, 3554) using a combination of run length coding (3580) and variable length encoding (3590) with one or more run/level/last tables (3585).

For the 4×8 DCT (3560), the error block (3510) becomes two 4×8 blocks of DCT coefficients (3562, 3564), one for the left half of the error block (3510) and one for the right half. This can localize significant values in one or the other half. The encoder quantizes (3566) the data. The encoder then scans (3570) the blocks of quantized DCT coefficients (3567, 3568) into one-dimensional arrays (3572, 3574) with 32 elements each, such that coefficients are generally ordered from lowest frequency to highest frequency in each array. In the scanning, the encoder uses a scan pattern for the 4×8 DCT. The encoder then entropy codes the one-dimensional arrays (3572, 3574) using a combination of run length coding (3580) and variable length encoding (3590) with one or more run/level/last tables (3585).

FIG. 37 shows decompression and inverse transform coding of an 8×8 prediction error block (3710) using two 8×4 IDCTs (3740) in this implementation. Decompression and inverse transform coding using the 4×8 IDCT use transposes at stages around the inverse frequency transform. Decompression and inverse transform coding using the 8×8 IDCT are shown in FIG. 5.

A video decoder entropy decodes one-dimensional arrays (3752, 3754) of quantized frequency coefficient values using a combination of run length decoding (3780) and variable length decoding (3790) with one or more run/level/last tables (3785). The decoder then scans (3750) the one-dimensional arrays (3752, 3754) into blocks of quantized DCT coefficients (3747, 3748). In the scanning, the encoder uses the scan pattern for the 8×4 DCT.

The decoder inverse quantizes (3746) the data and applies (3740) an 8×4 inverse DCT to the reconstructed frequency coefficients in each of the blocks, resulting in a reconstructed 8×4 error block (3712) for the top half of the error block (3710) and a reconstructed 8×4 error block (3714) for the bottom half of the error block (3710). The decoder then combines to top (3712) and bottom (3714) halves to form the reconstructed 8×8 error block (3710).

The decoder combines the reconstructed error block (3710) with a predicted block (3702) from motion compensation using motion information to form a reconstructed 8×8 block (3704). For example, the reconstructed 8×8 block (3704) is a reconstructed version of the current 8×8 block (3504) of FIG. 35.

2. Selection Using Closed Loop

FIGS. 38*a* through 38*f* show a closed loop technique (3800) for setting transform size(s) for a frame. In the closed loop technique (3800), the encoder applies each of 8×8, 8×4, and 4×8 transform sizes to the 8×8 blocks of a frame, computes distortion measures for each block with each transform size, computes signaling overhead for switching at different levels, and selects the transform size(s) and switching level(s) for the frame. In alternative embodiments, the encoder tests more or fewer transform sizes, tests different transform sizes, uses a closed loop technique on something other than a per frame basis, and/or uses different criteria to select transform size(s) and/or switching levels. In still other alternative embodiments, the encoder uses an open loop technique.

In the implementation illustrated in FIGS. 38*a*-38*f*, a frame includes multiple 4:2:0 macroblocks, and each macroblock is made up of six 8×8 blocks. Alternatively, another macroblock or block format is used.

Figure 38A:
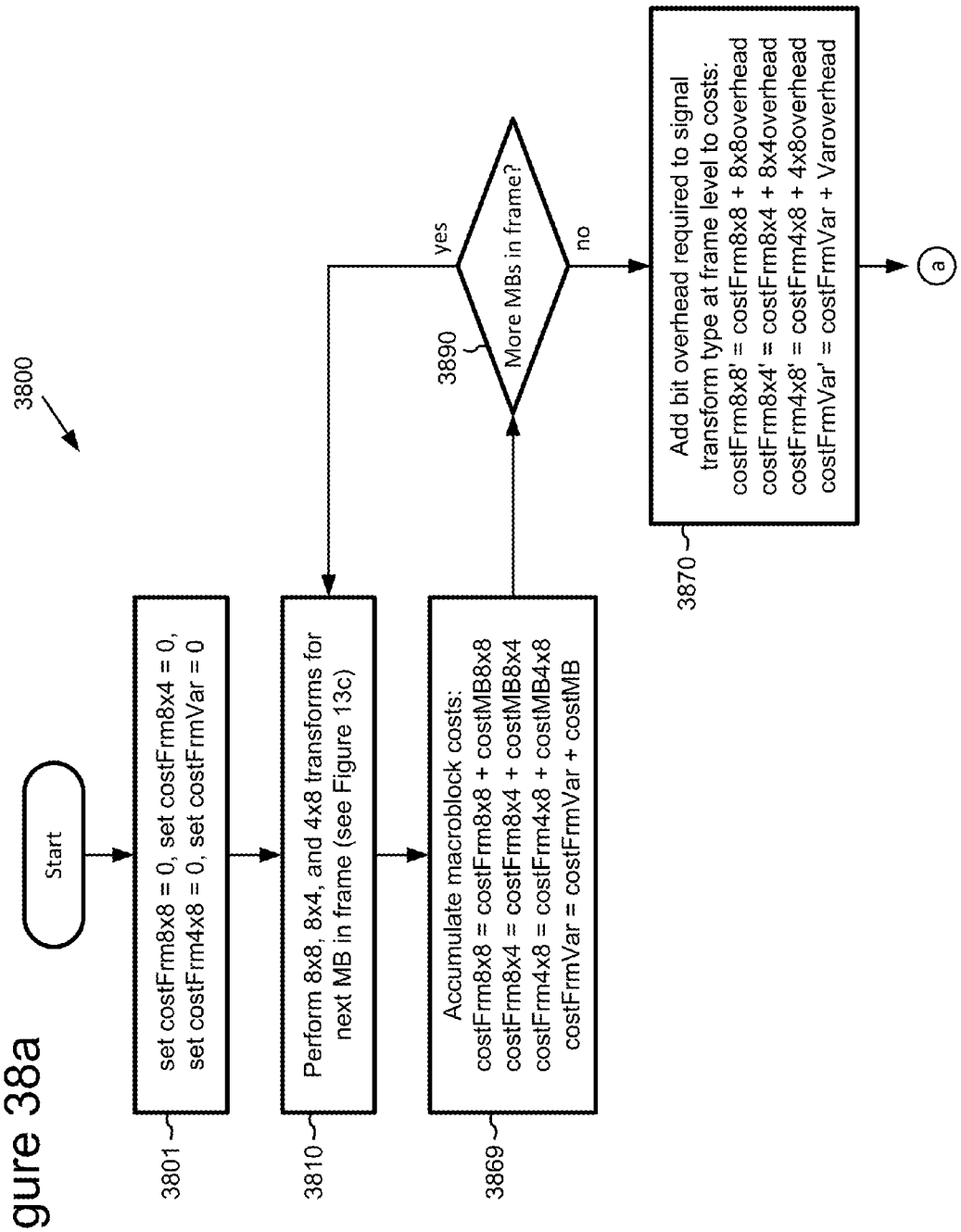
FIGS. 38a-38f are flowcharts of a closed loop technique for setting transform sizes for prediction residuals of a frame in a video encoder.
Figure 38B:
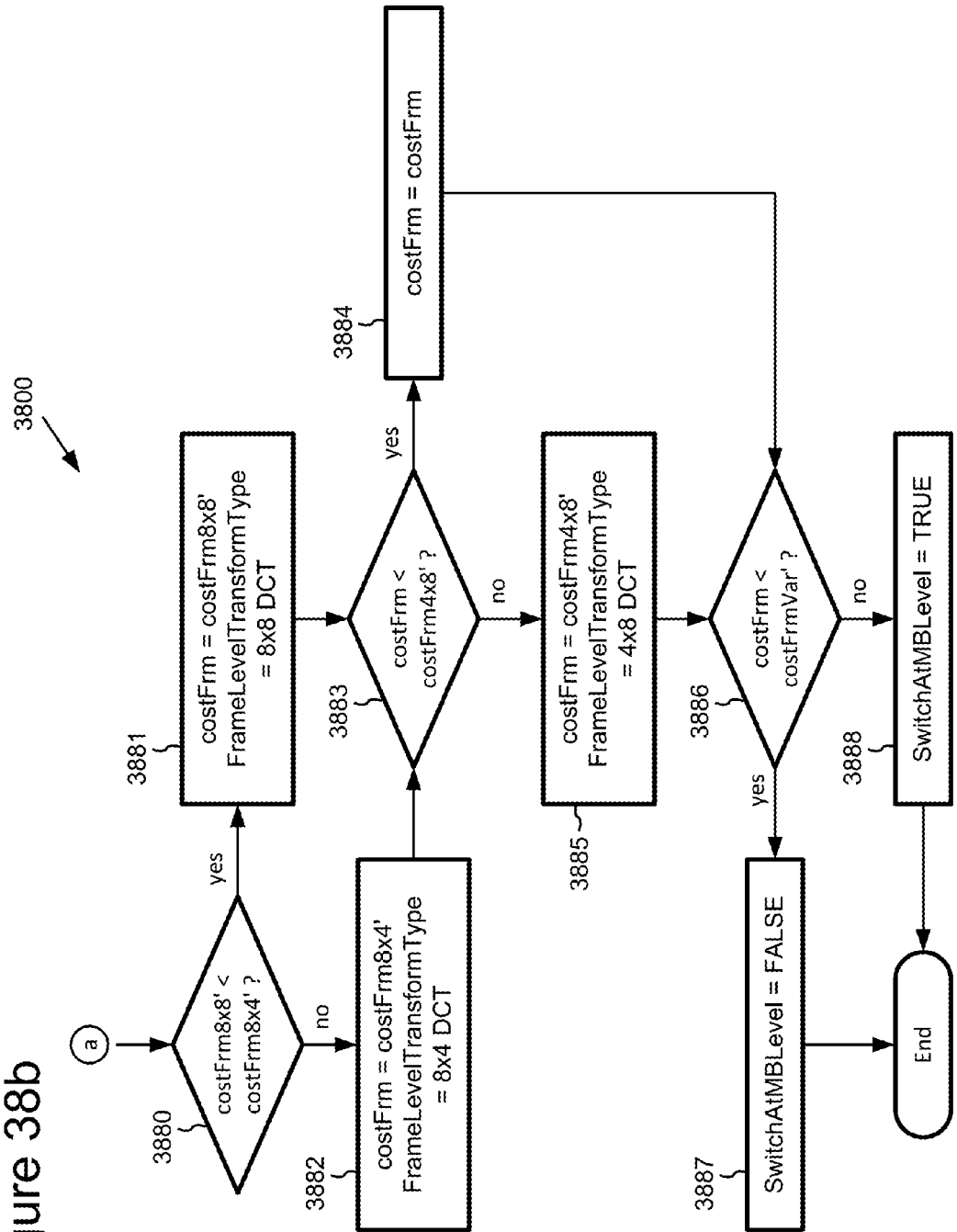

With reference to FIG. 38*a*, with the closed loop technique (3800), the encoder selects the transform size(s) used in the frame. The transform size can be specified at the frame, macroblock or block levels. At the frame level, one of four options is specified: 1) all blocks in the frame use 8×8 DCT, 2) all blocks in the frame use 8×4 DCT, 3) all blocks in the frame use 4×8 DCT, or 4) the transform size is signaled at the macroblock level. If the transform type is signaled at the macroblock level, then at each macroblock one of four options is specified: 1) all blocks in the macroblock use 8×8 DCT, 2) all blocks in the macroblock use 8×4 DCT, 3) all blocks in the macroblock use 4×8 DCT, or 4) the transform size is signaled at the block level.

To start, the encoder initializes (3801) the variables costFrm8×8, costFrm8×4, costFrm4×8, and costFrmvar used to measure performance of the different transform sizes at the frame level, as described in Table 8.

TABLE 8

Frame-level Variables for Measuring Transform Performance

| Variable | Description |
| --- | --- |
| costFrm8 × 8 | Indicates the adjusted bit count for coding all macroblocks of the frame with an 8 × 8 DCT. |
| costFrm8 × 4 | Indicates the adjusted bit count for coding all macroblocks of the frame with an 8 × 4 DCT. |
| costFrm4 × 8 | Indicates the adjusted bit count for coding all macroblocks of the frame with an 4 × 8 DCT. |
| costFrmVar | Indicates the adjusted bit count for coding all macroblocks of the frame with transform sizes specified at the macroblock level or below. |
| FrameLevelTransformType | Indicates the best transform size for the frame. |
| SwitchAtMBLevel | Indicates whether the transform type is signaled at the macroblock or frame level. |
| costFrm | Indicates the adjusted bit count for the best transform type(s) including the overhead to signal the transform type at the frame level. |

Table 8 also lists three other variables (FrameLevelTransformType, SwitchAtMBLevel, and costFrm), which used in the closed loop evaluation as described below.

Figure 38C:
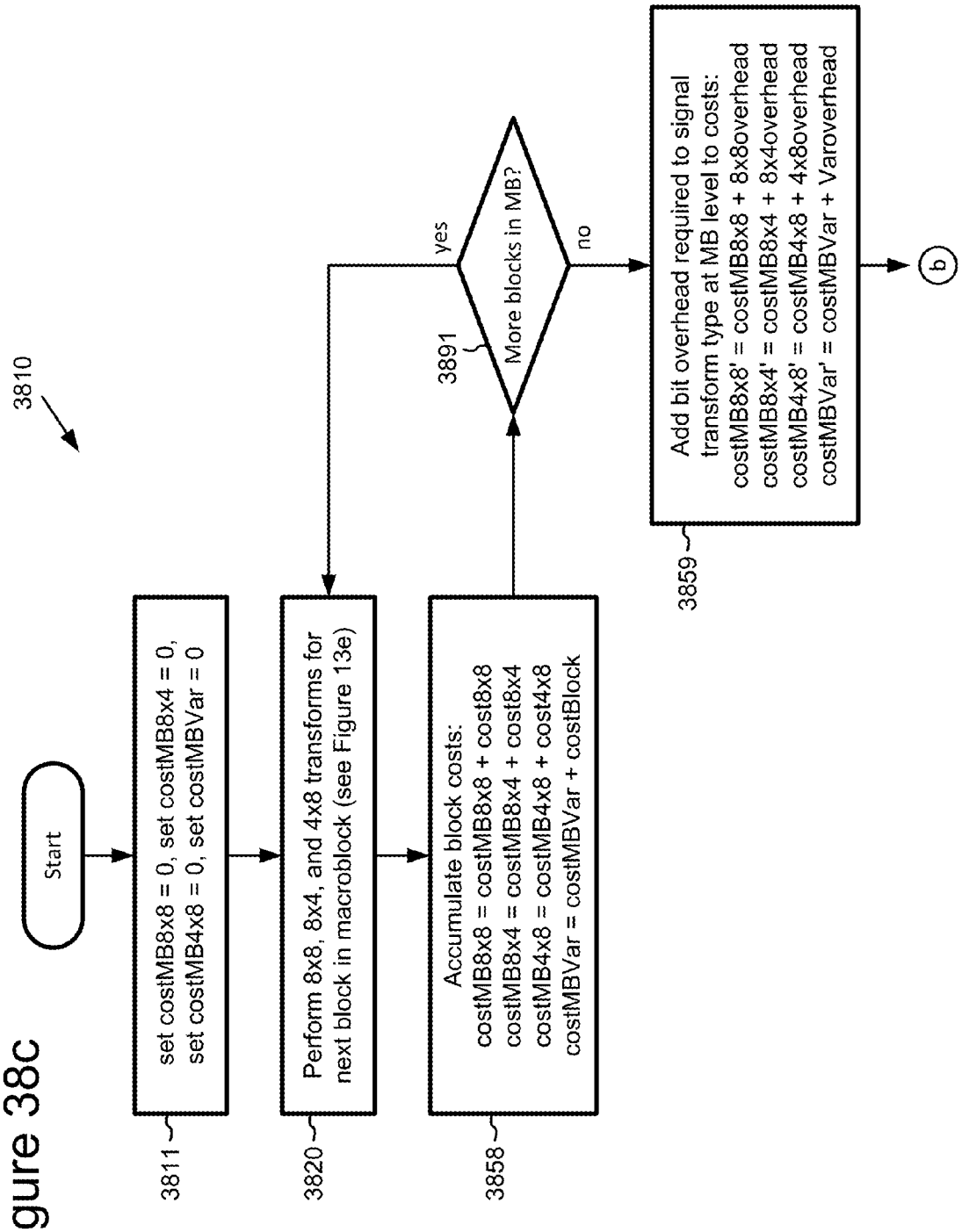
Figure 38D:
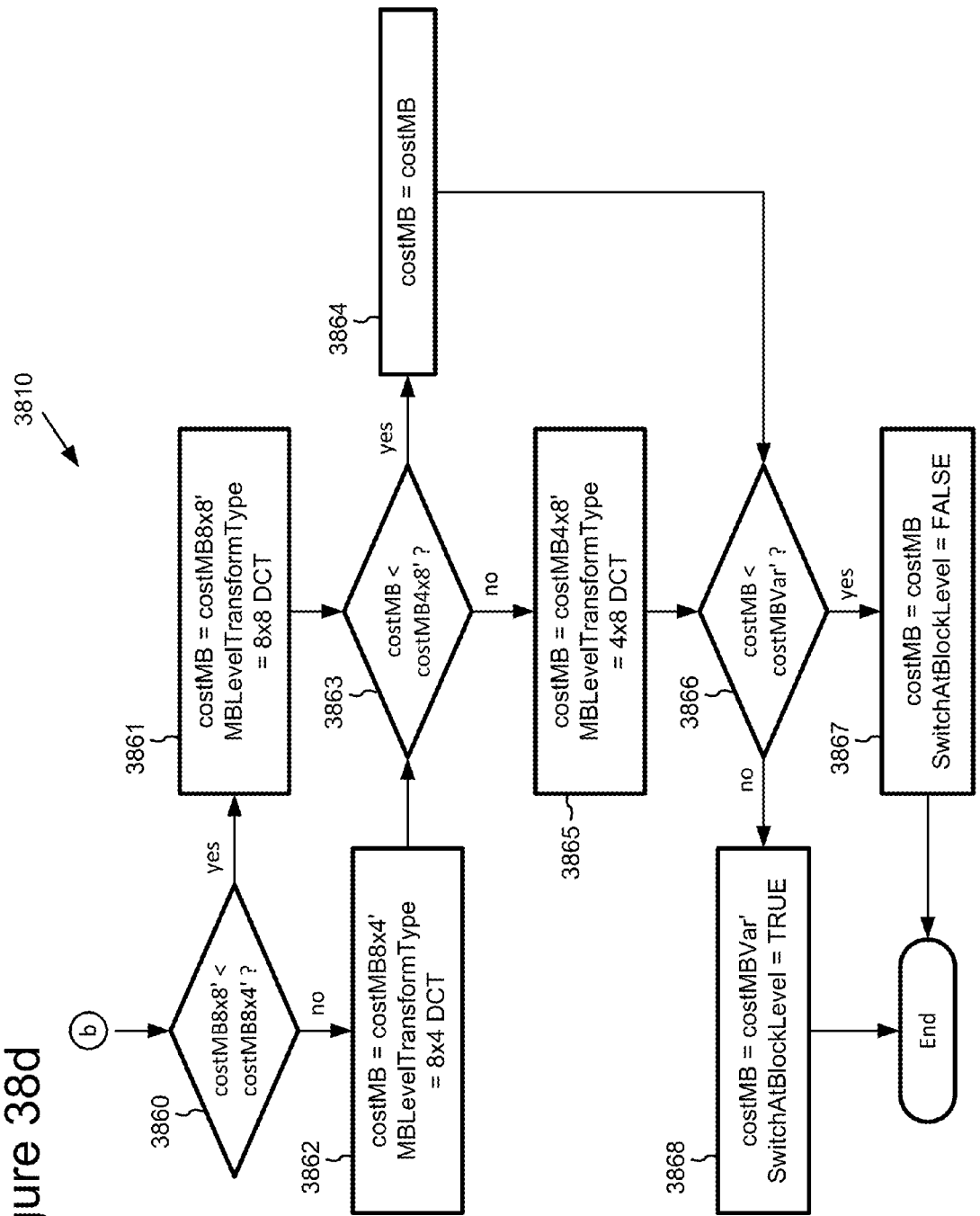

In a top-down, recursive process, the encoder accumulates adjusted bit counts for these values. The encoder performs (3810) the transforms of different sizes for a first macroblock in the frame, as shown in FIGS. 38*c* and 38*d*, and repeats when there are more macroblocks (3890) in the frame. For each macroblock, the encoder initializes (3811) the variables costMB8×8, costMB8×4, costMB4×8, and costMBvar used to measure performance of the different transform sizes at the macroblock level, as described in Table 9.

TABLE 9

MB-level Variables for Measuring Transform Performance

| Variable | Description |
| --- | --- |
| costMB8 × 8 | Indicates the adjusted bit count for coding all 6 blocks with an 8 × 8 DCT. |
| costMB8 × 4 | Indicates the adjusted bit count for coding all 6 blocks with an 8 × 4 DCT. |
| costMB4 × 8 | Indicates the adjusted bit count for coding all 6 blocks with an 4 × 8 DCT. |
| costMBVar | Indicates the adjusted bit count for coding all 6 blocks with transform sizes specified for each block at the block level. |
| MBLevelTransformType | Indicates the best transform size for the macroblock. |
| SwitchAtBlockLevel | Indicates whether the transform type is signaled at the block or macroblock level. |
| costMB | Indicates the adjusted bit count for the best transform type(s) including the overhead to signal the transform type at the macroblock level. |

Table 9 also lists three other variables (MBLevelTransformType, SwitchAtBlockLevel, and costMB), which used in the closed loop evaluation as described below.

Figure 38E:
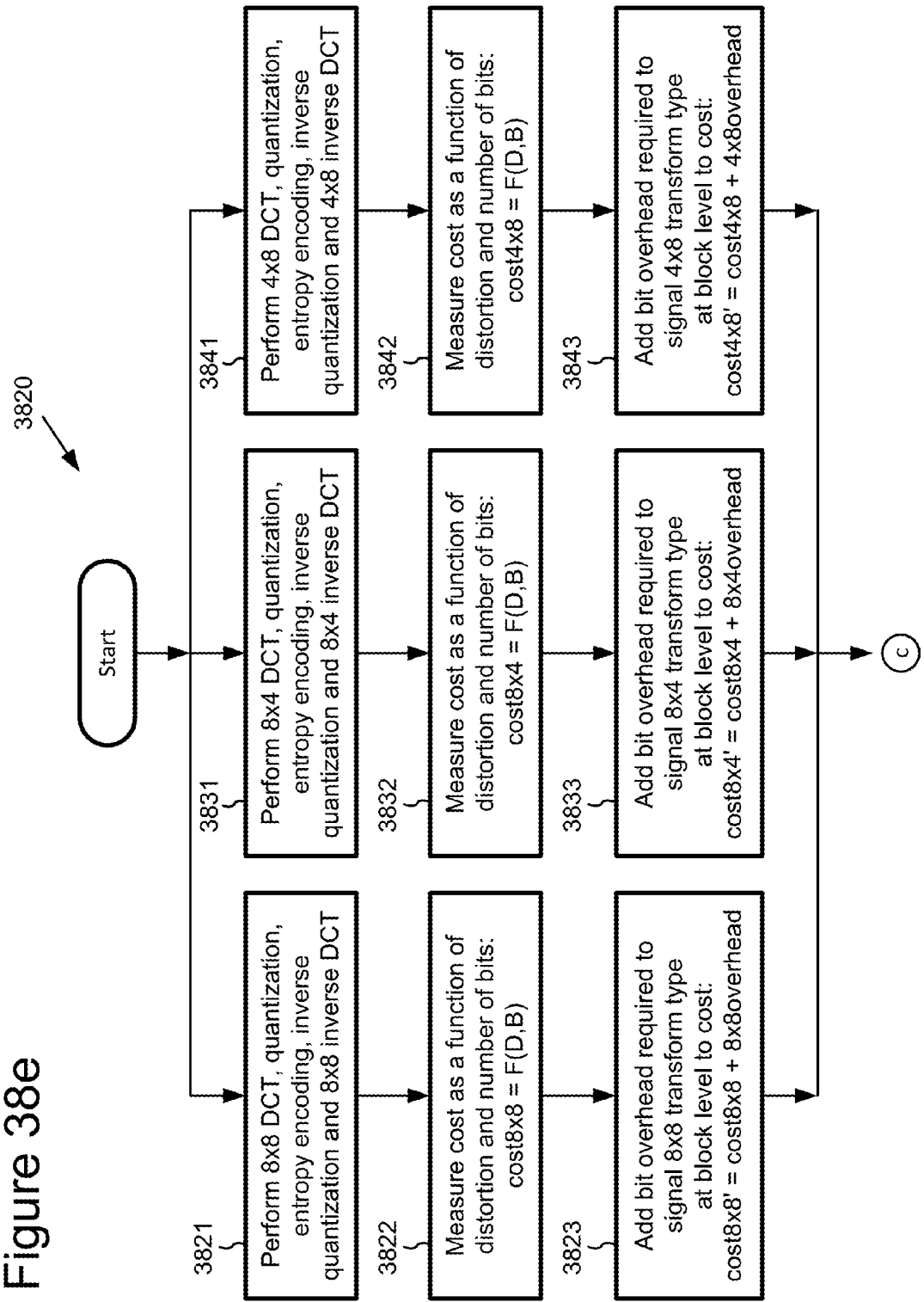
Figure 38F:
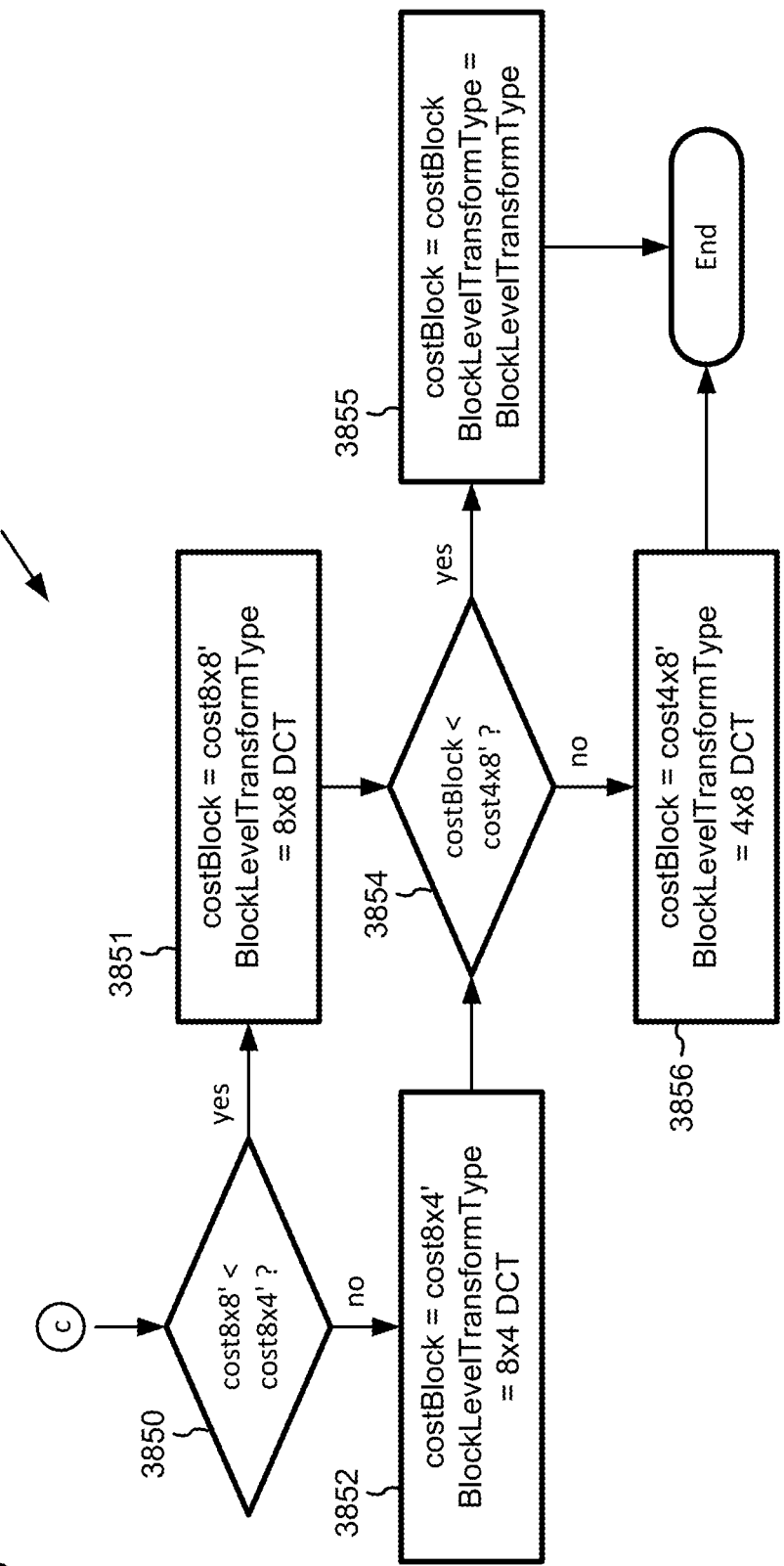

For each of the 6 blocks in the macroblock, the encoder accumulates adjusted bit counts for these values. The encoder performs (3820) the transforms of different sizes for a first block in the macroblock, as shown in FIGS. 38*e* and 38*f*, and repeats when there are more blocks (3891) in the macroblock. For each block, the encoder computes a rate-distortion measure.

a. Block Level

The encoder performs (3821) the full coding and reconstruction processes on the block using the 8×8 DCT. The encoder applies the 8×8 DCT, quantizes the DCT coefficients, entropy codes the coefficients (e.g., run level+Huffman), inverse quantizes the coefficients, and applies an 8×8 inverse DCT. The quantization introduces distortion that is subsequently measured for the block. The entropy coding results in output bits for the block that are subsequently counted.

The encoder also performs (3831, 3841) the full coding and reconstruction processes on the block using two 8×4 DCTs and two 4×8 DCTs, respectively.

The encoder measures (3822) the cost associated with the 8×8 DCT as a function of the distortion of the block and the number of bits required to encode the block. The encoder also measures (3832, 3842) the cost associated with the two 8×4 DCTs and two 4×8 DCTs, respectively. The encoder computes the distortion as the mean squared error ["MSE"] between the 64 original DCT coefficients and the 64 inverse quantized coefficients. Alternatively, the encoder uses another distortion measure such as sum of absolute differences ["SAD"], a perceptual distortion measure, or another error measure.

After the encoder obtains the bit count and distortion for each transform size, the encoder needs to make a decision about which transform size results in the most efficient compression. The encoder accounts for both the number of bits and the distortion using cost function variables cost8×8, cost8×4, and cost4×8, which are described in Table 10.

TABLE 10

Block-level Variables for Measuring Transform Performance

| Variable | Description |
| --- | --- |
| cost8 × 8 | Indicates the adjusted bit count for coding the block with an 8 × 8 DCT. |
| cost8 × 4 | Indicates the adjusted bit count for coding the block with an 8 × 4 DCT. |
| cost4 × 8 | Indicates the adjusted bit count for coding the block with an 4 × 8 DCT. |
| BlockLevelTransformType | Indicates the best transform type for the block. |
| costBlock | Indicates the adjusted bit count for the best transform type including the overhead to signal the transform type at the block level |

Table 10 also lists two other variables (BlockLevelTransformType, costBlock), which are used in the closed loop evaluation as described below.

The cost function may readjust the number of bits for a transform size depending on the distortion for that transform size. For example, suppose transform coding a block with different transform sizes resulted in the following bit counts and distortions.

TABLE 11

Example Bit Counts and Distortions

| Transform Size | Bit Count | Distortion |
| --- | --- | --- |
| 8 × 8 | 48 | 1000 |
| 8 × 4 (aggregates of sub-blocks) | 45 | 1100 |
| 4 × 8 (aggregates of sub-blocks) | 44 | 1200 |

If the encoder considered only the bit counts, the encoder would choose the 4×8 transform since it was encoded in the fewest bits. However, the 4×8 transform also has the highest distortion. To more accurately determine which transform size is the best, the encoder also considers the distortion. In one implementation, the 8×8 bit count is taken as the baseline, and the bit counts for the 8×4 and 4×8 transforms are readjusted as shown in Table 12 and the following equations.

TABLE 12

Variables in Rate-Distortion Adjustments

| Variable | Description |
| --- | --- |
| D8 × 8 | The 8 × 8 DCT distortion (MSE between the 64 original and inverse quantized 8 × 8 DCT coefficients). |
| D8 × 4 | The 8 × 4 DCT distortion (MSE between the 64 original and inverse quantized 8 × 4 DCT coefficients). |
| D4 × 8 | The 4 × 8 DCT distortion (MSE between the 64 original and inverse quantized 4 × 8 DCT coefficients). |
| FScale | 100/(quantizer step size) |

For the adjusted 8×4 bit count, the following equations are used.

$$fVal8\times4=(sqrt(D8\times4)-sqrt(D8\times8))*fScale \quad (23),$$

$$iVal8\times4=Int(fVal8\times4) \quad (24),$$

$$cost8\times4=cost8\times4+iVal8\times4 \quad (25),$$

where Int( ) is a function that rounds the input to the nearest integer. For the adjusted 4×8 bit count, the following equations are used.

$$fVal4\times8=(sqrt(D4\times8)-sqrt(D8\times8))*fScale \quad (26),$$

$$iVal4\times8=Int(fVal4\times8) \quad (27),$$

$$cost4\times8=cost4\times8+iVal4\times8 \quad (28),$$

Once the bit counts for each transform size have been readjusted, the one with the lowest bit count is assumed to be the best from a rate-distortion perspective. In an alternative embodiment, the encoder uses another cost function that relates cost and distortion as a single measure. In other alternative embodiments, the encoder uses a cost function that considers only rate or only distortion.

For each block, the encoder computes five values for the variables shown in Table 10. (Some of the values are also used in the macroblock level as described in the next section.) As initially computed from bit counts and distortion, the values cost8×8, cost8×4 and cost4×8 do not include the overhead required to signal the transform type at the block level. The encoder adds (3823, 3833, 3843) the bit overhead required to signal transform size at the block level for the different transform sizes.

$$cost8\times8'=cost8\times8+8\times8overhead \quad (29),$$

$$cost8\times4'=cost8\times4+8\times4overhead \quad (30),$$

$$cost4\times8'=cost4\times8+4\times8overhead \quad (31),$$

where the overhead measures indicate the overhead for switching flags for the different transform types at the block level.

The encoder computes the values for costBlock and BlockLevelTransformType as follows. The encoder (3850) compares cost8×8' to cost8×4' to find the best transform size between the two of them. The encoder sets (3851, 3852) costBlock and BlockLevelTransformType to either the 8×8 size or the 8×4 size, respectively. The encoder then compares (3854) the best transform size so far to cost4×8' to find the best transform size between the two of them. The encoder keeps (3855) the current values or sets (3856) costBlock and BlockLevelTransformType to the 4×8 size. Alternatively, the encoder uses other conditional logic to find values for costBlock and BlockLevelTransformType.

b. Macroblock Level

Returning to FIGS. 38c and 38d, the encoder accumulates (3858) the block costs for the block with the four running totals for the macroblock: costMB8×8, costMB8×4, costMB4×8, and costMBvar. The encoder then performs (3820) the transforms of different sizes for the other blocks in the macroblock. Thus, the value of costBlock is accumulated for the six blocks that make up the macroblock. Likewise, cost8×8, cost8×4 and cost4×8 are accumulated for the six blocks.

For each macroblock, the encoder computes seven values for the variables shown in Table 9. (Some of the values are also used in the frame level as described in the next section.) As initially computed for the macroblock, the values costMBvar, costMB8×8, costMB8×4, and costMB4×8 do not include the overhead required to signal the transform size at the macroblock level. The encoder adds (3858) the number of bits required to signal each possible choice to the bit counts.

$$\text{cost}MB8\times8' = \text{cost}MB8\times8 + 8\times8\text{overhead} \quad (32),$$

$$\text{cost}MB8\times4' = \text{cost}MB8\times4 + 8\times4\text{overhead} \quad (33),$$

$$\text{cost}MB4\times8' = \text{cost}MB4\times8 + 4\times8\text{overhead} \quad (34),$$

$$\text{cost}MB\text{var}' = \text{cost}MB\text{var} + \text{Varoverhead} \quad (35),$$

where the overhead measures indicate the overhead for switching flags for the different transform types at the macroblock level. For costMBvar', the overhead measure also indicates the overhead for switching flags at the block level.

The encoder then computes values for costMB, MBLevelTransformType, and SwitchAtBlockLevel as follows. Basically, the encoder decides whether to code the macroblock with a single transform size for all blocks in the macroblock or to allow each block in the macroblock to signal its own transform size. The encoder compares (3860) costMB8×8' to costMB8×4' to find the best transform size between the two of them. The encoder sets (3861, 3862) costMB and MBLevelTransformType to either the 8×8 size or the 8×4 size, respectively. The encoder then compares (3863) the best transform size so far costMB to costMB4×8' to find the best transform size between the two of them. The encoder keeps (3864) the current values or sets (3865) costMB and MBLevelTransformType to the 4×8 size. The encoder then compares (3866) the best transform size so far costMB to costMBVar' to find the best transform size between the two of them. If costMB is less than costMBVar', the encoder keeps (3867) the current value for costMB and sets SwitchAtBlockLevel to FALSE, which mean that the switching level is macroblock level for the macroblock. Otherwise, the encoder sets (3868) costMB to costMBVar' and sets SwitchAtBlockLevel to TRUE, which means that the switching level is block level for the macroblock. Alternatively, the encoder uses other conditional logic to find values for costMB, MBLevelTransformType, and SwitchAtBlockLevel.

c. Frame Level

Returning to FIGS. 38a and 38b, the encoder accumulates (3869) the macroblock costs for the macroblock with the four running totals for the frame: costFrm8×8, costFrm8×4, costFrm4×8, and costFrmvar. The encoder then performs (3810) the transforms of different sizes for the other macroblocks in the frame. Thus, the value of costMB is accumulated for the macroblocks that make up the frame. Likewise, costMB8×8, costMB8×4 and costMB4×8 are accumulated for the macroblocks that make up the frame.

For each frame, the encoder computes seven values for the variables shown in Table 8. As initially computed for the frame, costFrm8×8, costFrm8×4, costFrm4×8 and costFrmVar do not include the overhead required to signal the transform at the frame level. The encoder adds (3858) the number of bits required to signal each possible choice to the bit counts.

$$\text{costFrm}8\times8' = \text{costFrm}8\times8 + 8\times8\text{overhead} \quad (36),$$

$$\text{costFrm}8\times4' = \text{costFrm}8\times4 + 8\times4\text{overhead} \quad (37),$$

$$\text{costFrm}4\times8' = \text{costFrm}4\times8 + 4\times8\text{overhead} \quad (38),$$

$$\text{costFrmvar}' = \text{costFrmvar} + \text{Varoverhead} \quad (39),$$

where the overhead measures indicate the overhead for switching flags for the different transform types at the frame level. For costFrmvar', the overhead measure also indicates the overhead for switching flags at the macroblock/block level.

The encoder then computes values for costFrm, FrameLevelTransformType, and SwitchAtMBLevel as follows. Basically, the encoder decides whether to code the frame with a single transform type for all blocks in the frame or to allow each macroblock to signal its own transform size. The encoder compares (3880) costFrm8×8' to costFrm8×4' to find the best transform size between the two of them. The encoder sets (3881, 3882) costFrm and FrameLevelTransformType to either the 8×8 size or the 8×4 size, respectively. The encoder then compares (3883) the best transform size so far costFrm to costFrm4×8' to find the best transform size between the two of them. The encoder keeps (3884) the current values or sets (3885) costFrm and FrameLevelTransformType to the 4×8 size. The encoder then compares (3886) the best transform size so far costFrm to costFrmVar' to find the best transform size between the two of them. If costFrm is less than costFrmVar', the encoder sets (3887) SwitchAtMBLevel to FALSE. Otherwise, the encoder sets (3888) SwitchAtMBLevel to TRUE. Alternatively, the encoder uses other conditional logic to find values for costFrm, FrameLevelTransformType, and SwitchAtMBLevel.

3. Signaling Switches

Continuing the example of FIGS. 38a through 38f, if the value of SwitchAtMBLevel is TRUE, the transform type is signaled at the macroblock level. Another signal present at each macroblock indicates whether a single transform type is used for all blocks in the macroblock or whether each block signals its own transform type. This is determined by the value of SwitchAtBlockLevel, as previously described. If SwitchAtBlockLevel is TRUE, of transform type specified by BlockLevelTransformType as determined at the block level is used for that block. If SwitchAtBlockLevel is FALSE, the transform type specified by MBLevelTransformType as determined at the macroblock level is used for all the blocks in the macroblock.

If the value of SwitchAtMBLevel is FALSE, the transform type used for all blocks in the frame is signaled at the frame level. The transform type is indicated by the value of FrameLevelTransformType.

Figure 39:
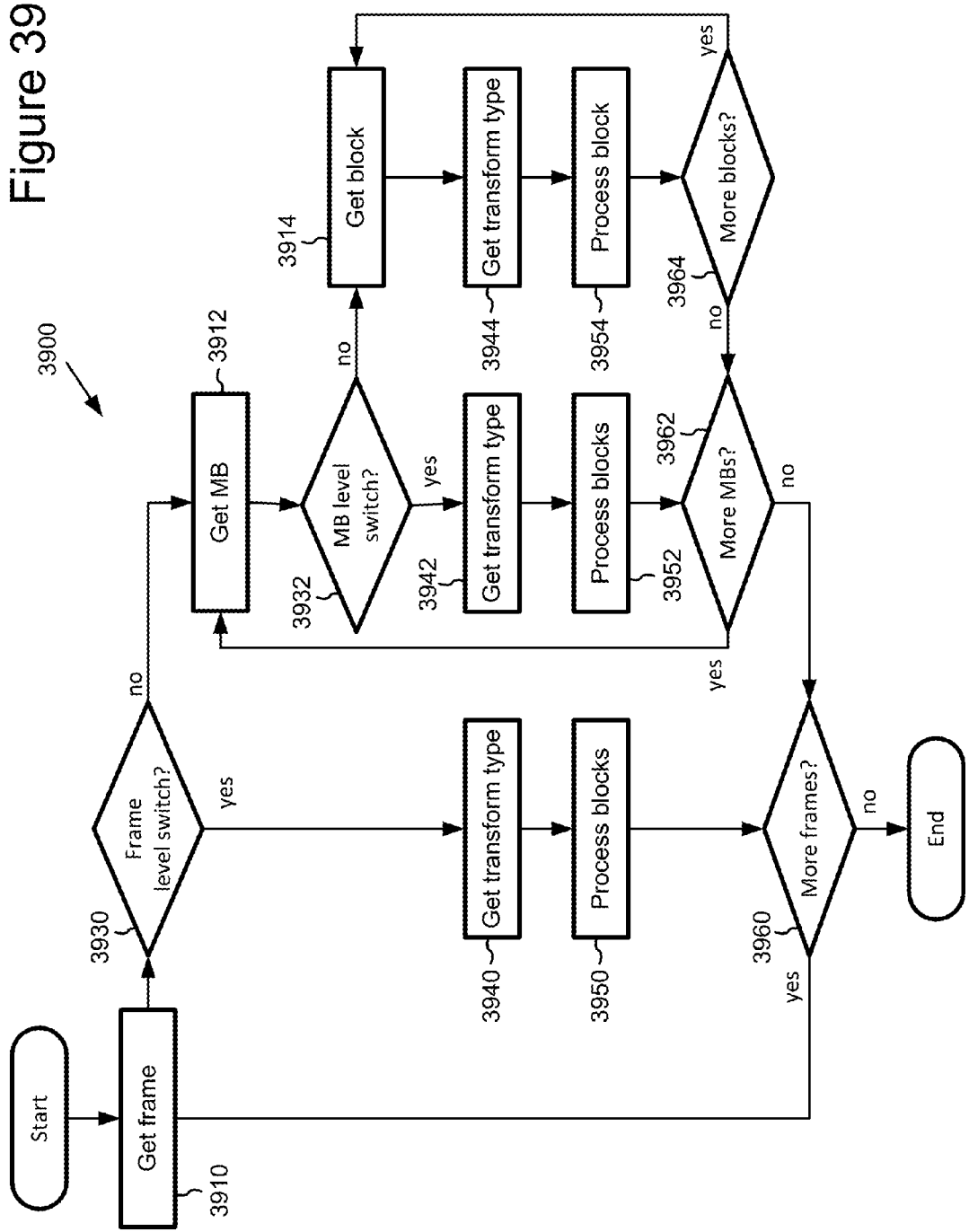
FIG. 39 is a flowchart showing a technique for switching transform sizes in a video decoder.

FIG. 39 shows a technique for switching transform sizes in a video decoder. For the sake of simplicity, FIG. 39 does not show the various ways in which the technique (3900) can be used in conjunction with other techniques.

A decoder gets (3910) a video frame, for example, a predicted video frame. The decoder determines (3930) whether frame-level switch information is used to indicate a transform size for the frame. If so, the decoder gets (3940) the transform type for the frame and processes (3950) the blocks of the frame. For example, the decoder determines whether the transform type is 8×8, 8×4, or 4×8, and then applies an 8×8, 8×4, or 4×8 inverse DCT to the blocks of the frame. The decoder determines (3960) whether there are any more frames. If not, the technique ends. If so, the decoder gets (3910) the next frame and determines (3930) whether frame-level switch information for the frame is used to indicate a transform size for the frame.

If the frame-level switch information is not used to indicate a transform size for the frame, the decoder gets (3912) a macroblock for the frame. The decoder determines (3932) whether macroblock-level switch information is used to indicate a transform size for the macroblock. If so, the decoder gets (3942) the transform type for the macroblock and processes (3952) the blocks of the macroblock. The decoder determines (3962) whether there are any more macroblocks in the frame. If not, the decoder determines (3960) whether there are any more frames. If there are more macroblocks in the frame, the decoder gets (3912) the next macroblock and determines (3932) whether macroblock-level switch information for the macroblock is used to indicate a transform size for the macroblock.

If macroblock-level switch information is not used to indicate a transform size for the macroblock, the decoder gets (3914) a block for the macroblock. The decoder gets (3944) the transform type for the block and processes (3954) the block. The decoder determines (3964) whether there are any more blocks in the macroblock. If not, the decoder determines (3962) whether there are any more macroblocks in the frame. If there are more blocks in the macroblock, the decoder gets (3914) the next block and gets (3944) its transform type.

In alternative embodiments, a video encoder and decoder use other switching logic to switch between transform sizes.

Table 13 shows entropy codes for transform types in one implementation.

TABLE 13

Entropy Codes for Transform Types

| VLC | Transform Type |
|---|---|
| 0 | 8 × 8 DCT |
| 10 | 8 × 4 DCT |
| 11 | 4 × 8 DCT |

Other implementations use different entropy codes and/or different code tables for different transform sizes.

4. Scan Patterns

Following transform coding and quantization in the video encoder, the encoder scans one or more two-dimensional blocks of quantized frequency coefficients into one or more one-dimensional arrays for entropy encoding. The video decoder scans one or more one-dimensional arrays into one or more two-dimensional blocks before inverse quantization. A scan pattern indicates how elements of a two-dimensional block are ordered in a corresponding one-dimensional array.

In some embodiments, the encoder and decoder select between multiple available scan patterns for a residual for a motion-compensated block. Both the encoder and the decoder use one or more scan patterns, and use different scan patterns for different transform sizes. FIG. 40 shows a technique (4000) for selecting one of multiple available scan patterns for frequency coefficients of a prediction residual for a motion-compensated block. For the sake of simplicity, FIG. 40 does not show the various ways in which the technique (4000) can be used in conjunction with other techniques.

FIG. 40 shows three available scan patterns, which in this context are, for example, for 8×8, 8×4, and 4×8 DCTs, respectively. FIGS. 41a-41c show 8×8 (4101), 8×4 (4102), and 4×8 (4103) scan patterns, respectively, in one implementation. Other implementations use different scan patterns.

The encoder/decoder selects (4010) a scan pattern for scanning the residual block. For example, an encoder/decoder selects a scan pattern based upon transform size for the block. The encoder/decoder then applies (4020, 4030, or 4040) the selected scan pattern by reordering elements of a two-dimensional block into a one-dimensional array, or vice versa.

Alternatively, the encoder/decoder selects between more or fewer scan patterns and/or selects a scan pattern based upon other criteria.

5. Sub-Block Pattern Codes

In addition to selecting a transform size and applying the frequency transform to a prediction residual block, the encoder indicates in the output bitstream what the transform size is for the block. For example, the encoder indicates whether the DCT used on a block is an 8×8, 8×4, or 4×8 DCT.

In some embodiments, if the transform size is a sub-block transform size, the encoder also outputs a sub-block pattern code that indicates the presence or absence of information for the sub-blocks of a block. For example, for the 8×4 DCT, the sub-block transform code indicates the presence or absence of information for 1) only the bottom 8×4 sub-block; 2) only the top 8×4 sub-block; or 3) both the top and the bottom sub-blocks. For the 4×8 DCT, the sub-block transform code indicates the presence or absence of information for 1) only the left 4×8 sub-block; 2) only the right 4×8 sub-block; or 3) both the left and the right sub-blocks. Table 14 shows entropy codes for sub-block pattern codes in one implementation.

TABLE 14

Entropy Codes for Sub-block Pattern Codes

| SUBBLK- PAT VLC | 8 × 4 Sub-block Pattern | | 4 × 8 Sub-block Pattern | |
|---|---|---|---|---|
| | Top | Bottom | Left | Right |
| 0 | | X | | X |
| 10 | X | X | X | X |
| 11 | X | | X | |

The sub-block pattern codes are used at the block level, and only when the block uses a sub-block transform size (e.g., not 8×8 DCT for an 8×8 block). Other implementations use other entropy codes and/or use sub-block pattern codes differently.

In the encoder, the condition for whether to output information for a sub-block is implementation-dependent. For example, with the sub-block pattern code, the encoder indicates which of the sub-blocks of the block have at least one non-zero coefficient. For a sub-block with only zero-value coefficients, the encoder sends only the sub-block pattern code, and not other information for the sub-block, which reduces bitrate. Alternatively, the encoder uses another condition (e.g., mostly zero-value coefficients) to set the values of sub-block pattern codes.

Figure 42:
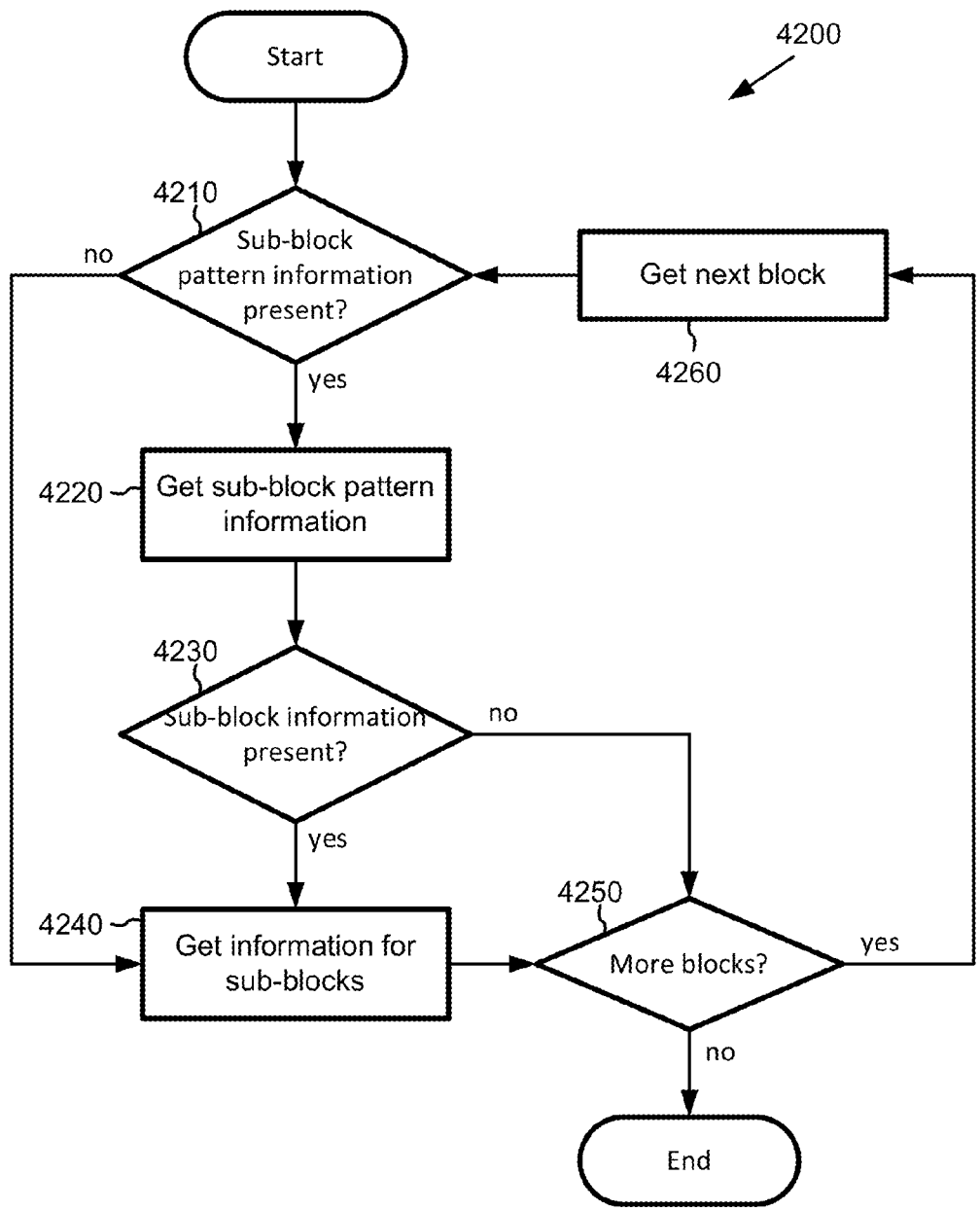
FIG. 42 is a flowchart showing a technique for using sub-block pattern codes in a video decoder.

FIG. 42 shows a technique for decoding of sub-blocks using pattern information. For the sake of simplicity, FIG. 42 does not show the various ways in which the technique (4200) can be used in conjunction with other techniques.

The decoder determines (4210) whether sub-block pattern information is present for a block. For example, in one implementation, if the transform size is full block (e.g., 8×8), the bitstream does not include a sub-block pattern code for the block.

If sub-block pattern information is present for the block, the decoder gets (4220) the sub-block pattern information (e.g., sub-block pattern code) for the block. The decoder then determines (4230) whether sub-block information is present for the sub-blocks of the block. For example, the decoder checks the sub-block pattern code. If information is present for at least one sub-block, the decoder gets (4240) the information for the sub-blocks that have information. For example, the decoder gets information for the top half, bottom half, or both top and bottom halves of a 8×8 block split into 8×4 sub-blocks. If the sub-block pattern indicates that no information is present for the sub-blocks of the block, the decoder goes to the next block, if present.

If sub-block pattern information is not present for the block, the encoder skips the steps 4220 and 4230, and gets (4240) information for the block.

The decoder then determines (4250) whether there are any more blocks to be decoded. If not, the technique ends. If so, the decoder gets (4260) the next block and determines (4210) whether sub-block pattern information is present for it.

In alternative embodiments, the encoder and decoder use other techniques to signal the presence or absence of sub-block information with sub-block pattern codes.

C. Loop Filtering

Quantization and other lossy processing of prediction residuals can cause blocky artifacts (artifacts at block boundaries) in reference frames that are used for motion estimation of subsequent predicted frames. Post-processing by a decoder to remove blocky artifacts after reconstruction of a video sequence improves perceptual quality. Post-processing does not improve motion compensation using the reconstructed frames as reference frames, however, and does not improve compression efficiency. With or without post-processing, the same amount of bits is used for compression, but the post-processing improves perceived quality. Moreover, the filters used for deblocking in post-processing can introduce too much smoothing in reference frames used for motion estimation/compensation.

In one or more embodiments, a video encoder processes a reconstructed frame to reduce blocky artifacts prior to motion estimation using the reference frame. A video decoder processes the reconstructed frame to reduce blocky artifacts prior to motion compensation using the reference frame. With deblocking, a reference frame becomes a better reference candidate to encode the following frame. Thus, using the deblocking filter improves the quality of motion estimation/compensation, resulting in better prediction and lower bitrate for prediction residuals. The deblocking filter is especially helpful in low bitrate applications. Various features of the loop filtering can be used in combination or independently. These features include, but are not limited to:

1a) Using a deblocking filter in a motion estimation/compensation loop in a video encoder.

1b) Using a deblocking filter in a motion compensation loop in a video decoder.

2a) Adaptively filtering block boundaries of a reference frame in a loop in a video encoder or decoder. The adaptive filtering reduces the undesirable blurring of image properties coincident with block boundaries.

2b) Adaptively filtering block boundaries of a reference frame in a loop in a video encoder or decoder with reference to a threshold based at least in part upon a quantization level.

3) Using a short filter to smooth block boundaries in a reference frame in a loop in a video encoder or decoder. Compared to other filters, the short filter preserves more original information for use in motion estimation/compensation.

4a) Adaptively enabling or disabling loop filtering in a video encoder or decoder.

4b) Adaptively enabling or disabling loop filtering in a video encoder following a decision in a closed loop or open loop.

4c) Adaptively enabling or disabling loop filtering in a video encoder or decoder on a per-frame, per-sequence, or other basis.

4d) Enabling or disabling loop filtering in a video decoder according to flags received from a video encoder or contextual information.

In some embodiments, following the reconstruction of a frame in a video encoder or decoder, the encoder/decoder applies a deblocking filter to 8×8 blocks in the reconstructed frame. The deblocking filter removes boundary discontinuities between blocks in the reconstructed frame, which improves the quality of subsequent motion estimation using the reconstructed frame as a reference frame. The encoder/decoder performs deblocking after reconstructing the frame in a motion compensation loop in order for motion compensation to work as expected. This contrasts with typical deblocking processes, which operate on the whole image outside of the motion compensation loop. The deblocking filter itself, however, can be the same or different than a filter used in post-processing. For example, a decoder can apply an additional post-processing deblocking filter to further smooth a reconstructed frame for playback after applying the deblocking filter for the frame as a reference frame for motion compensation. In alternative embodiments, the deblocking filter is applied to sets of pixels other than 8×8 blocks.

The encoder/decoder applies the deblocking filter across boundary rows and/or columns in the reference frame. In some embodiments, the encoder/decoder adaptively filters block boundaries. The adaptive filtering reduces the unintended blurring of image properties that coincide with block boundaries. The adaptive filtering can depend on difference thresholds across boundaries, and can factor in a quantization level for the reference frame. In alternative embodiments, the encoder/decoder always applies the deblocking filter.

The encoder/decoder applies one or more different filters for deblocking. In some embodiments, the encoder/decoder applies a short filter. Compared to other filters, the short filter affects fewer pixels, preserving more original information for motion estimation. Other embodiments do not use the short filter.

In some embodiments, the encoder/decoder enables or disables loop filtering on a per-sequence or other basis. In other embodiments, the encoder/decoder always applies the deblocking filter to reference frames.

1. Deblocking Filter for Reference Frames

Figure 43:
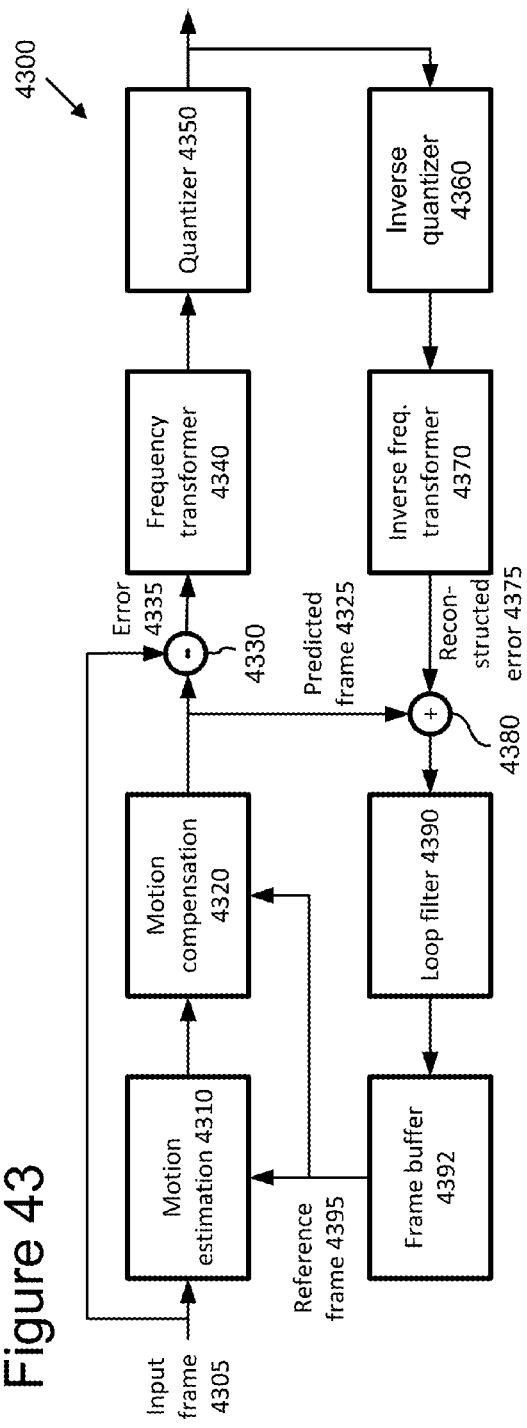
FIG. 43 is a block diagram showing a motion estimation/compensation loop with deblocking of a reference frame in a video encoder.
Figure 44:
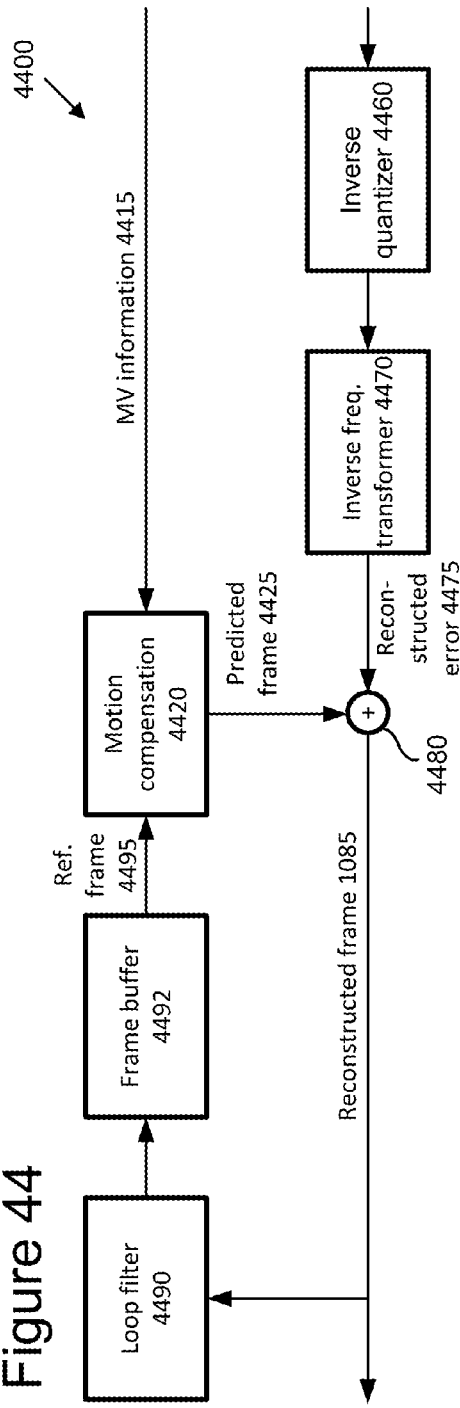
FIG. 44 is a block diagram showing a motion compensation loop with deblocking of a reference frame in a video decoder.

The deblocking filter smoothes boundary discontinuities between blocks in reconstructed frames in a video encoder or decoder. FIG. 43 shows a motion estimation/compensation loop in a video encoder that includes a deblocking filter. FIG. 44 shows a motion compensation loop in a video decoder that includes a deblocking filter.

With reference to FIG. 43, a motion estimation/compensation loop (4300) includes motion estimation (4310) and motion compensation (4320) of an input frame (4305). The motion estimation (4310) finds motion information for the input frame (4305) with respect to a reference frame (4395), which is typically a previously reconstructed intra- or inter-coded frame. In alternative embodiments, the loop filter is applied to backward-predicted or bi-directionally-predicted frames. The motion estimation (4310) produces motion information such as a set of motion vectors for the frame. The motion compensation (4320) applies the motion information to the reference frame (4395) to produce a predicted frame (4325).

The prediction is rarely perfect, so the encoder computes (4330) the error/prediction residual (4335) as the difference between the original input frame (4305) and the predicted frame (4325). The frequency transformer (4340) frequency transforms the prediction residual (4335), and the quantizer (4350) quantizes the frequency coefficients for the prediction residual (4335) before passing them to downstream components of the encoder.

In the motion estimation/compensation loop, the inverse quantizer (4360) inverse quantizes the frequency coefficients of the prediction residual (4335), and the inverse frequency transformer (4370) changes the prediction residual (4335) back to the spatial domain, producing a reconstructed error (4375) for the frame (4305).

The encoder then combines (4380) the reconstructed error (4375) with the predicted frame (4325) to produce a reconstructed frame. The encoder applies the deblocking loop filter (4390) to the reconstructed frame and stores the reconstructed frame in a frame buffer (4392) for use as a reference frame (4395) for the next input frame. Alternatively, the loop filter (4390) follows the frame buffer (4392).

In alternative embodiments, the arrangement or constituents of the motion estimation/compensation loop changes, but the encoder still applies the deblocking loop filter to reference frames.

With reference to FIG. 44, a motion compensation loop (4400) includes motion compensation (4420) to produce a reconstructed frame (4485). The decoder receives motion information (4415) from the encoder. The motion compensation (4420) applies the motion information (4415) to a reference frame (4495) to produce a predicted frame (4425).

In a separate path, the inverse quantizer (4460) inverse quantizes the frequency coefficients of a prediction residual, and the inverse frequency transformer (4470) changes the prediction residual back to the spatial domain, producing a reconstructed error (4475) for the frame (4485).

The decoder then combines (4480) the reconstructed error (4475) with the predicted frame (4425) to produce the reconstructed frame (4485), which is output from the decoder. The decoder also applies a deblocking loop filter (4490) to the reconstructed frame (4485) and stores the reconstructed frame in a frame buffer (4492) for use as the reference frame (4495) for the next input frame. Alternatively, the loop filter (4490) follows the frame buffer (4492).

In alternative embodiments, the arrangement or constituents of the motion compensation loop changes, but the decoder still applies the deblocking loop filter to reference frames.

Figure 45:
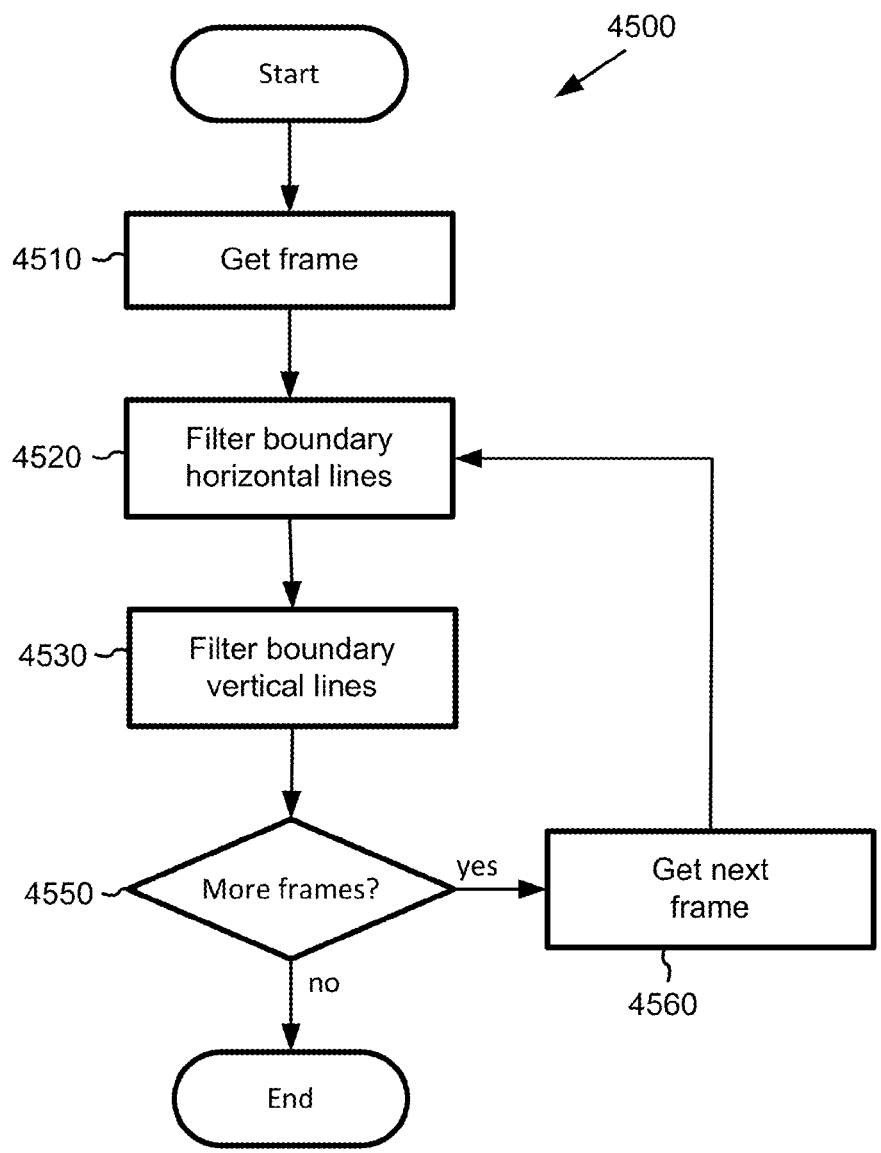
FIG. 45 is a flowchart showing a technique for loop filtering of reference frames.

FIG. 45 shows a technique for applying a deblocking filter to reference frames in a video encoder or decoder. For the sake of simplicity, FIG. 45 does not show the various ways in which the technique (4500) can be used in conjunction with other techniques.

With reference to FIG. 45, a video encoder/decoder gets (4510) a reconstructed frame. For example, the reconstructed frame is a combination of a reconstructed prediction residual and a predicted frame.

The video encoder/decoder filters (4520) block boundary horizontal lines in the reconstructed frame, and then filters (4530) block boundary vertical lines in the reconstructed frame. The filtering smoothes out the discontinuities between the blocks of the reconstructed frame. Therefore, the filtering process operates on the pixels that border neighboring blocks.

Figure 46:
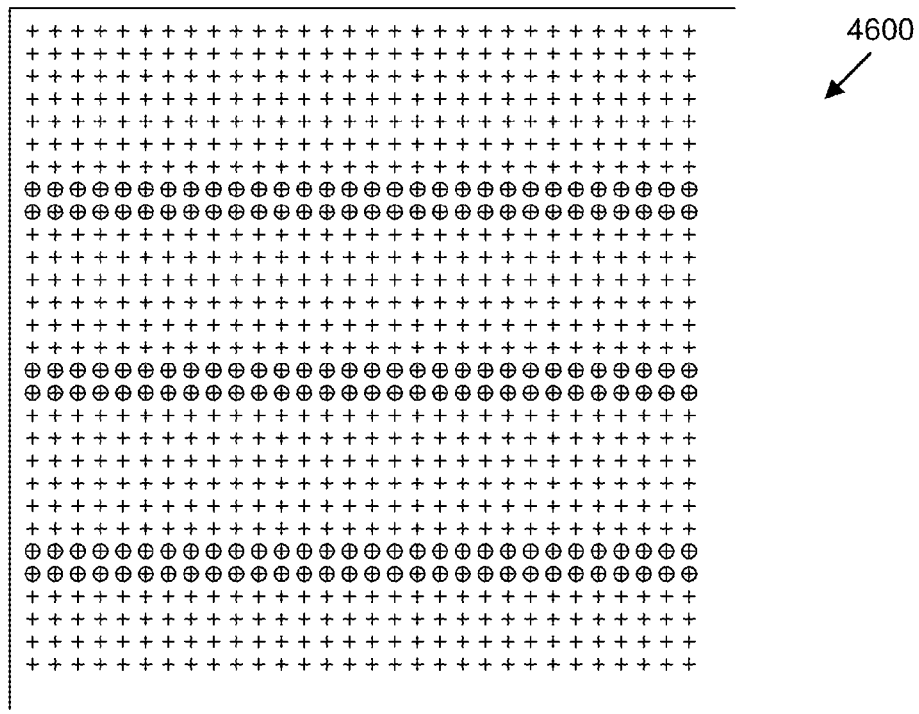
FIG. 46 is a chart showing boundary pixel locations in rows of a reference frame that are filtered with a deblocking filter.
Figure 47:
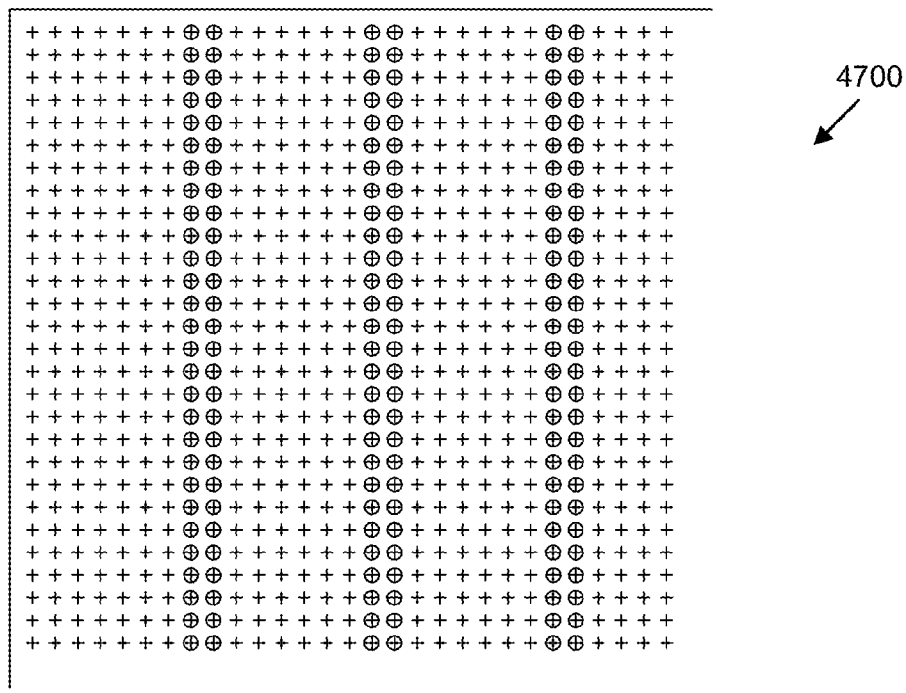
FIG. 47 is a chart showing boundary pixel locations columns of a reference frame that are filtered with a deblocking filter.

FIG. 46 shows boundary pixel locations in rows of pixels that are filtered in one implementation, and FIG. 47 shows boundary pixels locations in columns of pixels that are filtered in the implementation. FIG. 46 and FIG. 47 show the upper left corner of a component (e.g., luminance or chrominance) plane. The frame boundaries to the top and left are shown as solid lines. The crosses represent pixels, and circled crosses represent pixels that are filtered. As FIG. 46 and FIG. 47 show, the pixels of the top row and left column are not filtered.

The bottom horizontal line and last vertical line are also not filtered. The following lines are filtered:

$$\text{horizontal lines}(7,8),(15,16)\ldots((N-1)*8-1,(N-1)*8) \quad (40),$$

$$\text{vertical lines}(7,8),(15,16)\ldots((M-1)*8-1,(M-1)*8) \quad (41),$$

where N=the number of 8×8 blocks in the plane horizontally (N*8=horizontal frame size), M=the number of 8×8 blocks in the frame vertically (M*8=vertical frame size), and line numbering in each direction starts with 0.

All the horizontal lines in the frame are filtered first followed by the vertical lines. Thus, the filtering of vertical lines potentially considers pixels previously filtered in horizontal lines. Alternatively, the order of the horizontal and vertical filtering is reversed. In alternative embodiments, other pixel locations in a reference frame are filtered.

Following the filtering, the encoder/decoder determines (4550) whether there are any more frames. If not, the technique ends. If so, the encoder/decoder gets (4560) the next frame and filters it.

In some embodiments, the video encoder enables or disables loop filtering of reference frames based upon encoder settings, context information, or other criteria. The encoder can embed a switch at a frame, sequence, or other level to enable/disable deblocking with a loop filter.

2. Short Filter

Figure 48:
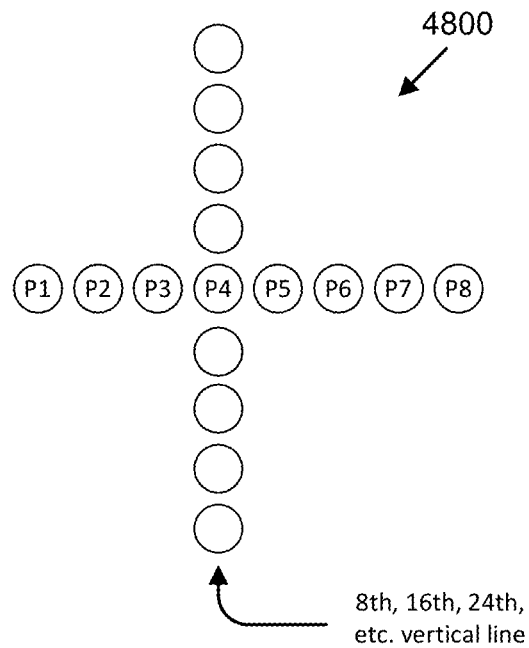
FIG. 48 is a chart showing pixel locations for filtering a vertical line.
Figure 49:
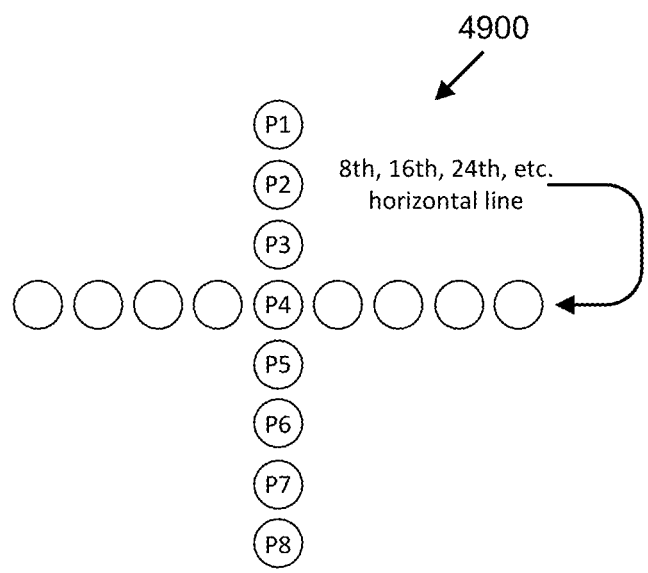
FIG. 49 is a chart showing pixel locations for filtering a horizontal line.

FIG. 48 shows pixel locations for filtering a vertical line in one implementation. The pixel location P4 corresponds to a pixel of the eighth vertical line in the frame, and the pixel location P5 corresponds to a pixel of the ninth vertical line in the frame, etc. The labeled pixels P1 through P8 indicate pixel values that are involved in the filtering operation. Within this group, pixels P4 and P5 are modified by the filtering. Pixels P4 and P5 in FIG. 48 correspond to pixels at locations indicated with circled crosses in FIG. 47. FIG. 49 shows pixel locations for filtering a horizontal line in the implementation, and is the transpose of FIG. 48. The filter definitions for the locations shown in FIGS. 48 and 49 in this implementation are shown in FIG. 50.

In some embodiments, the encoder and decoder use a short filter. In particular, in one implementation the encoder and decoder use a modified form of the MPEG 4 post-processing deblocking filter. For a complete definition of the MPEG 4 post-processing deblocking filter, see the MPEG 4 standard. With the modified filter, only one pixel on each side of the block boundary is smoothed if the neighboring pixel values meet a smoothness test, which is defined below for the implementation. This reduces the number of values that are modified in a reference frame, and improves the quality of prediction using estimation. The encoder/decoder adjusts both boundary pixels with one filtering operation. In other implementations, the encoder/decoder still modifies only one pixel on each side of a block boundary, but uses another filter definition, other smoothness test, or two filtering operations.

Alternatively, the encoder and decoder use filters that consider more or fewer pixel locations, select between different filters, modify more or fewer pixel locations, and/or use different filtering horizontally and vertically.

3. Adaptive Deblocking Filter

Figure 51:
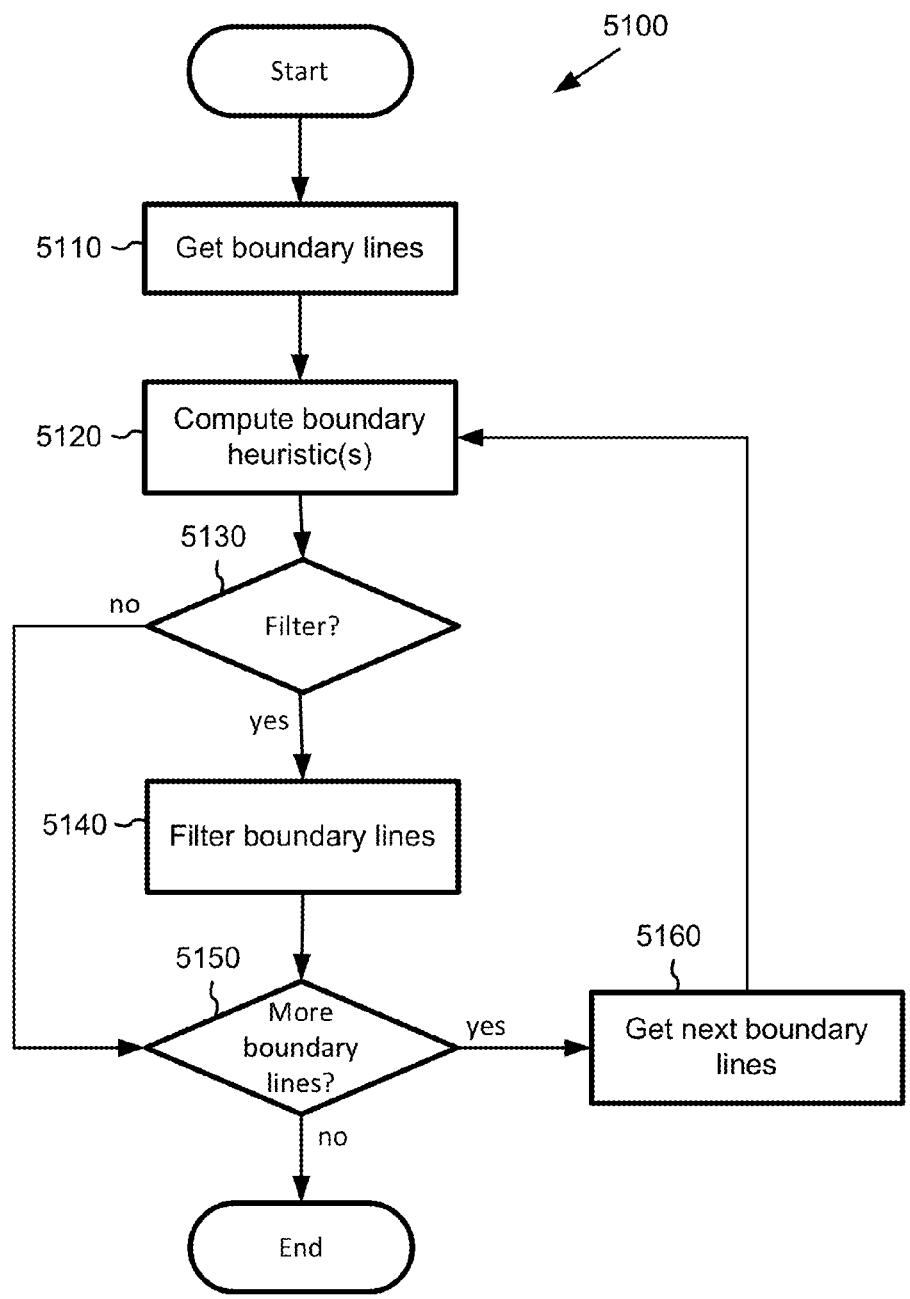
FIG. 51 is a flowchart showing a technique for adaptively filtering boundary pixels of a reference frame in a loop.

FIG. 51 shows a technique for selectively filtering boundary pixels for blocks in a reference frame in a video encoder or decoder. The encoder/decoder typically applies the technique (5100) for horizontal filtering then applies it again for vertical filtering. For the sake of simplicity, FIG. 51 does not show the various ways in which the technique (5100) can be used in conjunction with other techniques.

FIG. 50 shows pseudocode (5000) for a filtering operation performed on pixels in horizontal or vertical lines in one implementation. The values P1, P2 ... P8 in the pseudocode (5000) correspond to the labeled pixels in FIGS. 48 and 49.

With reference to FIGS. 50 and 51, the encoder/decoder gets (5110) boundary lines between blocks for a reference frame. For example, the encoder/decoder gets the eight and ninth, sixteenth and seventeenth, etc. lines horizontally or vertically in a reference frame with 8×8 blocks.

The encoder/decoder then computes (5120) one or more boundary heuristics for the boundary lines. For example, the encoder computes a cross-boundary discontinuity heuristic a0, a first side (i.e., top or left) discontinuity heuristic a1, a second side (i.e., right or bottom) discontinuity heuristic a2, and an intermediate heuristic a3 as shown in FIG. 50 in one implementation. The value of a0 depends on the values of P3 through P6, the value of a1 on P1 through P4, and the value of a2 on P5 through P8. In other implementations, the encoder/decoder computes more or fewer boundary heuristics and/or uses different formulas for the boundary heuristics. For example, the encoder/decoder uses simpler heuristics to reduce computational complexity (especially in the decoder) and/or computes heuristics for some subset of boundary lines instead of every group of boundary lines.

The encoder/decoder then determines (5130) whether the boundary lines should be filtered. The encoder typically considers the one or more boundary heuristics in this determination. In some implementations, the encoder compares one or more of the boundary heuristics to a quantization level. By performing this comparison (e.g., magnitude of a0 versus frame quantization step size PQUANT in FIG. 50), the encoder/decoder can avoid some filtering operations for discontinuities caused by image properties, not by quantization. For example, if a0 is greater than PQUANT, there is a greater chance that the discontinuity is due to a property of the image and should not be smoothed. The encoder/decoder can also compare the boundary heuristics to each other. For example, FIG. 50 shows a comparison of the magnitude of a0 to the minimum magnitude of a1 and a2. By performing this comparison, the encoder/decoder avoids some filtering operations for cross-boundary discontinuities on the order of image property discontinuities already in one block or the other around the boundary. In other implementations, the encoder/decoder uses different conditional logic to decide when to apply a deblocking filter.

If the encoder/decoder determines the boundary lines should be filtered, the encoder/decoder filters (5140) the boundary lines. For example, the encoder/decoder adjusts the pixels P4 and P5 by some value. In FIG. 50, the encoder/decoder computes the average difference clip of the pixels P4 and P5. The encoder/decoder also computes another measure d that depends on the boundary heuristics a0 and a3, with a magnitude no greater than clip. If clip is non-zero, the pixels P4 and P5 are adjusted by the value d. In other implementations, the encoder/decoder modifies more or fewer pixels of the boundary lines, uses different filter definitions, uses a different adjustment factor (e.g., (P4+P5)/x), and/or uses different filters for different operations. If the encoder/decoder determines the boundary lines should not be filtered, the encoder/decoder skips the filtering (5140) step.

The encoder/decoder determines (5150) whether more boundary lines in the frame should be filtered. If not, the technique ends. If so, the encoder/decoder gets (5160) the next boundary lines to be filtered in the frame.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A computer-readable medium storing computer-executable instructions for causing a processor programmed thereby to perform a method, wherein the computer-readable medium is selected from the group consisting of only a non-volatile memory, magnetic disk storage, CD ROM and DVD, the method comprising:
   encoding a first video frame of a video sequence using intraframe coding, including:
      computing a spatial extrapolation for a current block of pixel values in the first video frame;
      computing a spatial-extrapolation residual based upon the current block in the first video frame and the spatial extrapolation; and
      applying a re-oriented frequency transform to the spatial-extrapolation residual, wherein the re-oriented frequency transform addresses non-stationarity in pixel values of the spatial-extrapolation residual due to the spatial extrapolation;
   outputting encoded video data for the first video frame in a bitstream;
   encoding a second video frame of the video sequence, including:
      computing a motion-compensated prediction for a current block in the second video frame;
      computing a motion-compensated prediction residual based upon the current block in the second video frame and the motion-compensated prediction;
      encoding the motion-compensated prediction residual using a variable-block-size frequency transform with support for switching of transform size at varying levels within the second video frame; and
   outputting encoded video data for the second video frame in the bitstream, wherein the bitstream includes switching information that indicates the transform size used for the motion-compensated prediction residual, and wherein format of the bitstream allows signaling of the switching information within the bitstream at frame level for the second video frame or at macroblock level.

2. The computer-readable medium of claim 1 wherein the method further comprises, as part of a motion compensation loop, for each of a reconstructed version of the first video frame and a reconstructed version of the second video frame as a reference frame:
   adaptively filtering one or more boundaries between blocks of pixel values in the reference frame to reduce boundary discontinuities, including:
      measuring smoothness of neighboring pixel values across a given boundary of the one or more boundaries; and
      if the smoothness of the neighboring pixel values meets a smoothness test, filtering one or more pixel values on each side of the given boundary, wherein an adjustment factor for the filtering depends on one or more discontinuity measures that quantify pixel value discontinuity.

3. The computer-readable medium of claim 1 wherein the method further comprises, as part of a spatial extrapolation loop, adaptively filtering at least some values of the spatial extrapolation for the current block in the first video frame.

4. The computer-readable medium of claim 1 wherein the encoding the first video frame further comprises:
selecting one of multiple available scan patterns for transform coefficients resulting from the applying the re-oriented frequency transform to the spatial-extrapolation residual, wherein the selecting one of multiple available scan patterns depends on extrapolation mode for the current block in the first video frame.

5. The computer-readable medium of claim 4 wherein the multiple available scan patterns include a vertical scan pattern, a horizontal scan pattern and a normal scan pattern.

6. The computer-readable medium of claim 1 wherein the encoding the motion-compensated prediction residual comprises:
selecting one of multiple available scan patterns for transform coefficients of the motion-compensated prediction residual, wherein the selecting one of multiple available scan patterns depends on the transform size used for the motion-compensated prediction residual.

7. A computing system that implements a video encoder, wherein the computing system includes a processor and memory, wherein the computing system is adapted to perform a method comprising:
encoding a first video frame of a video sequence using intraframe coding, including:
computing a spatial extrapolation for a current block of pixel values in the first video frame;
computing a spatial-extrapolation residual based upon the current block in the first video frame and the spatial extrapolation; and
applying a re-oriented frequency transform to the spatial-extrapolation residual, wherein the re-oriented frequency transform addresses non-stationarity in pixel values of the spatial-extrapolation residual due to the spatial extrapolation; and
outputting encoded video data for the first video frame in a bitstream;
encoding a second video frame of the video sequence, including using a variable-block-size frequency transform with support for switching of transform size at varying levels within the second video frame, wherein the encoding the second video frame includes:
computing a motion-compensated prediction for a current block of pixel values in the second video frame;
computing a motion-compensated prediction residual based upon the current block in the second video frame and the motion-compensated prediction;
selecting a transform size to use for the motion-compensated prediction residual; and
applying a frequency transform of the selected transform size to the motion-compensated prediction residual; and
outputting encoded video data for the second video frame in the bitstream, wherein the bitstream includes switching information that permits a decoder to select the transform size to use for the motion-compensated prediction residual depending on the switching information, and wherein format of the bitstream allows signaling of the switching information within the bitstream at frame level for the second video frame or at macroblock level.

8. The computing system of claim 7 wherein the method further comprises, as part of a motion compensation loop, for a reconstructed version of the first video frame as a reference frame:
adaptively filtering one or more boundaries between blocks of pixel values in the reference frame to reduce boundary discontinuities, including:
measuring smoothness of neighboring pixel values across a given boundary of the one or more boundaries; and
if the smoothness of the neighboring pixel values meets a smoothness test, filtering a pixel value on each side of the given boundary, wherein an adjustment factor for the filtering depends on one or more discontinuity measures that quantify pixel value discontinuity.

9. The computing system of claim 7 wherein the method further comprises, as part of a spatial extrapolation loop, adaptively filtering at least some values of the spatial extrapolation for the current block in the first video frame.

10. The computing system of claim 7 wherein the method further comprises:
selecting the re-oriented frequency transform from among plural available frequency transforms based at least in part upon spatial extrapolation direction for the spatial extrapolation, wherein the plural available frequency transforms include:
a first re-oriented frequency transform that is applied when the spatial extrapolation direction is vertical or near-vertical, wherein the first re-oriented frequency transform accounts for upward trend in pixel values at locations further away from a top boundary of the current block in the first video frame;
a second re-oriented frequency transform that is applied when the spatial extrapolation direction is horizontal or near-horizontal, wherein the second re-oriented frequency transform accounts for upward trend in pixel values at locations further away from a left boundary of the current block in the first video frame; and
a third re-oriented frequency transform that is applied when the spatial extrapolation direction is diagonal or near-diagonal, wherein the third re-oriented frequency transform accounts for upward trend in pixel values at locations further away from the top boundary of the current block in the first video frame and the left boundary of the current block in the first video frame.

11. The computing system of claim 7 wherein the re-oriented frequency transform accounts for upward trend in pixel values at spatial locations further away from a boundary of the current block in the first video frame.

12. The computing system of claim 7 wherein the applying the re-oriented frequency transform includes applying a first one-dimensional frequency transform horizontally and applying a second one-dimensional frequency transform vertically, and wherein at least one of the first one-dimensional frequency transform and the second one-dimensional frequency transform uses basis functions that account for an upward trend in pixel values at spatial locations away from a prediction edge.

13. The computing system of claim 7 wherein the encoding the first video frame further comprises:
selecting one of multiple available scan patterns for transform coefficients resulting from the applying the re-oriented frequency transform to the spatial-extrapolation residual, wherein the selecting one of multiple available scan patterns depends on extrapolation mode for the current block in the first video frame.

14. The computing system of claim 13 wherein the multiple available scan patterns include a vertical scan pattern, a horizontal scan pattern and a normal scan pattern.

15. The computing system of claim 7 wherein the encoding the second video frame further comprises:
   selecting one of multiple available scan patterns for transform coefficients resulting from the applying the frequency transform of the selected transform size to the motion-compensated prediction residual, wherein the selecting one of multiple available scan patterns depends on the selected transform size.

16. In a computing system that implements a video decoder, a method comprising:
   receiving, in a bitstream, encoded video data for a first video frame of a video sequence;
   decoding the first video frame using intraframe decoding, including:
      computing a spatial extrapolation for a current block of pixel values in the first video frame;
      applying a re-oriented inverse frequency transform to transform coefficients of a spatial-extrapolation residual for the current block in the first video frame, wherein the re-oriented inverse frequency transform addresses non-stationarity in pixel values of the spatial-extrapolation residual; and
      reconstructing the current block in the first video frame based upon the spatial-extrapolation residual and the spatial extrapolation;
   receiving, in the bitstream, encoded video data for a second video frame of the video sequence; and
   decoding the second video frame, including using a variable-block-size inverse frequency transform with support for switching of transform size at varying levels within the second video frame, wherein the decoding the second video frame includes:
      computing a motion-compensated prediction for a current block of pixel values in the second video frame;
      reconstructing a motion-compensated prediction residual for the current block in the second video frame, including:
         selecting a transform size to use for the motion-compensated prediction residual, wherein the selecting depends on switching information in the bitstream, and wherein format of the bitstream allows signaling of the switching information within the bitstream at frame level for the second video frame or at macroblock level; and
         applying an inverse frequency transform of the selected transform size to transform coefficients of the motion-compensated prediction residual; and
      reconstructing the current block in the second video frame based upon the motion-compensated prediction and the motion-compensated prediction residual.

17. The method of claim 16 further comprising, as part of a motion compensation loop, for a reconstructed version of the first video frame as a reference frame:
   adaptively filtering one or more boundaries between blocks of pixel values in the reference frame to reduce boundary discontinuities, including:
      measuring smoothness of neighboring pixel values across a given boundary of the one or more boundaries; and
      if the smoothness of the neighboring pixel values meets a smoothness test, filtering a pixel value on each side of the given boundary, wherein an adjustment factor for the filtering depends on one or more discontinuity measures that quantify pixel value discontinuity.

18. The method of claim 16 further comprising, as part of a spatial extrapolation loop, adaptively filtering at least some values of the spatial extrapolation for the current block in the first video frame.

19. The method of claim 16 further comprising:
   selecting the re-oriented inverse frequency transform from among plural available inverse frequency transforms based at least in part upon spatial extrapolation direction for the spatial extrapolation.

20. The method of claim 19 wherein the plural available inverse frequency transforms include:
   a first re-oriented inverse frequency transform that is applied when the spatial extrapolation direction is vertical or near-vertical, wherein the first re-oriented inverse frequency transform accounts for upward trend in pixel values at locations further away from a top boundary of the current block in the first video frame;
   a second re-oriented inverse frequency transform that is applied when the spatial extrapolation direction is horizontal or near-horizontal, wherein the second re-oriented inverse frequency transform accounts for upward trend in pixel values at locations further away from a left boundary of the current block in the first video frame; and
   a third re-oriented inverse frequency transform that is applied when the spatial extrapolation direction is diagonal or near-diagonal, wherein the third re-oriented inverse frequency transform accounts for upward trend in pixel values at locations further away from the top boundary of the current block in the first video frame and the left boundary of the current block in the first video frame.

21. The method of claim 20 wherein the plural available inverse frequency transforms further include a regular inverse frequency transform that is otherwise applied.

22. The method of claim 16 wherein the re-oriented inverse frequency transform accounts for upward trend in pixel values at spatial locations further away from a boundary of the current block in the first video frame.

23. The method of claim 16 wherein the applying the re-oriented inverse frequency transform includes applying a first one-dimensional inverse frequency transform horizontally and applying a second one-dimensional inverse frequency transform vertically, and wherein at least one of the first one-dimensional inverse frequency transform and the second one-dimensional inverse frequency transform uses basis functions that accounts for an upward trend in pixel values at spatial locations away from a prediction edge.

24. The method of claim 16 wherein the decoding the first video frame further comprises:
   selecting one of multiple available scan patterns for the transform coefficients of the spatial-extrapolation residual, wherein the selecting one of multiple available scan patterns depends on extrapolation mode for the current block in the first video frame.

25. The method of claim 24 wherein the multiple available scan patterns include a vertical scan pattern, a horizontal scan pattern and a normal scan pattern.

26. The method of claim 16 wherein the decoding the second video frame further comprises:
   selecting one of multiple available scan patterns for the transform coefficients of the motion-compensated prediction residual, wherein the selecting one of multiple available scan patterns depends on the selected transform size.

27. A computing system that implements a video decoder, wherein the computing system includes a processor and memory, and wherein the computing system is adapted to perform a method comprising:
receiving, in a bitstream, encoded video data for a first video frame of a video sequence;
decoding the first video frame using intraframe decoding, including:
computing a spatial extrapolation for a current block of pixel values in the first video frame;
applying a re-oriented inverse frequency transform to transform coefficients of a spatial-extrapolation residual for the current block in the first video frame, wherein the re-oriented inverse frequency transform addresses non-stationarity in pixel values of the spatial-extrapolation residual; and
reconstructing the current block in the first video frame based upon the spatial-extrapolation residual and the spatial extrapolation;
receiving, in the bitstream, encoded video data for a second video frame of the video sequence; and
decoding the second video frame, including using a variable-block-size inverse frequency transform with support for switching of transform size at varying levels within the second video frame, wherein the decoding the second video frame includes:
computing a motion-compensated prediction for a current block of pixel values in the second video frame;
reconstructing a motion-compensated prediction residual for the current block in the second video frame, including:
selecting a transform size to use for the motion-compensated prediction residual, wherein the selecting depends on switching information in the bitstream, and wherein format of the bitstream allows signaling of the switching information within the bitstream at frame level for the second video frame or at macroblock level; and
applying an inverse frequency transform of the selected transform size to transform coefficients of the motion-compensated prediction residual; and
reconstructing the current block in the second video frame based upon the motion-compensated prediction and the motion-compensated prediction residual.

28. The computing system of claim 27 wherein the method further comprises, as part of a motion compensation loop, for a reconstructed version of the first video frame as a reference frame:
adaptively filtering one or more boundaries between blocks of pixel values in the reference frame to reduce boundary discontinuities, including:
measuring smoothness of neighboring pixel values across a given boundary of the one or more boundaries; and
if the smoothness of the neighboring pixel values meets a smoothness test, filtering a pixel value on each side of the given boundary, wherein an adjustment factor for the filtering depends on one or more discontinuity measures that quantify pixel value discontinuity.

29. The computing system of claim 27 wherein the method further comprises, as part of a spatial extrapolation loop, adaptively filtering at least some values of the spatial extrapolation for the current block in the first video frame.

30. The computing system of claim 27 wherein the method further comprises:
selecting the re-oriented inverse frequency transform from among plural available inverse frequency transforms based at least in part upon spatial extrapolation direction for the spatial extrapolation.

31. The computing system of claim 30 wherein the plural available inverse frequency transforms include:
a first re-oriented inverse frequency transform that is applied when the spatial extrapolation direction is vertical or near-vertical, wherein the first re-oriented inverse frequency transform accounts for upward trend in pixel values at locations further away from a top boundary of the current block in the first video frame;
a second re-oriented inverse frequency transform that is applied when the spatial extrapolation direction is horizontal or near-horizontal, wherein the second re-oriented inverse frequency transform accounts for upward trend in pixel values at locations further away from a left boundary of the current block in the first video frame; and
a third re-oriented inverse frequency transform that is applied when the spatial extrapolation direction is diagonal or near-diagonal, wherein the third re-oriented inverse frequency transform accounts for upward trend in pixel values at locations further away from the top boundary of the current block in the first video frame and the left boundary of the current block in the first video frame.

32. The computing system of claim 31 wherein the plural available inverse frequency transforms further include a regular inverse frequency transform that is otherwise applied.

33. The computing system of claim 27 wherein the re-oriented inverse frequency transform accounts for upward trend in pixel values at spatial locations further away from a boundary of the current block in the first video frame.

34. The computing system of claim 27 wherein the applying the re-oriented inverse frequency transform includes applying a first one-dimensional inverse frequency transform horizontally and applying a second one-dimensional inverse frequency transform vertically, and wherein at least one of the first one-dimensional inverse frequency transform and the second one-dimensional inverse frequency transform uses basis functions that accounts for an upward trend in pixel values at spatial locations away from a prediction edge.

35. The computing system of claim 27 wherein the decoding the first video frame further comprises:
selecting one of multiple available scan patterns for the transform coefficients of the spatial-extrapolation residual, wherein the selecting one of multiple available scan patterns depends on extrapolation mode for the current block in the first video frame.

36. The computing system of claim 35 wherein the multiple available scan patterns include a vertical scan pattern, a horizontal scan pattern and a normal scan pattern.

37. The computing system of claim 36 wherein the decoding the second video frame further comprises:
selecting one of multiple available scan patterns for the transform coefficients of the motion-compensated prediction residual, wherein the selecting one of multiple available scan patterns depends on the selected transform size.

* * * * *